US 6,529,462 B1

(12) United States Patent
Kurozuka et al.

(10) Patent No.: US 6,529,462 B1
(45) Date of Patent: Mar. 4, 2003

(54) DISK LOADING DEVICE AND DISK ADAPTOR

(75) Inventors: Akira Kurozuka, Fujiidera (JP); Eiichi Hanakawa, Kyoto (JP); Shinichi Maeda, Higashiosaka (JP); Kohzoh Ezawa, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 33 days.

(21) Appl. No.: 09/636,815

(22) Filed: Aug. 10, 2000

Related U.S. Application Data

(63) Continuation of application No. 09/073,516, filed on May 6, 1998, now Pat. No. 6,272,093.

(30) Foreign Application Priority Data

May 8, 1997 (JP) .............................................. 9-117866

(51) Int. Cl.[7] .............................................. G11B 33/02
(52) U.S. Cl. ................................................... 369/75.2
(58) Field of Search ............................ 369/75.1–75.2, 369/77.1–77.2

(56) References Cited

U.S. PATENT DOCUMENTS

| 5,724,332 A | 3/1998 | Ogusu | 369/77.2 |
|---|---|---|---|
| 5,737,293 A | 4/1998 | Kawamura et al. | 369/77.1 |
| 5,812,511 A | 9/1998 | Kawamura et al. | 369/77.2 |
| 5,867,338 A | 2/1999 | Ohira et al. | 369/75.2 |
| 6,262,961 B1 * | 7/2001 | Maeda et al. | 369/77.2 |
| 6,272,093 B1 * | 8/2001 | Kurozuka et al. | 369/77.2 |

FOREIGN PATENT DOCUMENTS

| JP | 03 216856 A | 9/1991 |
|---|---|---|
| JP | 04 362562 A | 12/1992 |
| JP | 9245407 | 9/1997 |

OTHER PUBLICATIONS

Supplementary Partial European Search Report, Mar. 14, 2002.

* cited by examiner

*Primary Examiner*—Allen Cao
(74) *Attorney, Agent, or Firm*—Renner, Otto, Boisselle & Sklar, LLP

(57) ABSTRACT

The disk loading device of this invention includes: a holder for removably holding a cartridge; a conveying member for conveying the holder; a shutter opening/closing member for opening a shutter of the cartridge when the cartridge is inserted into the holder; and a rotational driving member having a holding portion for holding a center portion of a disk in the cartridge which has been conveyed to a predetermined position by the conveying member, the rotational driving member rotating the disk held by the holding portion, wherein, when the holder is conveyed by the conveying member, the shutter of the cartridge has been opened by the shutter opening/closing member and an opening of the cartridge which has been exposed by the opening of the shutter passes a position where the holding portion of the rotational driving member is located.

7 Claims, 46 Drawing Sheets

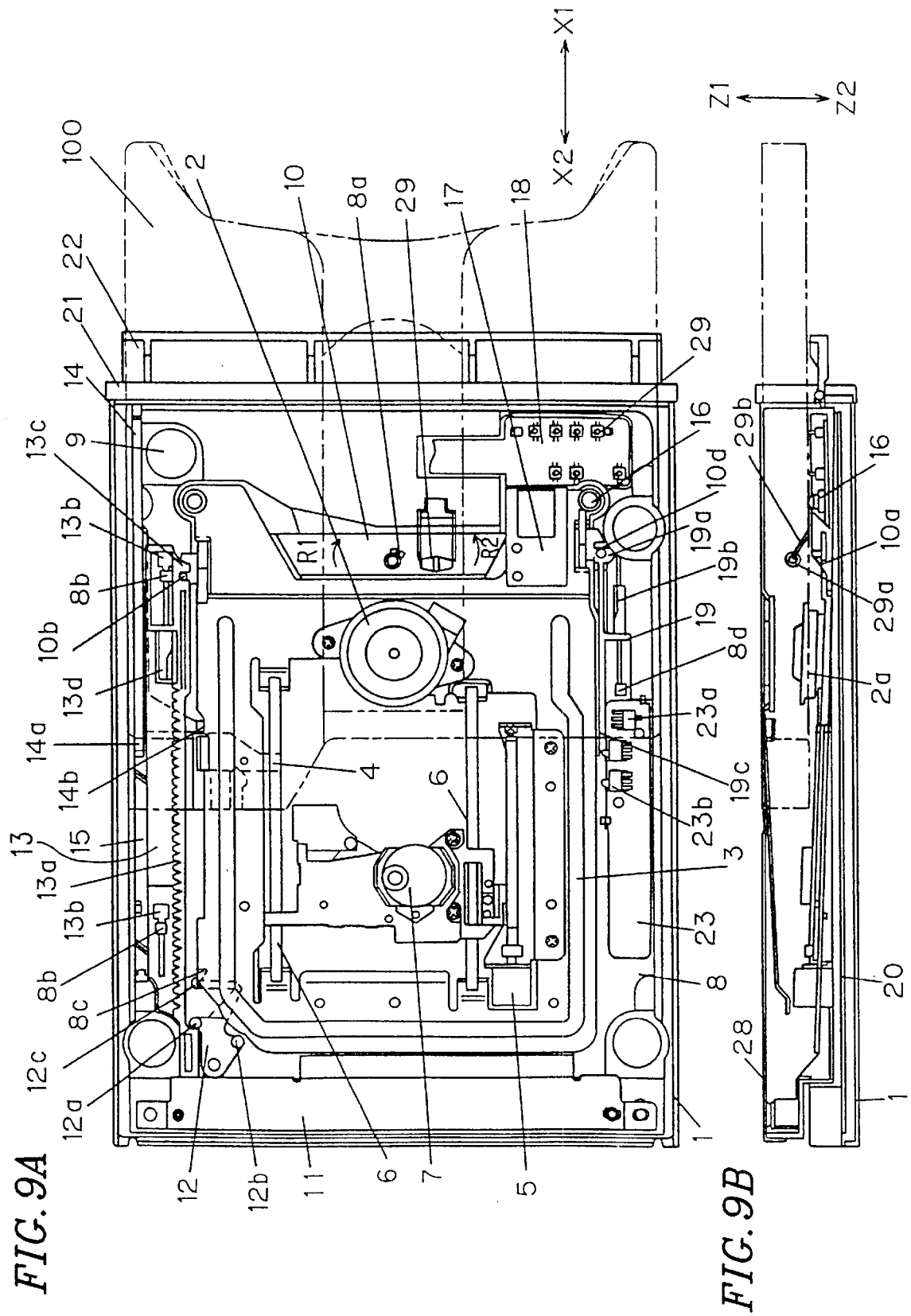

23   23a   100a            100

100

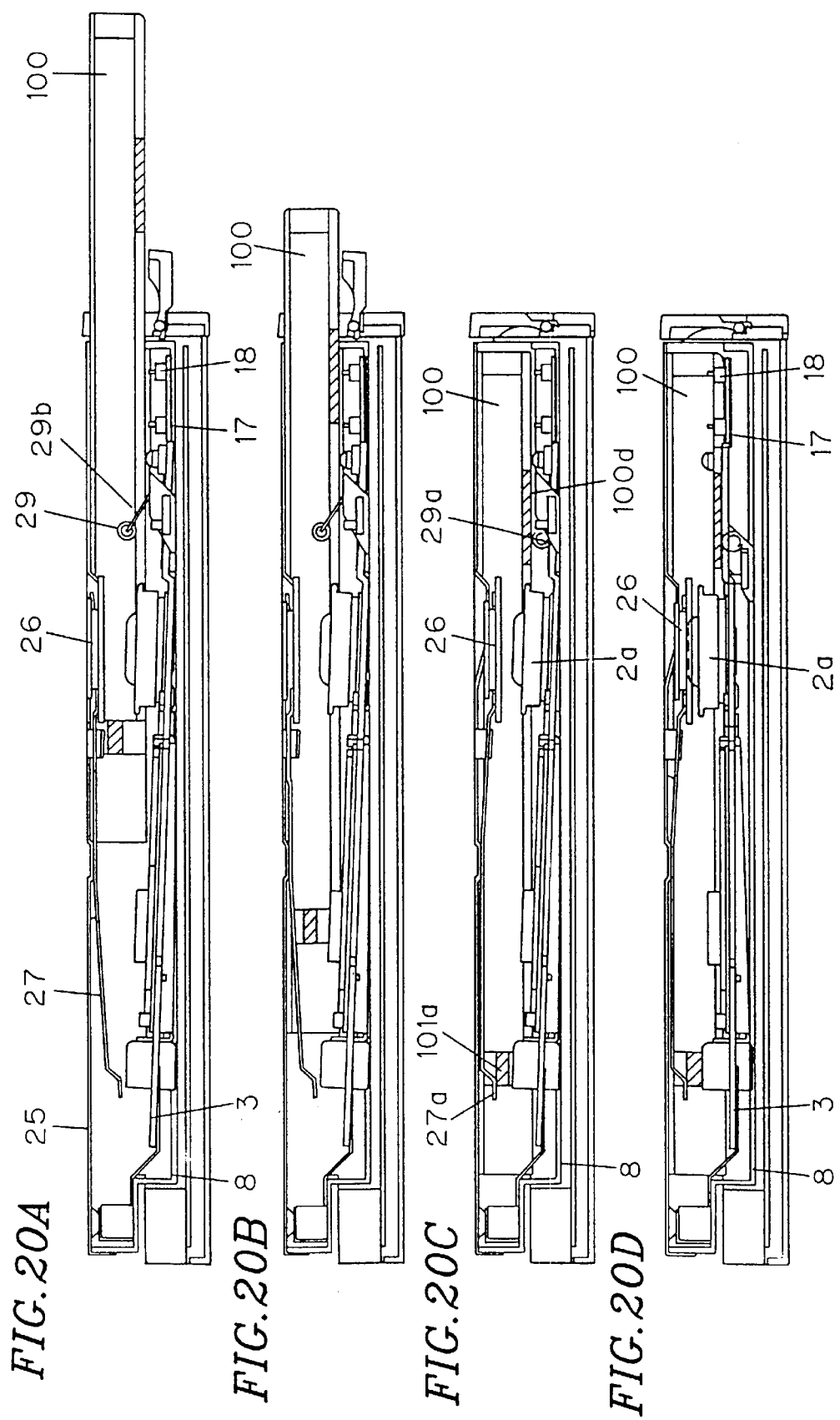

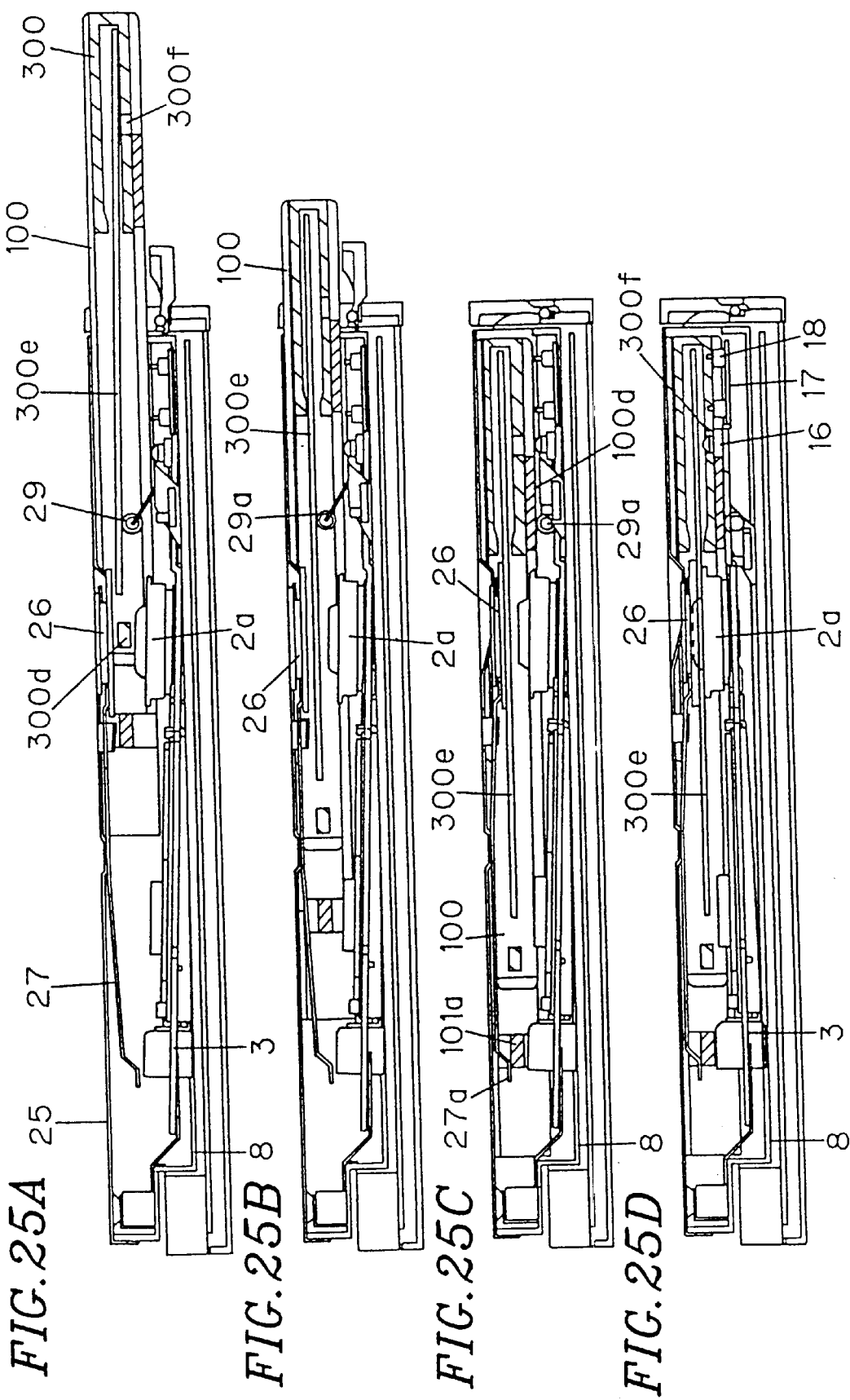

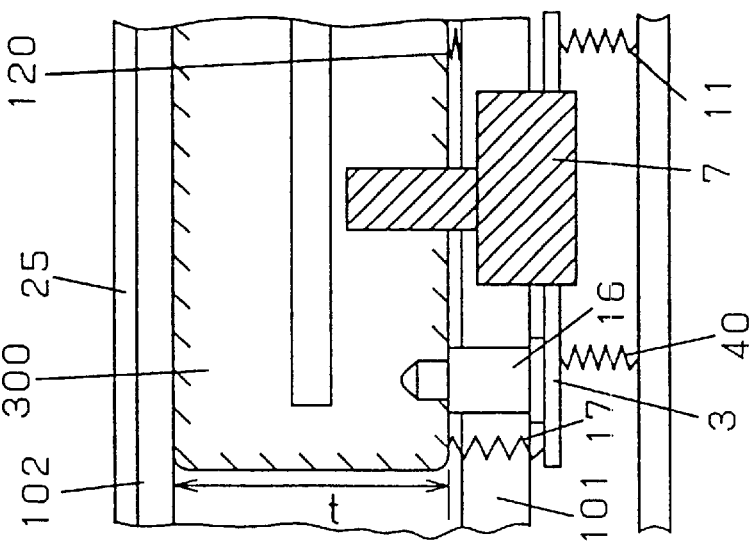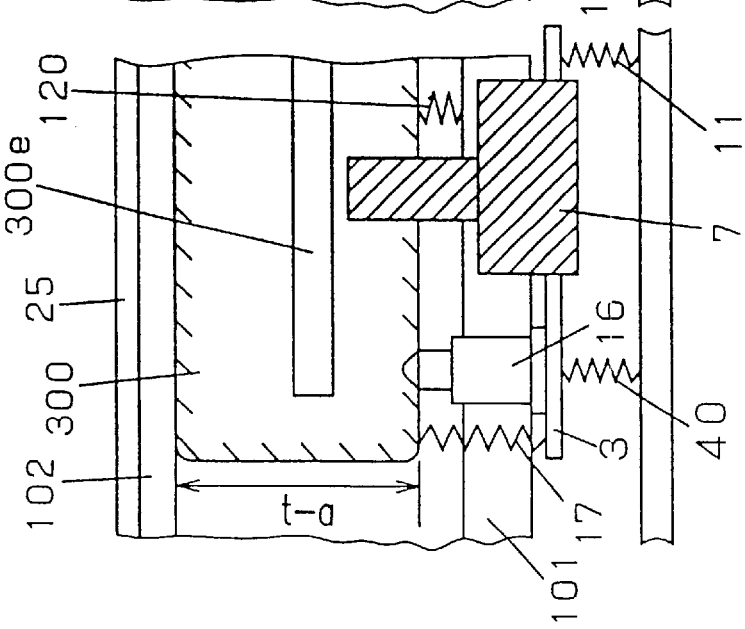

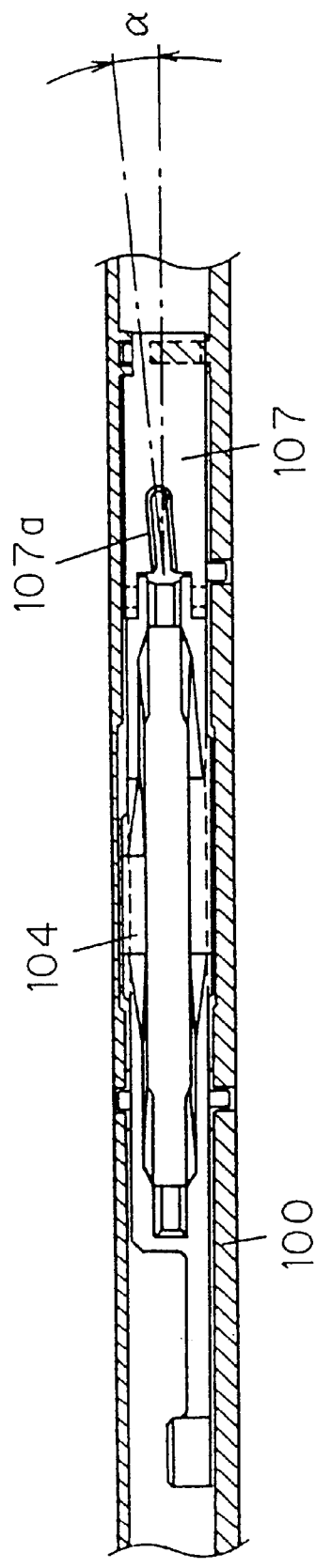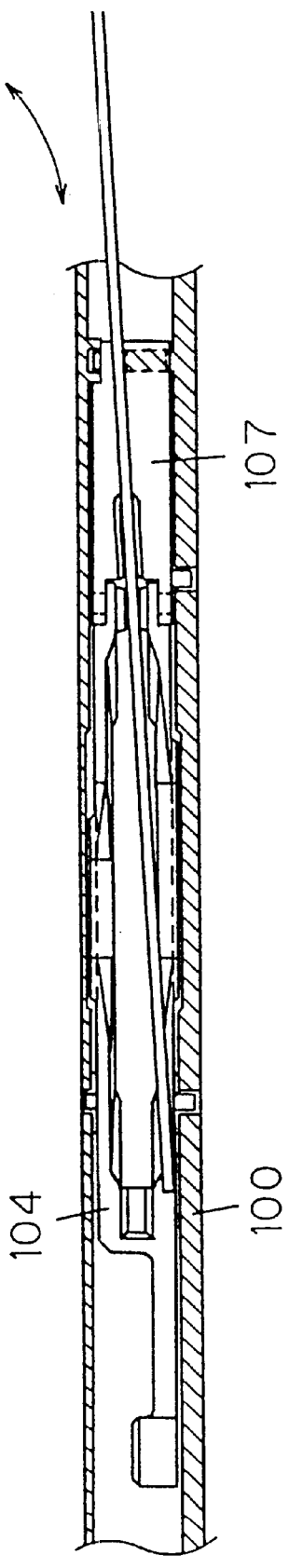
FIG. 31A
FIG. 31B

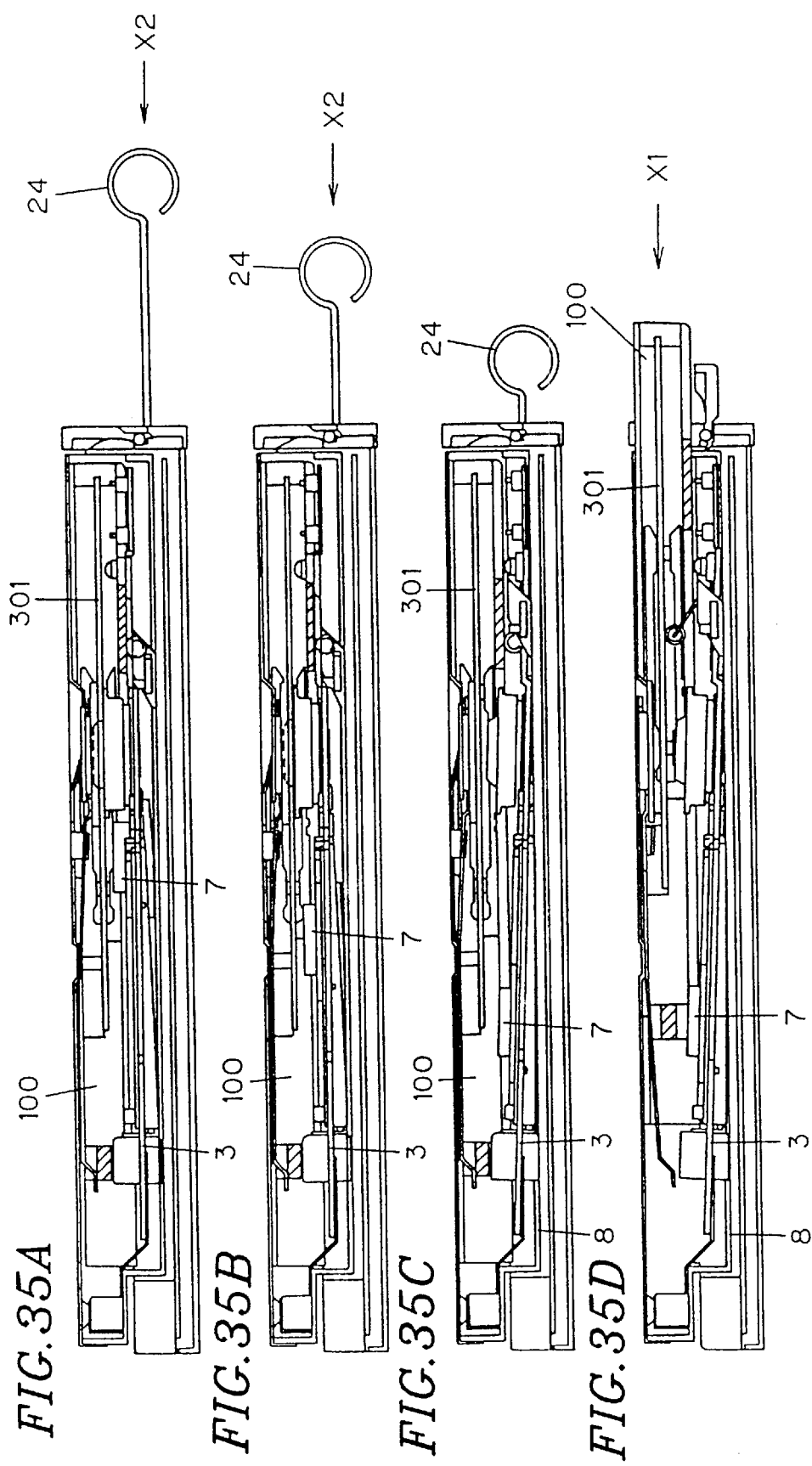

DISK LOADING DEVICE AND DISK ADAPTOR

RELATED APPLICATIONS

This application is a continuation of U.S. patent application Ser. No. 09/073,516, now U.S. Pat. No. 6,272,093 filed on May 6, 1998, the entire disclosure of which is hereby incorporated by reference.

BACKGROUND OF THE INVENTION

1. Field of the Invention

The present invention relates to a disk loading device for loading/unloading an optical disk for a recording/reproduction device which records/reproduces information on/from the optical disk.

2. Description of the Related Art

Optical disks have been widely used as audio disks, video disks, and data memory devices for computers.

Optical disks include rewritable disks cased in cartridges mainly used for data storage and reproduction-only naked disks such as music CDs and CD-ROMs. With the advance of multimedia technology, both the digitization of AV apparatuses and the enhancement of the AV functions of computers are in progress simultaneously. To meet this progress, optical disks which are widely applicable to recording/reproduction of a variety of information regardless whether they are for AV apparatuses or for computers have been requested.

Also, with the increasing request for size reduction of personal computers as well as AV apparatuses, the recording/reproduction devices for optical disks are desired to be made thinner.

In short, a recording/reproduction device for an optical disk, which is thin and applicable to various forms of media has been strongly requested.

Conventionally, however, since the loading method is different between disks incorporated in cartridges and naked disks, individual, exclusive disk loading devices for the cartridges and the naked disks are required.

CONVENTIONAL EXAMPLE 1

A conventional mechanism for loading an optical disk-incorporated cartridge which is mainly used as a data memory device will be described with reference to FIGS. 41 to 43.

In an optical disk device including the cartridge loading mechanism, in general, after a cartridge is inserted into the device, the cartridge needs to be moved toward a spindle motor and an optical pickup so that a disk incorporated in the cartridge can be placed on a turntable to be ready for recording or reproduction.

FIG. 41 is a perspective view illustrating the disk loading mechanism of Conventional Example 1. FIGS. 42A and 42B are side views illustrating the operation of the disk loading mechanism. FIG. 43 is a schematic view illustrating the dimensional relationship between the components of the device in the thickness direction.

Referring to FIGS. 41, 42A, and 42B, a cartridge 201 is inserted into a cartridge holder 202 at the front of the device. At the insertion, a shutter 201a of the cartridge 201 engages with a shutter opener 210 incorporated in the cartridge holder 202 and slides to allow a portion of a disk in the cartridge 201 to be exposed. The cartridge holder 202 is provided with four guide rollers 203 on both sides thereof, which engage with respective guide grooves 205 formed on both sides of a slider 204. Each guide roller 203 is movable only vertically by a distance d along a guide pole 207 mounted on a chassis 206.

The slider 204 is shaped to sandwich the cartridge holder 202 from the bottom, and slidable in direction A by a distance s along a guide pin 208 mounted on the chassis 206. The slider 204 is always urged in direction A by a slider spring 209, and initially stopped by a lock arm (not shown) in the state where the slider spring 209 has expanded at maximum (see FIG. 42A).

A damper 214 is rotatably held by a support arm 215, and located above an opening 202a of the cartridge holder 202 at the center of the upper surface thereof, facing a turntable 212 attached to the axis of a disk motor 211. The damper 214 and the turntable 212 are attracted to each other by an attractive force between a magnet and a magnetic piece incorporated therein.

The support arm 215 rotates by an action of a cam (not shown) disposed on the slider 204 depending on the position of the cam, so as to move the damper 214 upward/downward. In the initial state, the damper 214 has been lifted to a position where the damper 214 does not interfere with the cartridge 201 which is inserted into the cartridge holder 202 (see FIG. 42A).

As the cartridge 201 is inserted into the cartridge holder 202, one corner of the cartridge 201 pushes the lock arm, releasing the lock arm from the engagement with the slider 204. When released, the slider 204 slides in direction A by the force of the slider spring 209, allowing the guide rollers 203 to move along the respective guide grooves 205 and thus the cartridge holder 202 to move toward the chassis 206 (direction B) by a distance d. Simultaneously, the support arm 215 rotates as the slider 204 moves, allowing the clamper 214 to move toward the turntable 212. As the cartridge 201 in the cartridge holder 202 falls, the disk in the cartridge 201 is seated on the turntable 212. The clamper 214 attaches to the disk from above so that the disk is set to be rotatable on the turntable 212 and sufficiently close to an optical pickup 213 for recording/reproduction (see FIG. 42B).

When the cartridge 201 is to be removed from the device, the slider 204 is pulled back against the urging force of the slider spring 209 by a loading motor 216, to allow both the clamper 214 and the cartridge holder 202 to be lifted to the respective initial states. This separates the disk from the turntable 212, and thus the cartridge 201 is ready for unloading.

As shown in FIG. 43, at the insertion of the cartridge 201, a distance D which exceeds the thickness of the cartridge 201 is necessary between the turntable 212 and the clamper 214.

CONVENTIONAL EXAMPLE 2

A conventional loading mechanism of an optical disk device for a naked disk such as a music CD and a CD-ROM will be described with reference to FIGS. 44 and 45A to 45C.

On a main chassis 53 are mounted a disk motor 56, a turntable 58 attached to the axis of the disk motor 56, a center cone 58a on the turntable 58 which is to engage with a center hole 45a of a recording disk 45, a head 43 which is slidable in directions Y1–Y2 along a guide shaft 55 and has a coil 43a for a linear motor, and a magnetic yoke 54 for the linear motor. A hole 53b as the center of rotation is provided at an end 53a of the main chassis 53, and a rotation spindle 51 extends through the hole 53b.

Likewise, a hole 47b as the center of rotation is provided at an end 47a of a clamp lever 47, and the rotation spindle 51 extends through the hole 47b. The rotation spindle 51 is fixed to projections 52 of the bottom surface of a box 42.

A tray 41 is attached to the box 42 so as to move horizontally in directions Y1–Y2 by the engagement between a rack 41a formed on the back surface of the tray 41 and an output gear wheel of a loading motor 57 provided with a gear unit for deceleration. The tray has a dish-shaped depression 46 for receiving and holding the disk 45. A smaller-diameter depression is formed inside the depression 46 to receive a small-diameter disk 60 thereon.

A cam 50 engages with the main chassis 53 and the clamp lever 47 at the rear sides thereof. The cam 50 is driven by a geared motor 49. The main chassis 53 and the clamp lever 47 rotate around the rotation spindle 51 depending on the rotational position of the cam 50 so that the main chassis 53 and the clamp lever 47 are closer to or farther from each other. The box has an opening 44 for insertion of the tray 41. The tray 41 has an opening 41b. A damper 48 is attached to the clamp lever 47. The loading motor 57 and the geared motor 49 are operated under control of a microcomputer in a normal manner, for example. The positions of the tray 41 and the cam 50 driven by the respective motors are detected using normal microswitches or the like. These operations are not specifically shown in these figures, and the description thereof is omitted here.

FIGS. 45A, 45B, and 45C show the operation of the disk loading device of this conventional example.

The case where the disk 45 is used for a disk recording/reproduction device will be described. When an eject/load switch (not sown) is pressed, the tray 41 moves in direction Y2 by the driving force of the loading motor 57 under the control of the microcomputer, to be ejected from the box 42 as shown in FIG. 45A. At this time, the clamp lever 47 and the main chassis 53 are at positions apart from each other with respect to the rotation spindle 51.

Under this state, the disk 45 is placed on the depression 46 of the tray 41 and the eject/load switch is pressed. The tray 41 is then moved horizontally toward the inside of the box 42 through the opening 44 by the driving force of the loading motor 57 as shown in FIG. 45B.

The cam 50 then rotates to allow the clamp lever 47 and the main chassis 53 to come closer to each other with respect to the rotation spindle 51 as shown in FIG. 45C. The disk 45 is sandwiched by the clamper 48 and the turntable 58 on the disk motor 56, engaging with the center cone 58a of the turntable 58, thereby to be ready for rotation. Under this state, information is reproduced from or recorded on the disk 45 by a head 13.

An operation reverse to the above operation is performed to unload the disk 45 from the device.

The conventional disk loading devices described above have the following problems.

In Conventional Example 1, the cartridge 201 is first inserted into the cartridge holder 202 horizontally and then moved downward toward the spindle motor, so as to place the disk on the turntable 212 to be ready for recording/reproduction by the optical pickup 213. Thus, as shown in FIG. 43, the space with a thickness corresponding to the distance D is excessively left after the fall of the cartridge 201 over the entire area of the cartridge 201. Moreover, a space for the retraction of the clamper 214 is required above the cartridge 201. These prevent the device from being made thin.

A naked disk such as a music CD and a CD-ROM cannot be directly inserted to this conventional loading device.

Such a naked disk must be first put in a cartridge called a caddy, which is then loaded into the device. In this case, the caddy needs to be taken out from the disk loading device whenever the disk is exchanged, which makes the operation complicated.

Moreover, due to the standards for cartridges, some cartridges may be different in the size of a shutter end from others due to a difference in the shutter structure, although the positions and sizes of holes for positioning the cartridges in the disk loading device are common. If such a cartridge with a different size is inserted in the cartridge holder 202, the shutter opener 210 does not rotate to the terminal of the rotation route. This is likely to cause the shutter opener 210 to vibrate and, if receiving a shock, the shutter opener 210 may disengage from the shutter, closing the shutter in the device.

In Conventional Example 2, a disk incorporated in a cartridge is not usable. Since the loading motor 57 is located below the tray 41, the entire device cannot be made thin even if the optical head and the disk motor are made thin. Moreover, since a naked disk is just placed on the tray, the device cannot be installed vertically.

The tray becomes thick since it has two-stage depressions to receive a small-diameter disk in addition to the large-diameter disk. This increases the distance by which the turntable 58 must retract when the tray 41 is conveyed inside the device. This prevents the device from being made thin.

When used for a notebook-size personal computer, in particular, the disk loading device is required to be as thin as 20 mm or less. It is impossible for the trays in both Conventional Examples 1 and 2 to satisfy this requirement.

An object of the present invention is to provide a disk loading device which is applicable both to a disk incorporated in a cartridge and a naked disk and can be made thin having no large excessive space in the device.

Another object of the present invention is to provide a disk loading device which keeps a shutter of a cartridge open without fail even if a cartridge having a shutter end which is different in size is inserted, to ensure that the shutter will not close even when the device receives a shock.

A still further object of the present invention is to provide a disk loading device where not only a disk incorporated in a cartridge but also a naked disk can be easily exchanged with another one.

A still further object of the present invention is to provide a disk adaptor loaded in a disk loading device, which allows a small-diameter disk to be directly inserted or removed with an operability similar to that experienced in the case of a cartridge, and which is not required to be removed whenever the small-diameter disk is exchanged with another one.

A still further object of the present invention is to provide a disk loading device where a disk incorporated in a cartridge or a naked disk can be easily retrieved even when no power is supplied to the device.

A still further object of the present invention is to provide a disk loading device which can be made thin having no large excessive space in the device while being provided with a clamper.

A still further object of the present invention is to provide a disk loading device which can be made thin having no large excessive space in the device while a variation in the thickness of a cartridge is cancelled to allow the cartridge to be accurately positioned with respect to a head unit.

A still further object of the present invention is to provide a disk loading device which can be installed horizontally or vertically.

SUMMARY OF THE INVENTION

The disk loading device of this example includes: a holder for removably holding a cartridge; a conveying member for conveying the holder; a shutter opening/closing member for opening a shutter of the cartridge when the cartridge is inserted into the holder; and a rotational driving member having a holding portion for holding a center portion of a disk in the cartridge which has been conveyed to a predetermined position by the conveying member, the rotational driving member rotating the disk held by the holding portion, wherein, when the holder is conveyed by the conveying member, the shutter of the cartridge has been opened by the shutter opening/closing member and an opening of the cartridge which has been exposed by the opening of the shutter passes a position where the holding portion of the rotational driving member is located.

According to the present invention, the shutter has been opened by the shutter opening/closing member disposed in the rear portion of the holder before the top end of the cartridge passes through the clamp portion. Accordingly, the shutter is open when the cartridge passes through the clamp portion. This makes it possible to reduce the distance between the disk motor and the retract position for the clamper. Thus, at the clamping operation, the amount of relative movement among the disk motor, the clamper, and the cartridge are small. Since the clamp portion is not required to retract over the entire thickness of the cartridge, the disk loading device can be made thin.

In one embodiment of the invention, the shutter opening/closing member is an arm rotatably supported by the holder, and a top portion of the arm engages with the shutter of the cartridge when the cartridge is inserted into the holder, to open the shutter, and when the holder is conveyed by the conveying member, the arm is rotated to move so that the top portion of the arm will not interfere with the holding portion of the rotational driving member.

In the above case, the top portion of the arm will not interfere with the holding portion of the rotational driving member. Accordingly, the distance between the holding portion of the rotational driving member, i.e., the turntable and the damper can be reduced.

In another embodiment of the invention, when the holder is conveyed by the conveying member, a portion of the arm engages with a guide of the holder and moves to rotate the arm.

In still another embodiment of the invention, the disk loading device further includes an urging member for urging the top portion of the arm toward the shutter of the cartridge in the state where the cartridge is held by the holder and the top portion of the arm engages with the shutter of the cartridge.

In the above case, the arm is prevented from being released from the shutter of the cartridge even if the arm does not reach the terminal of the pathway of the arm, ensuring that the shutter is kept opened.

Alternatively, the disk loading device of this invention includes a holder for holding either a cartridge incorporating a disk or a naked disk, wherein the holder has a pair of sandwiching members for sandwiching the cartridge, and the pair of sandwiching members have inlet portions which together provide a width larger than a width of the cartridge and holding portions which together sandwich the cartridge, slits being formed on at least the holding portions for receiving the periphery of the naked disk.

According to this invention, the cartridge is sandwiched by the pair of sandwiching members, while the naked disk is held by the slits formed on the holding portions of the sandwiching members.

In one embodiment of the invention, the pair of sandwiching members include a pair of inlet levers and a pair of disk holders, top ends of the pair of inlet levers are axially supported so that the top ends of the pair of inlet levers together provide a width larger than the width of the cartridge, the pair of disk holders are elastically held by mutually axially coupling rear ends of the pair of inlet levers and top ends of the pair of disk holders, and slits for receiving the periphery of the naked disk are formed on at least the pair of disk holders.

In this case, when the cartridge is inserted, the pair of inlet levers are pressed outward to provide a wide entrance. In association with this, the pair of disk holders are pressed outward at the top ends thereof to provide a space large enough for the cartridge to pass therethrough.

In one embodiment of the invention, the disk loading device further includes: a first detection member for detecting which has been inserted into the holder, the cartridge or the naked disk; and a second detection member for detecting the state of the pair of sandwiching members.

In this case, the state of the pair of sandwiching members changes when they hold the cartridge, and this change of the state is detected by the second detection member. Based on detection outputs from the first and second members, which of the cartridge or the naked disk has been inserted into the holder, can be determined.

According to another aspect of the invention, an adaptor for removably holding a naked disk is provided. The adaptor includes: a concave portion in which the disk fits; an introduction portion for introducing the disk into the concave portion; and an elastic portion disposed between the concave portion and the introduction portion, which is pressed by a periphery of the disk and moves away from the concave portion when the disk is introduced from the introduction portion to the concave portion, and returns near the periphery of the disk when the disk fits in the concave portion, wherein an opening is formed for externally holding a center portion of the disk which has fit in the concave portion, and externally performing recording or reproduction for the disk.

According to this invention, it is made possible to use a disk with a different diameter. The disk exchange can be performed with the adaptor being kept placed on the holder.

Alternatively, the disk loading device of this invention includes: a holder for removably holding a cartridge; and a guide for movably supporting the holder, wherein the holder has a lock member, and the lock member projects from the holder and engages with the guide in association with the cartridge inserted into the holder.

According to this invention, a mechanism for locking the holder to the guide in association with the insertion of the cartridge is established. With this mechanism, the holder can be fixed since it is prevented from being pressed into the guide due to a load generated by the operation of opening the shutter of the cartridge, for example. This ensures the insertion of the cartridge in the holder.

In one embodiment of the invention, the holder has a pair of sandwiching members for sandwiching the cartridge, and the lock member is attached to the pair of sandwiching members.

Alternatively, the disk loading device of this invention includes: a holder for removably holding a cartridge; and a guide for movably supporting the holder, wherein the holder has a lock member, and the lock member projects from the holder and engages with the guide in association with the cartridge inserted into the holder, and, when the cartridge has been inserted in the holder, engages with a concave portion of the cartridge to retract in the holder and thus be released from the guide.

According to this invention, a mechanism for locking the holder to the guide in association with the insertion of the cartridge is established. With this mechanism, the holder can be fixed since it is prevented from being pressed into the guide due to a load generated by the operation of opening the shutter of the cartridge, for example. This ensures the insertion of the cartridge in the holder. Moreover, since the lock member fits in the concave portion of the cartridge when the cartridge has been inserted in the holder, the cartridge can be accurately positioned in the holder. At the same time, since the lock member is disengaged from the guide, it is ensured that the cartridge in the holder is loaded in the device after the accurate positioning of the cartridge in the holder.

In one embodiment of the invention, the holder has a pair of sandwiching members for sandwiching the cartridge, and a lock member is attached to the pair of sandwiching members.

Alternatively, the disk loading device of this invention includes: a holder removably holding a cartridge; an elastic member disposed on the holder near the cartridge held by the holder; and a manipulation portion for deforming the elastic member and allowing the deformed elastic member to engage with the cartridge, wherein the cartridge engaging with the elastic member is ejected from the holder by an elastic force generated when the elastic member resumes its original shape.

According to this invention, a forced ejection function for forcibly ejecting the cartridge is realized. In a normal operation where this forced ejection function is not used, the elastic member does not engage with the cartridge. When the forced ejection function is used, the elastic member is deformed by the action of the manipulation portion so that the deformed elastic member engages with the cartridge. The cartridge engaging with the elastic member is ejected from the holder by the elastic force of the elastic member when the elastic member resumes its original shape.

With this arrangement, the disk loading device can be made thin.

Alternatively, the disk loading device comprising: a holder for removably holding a cartridge; a shutter opening/closing member for opening a shutter of the cartridge held by the holder; and a rotational driving member having a holding portion for holding a center portion of a disk in the cartridge with the shutter opened, the rotational driving member rotating the disk held by the holding portion, wherein at least a portion of a mechanism for operating the holding portion of the rotational driving member is located in a range corresponding to an opening of the cartridge exposed by the opening of the shutter.

According to this invention, at least a portion of a mechanism for actuating the holding portion of the rotational driving member is placed in a range corresponding to the opening of the cartridge. The thickness of the opening of the cartridge is smaller than the thickness of the entire cartridge. Accordingly, by placing at least a portion of the holding portion of the rotational driving member at a position corresponding to the opening of the cartridge, the holding portion can be closer to the disk. With this arrangement, the disk loading device can be made thin.

Thus, the invention described herein makes possible the advantages of (1) providing a disk loading device which is applicable both to a disk incorporated in a cartridge and a naked disk and can be made thin having no large excessive space in the device, (2) providing a disk loading device which keeps a shutter of a cartridge open without fail even if a cartridge having a shutter end which is different in size is inserted, to ensure that the shutter will not close even when the device receives a shock, (3) providing a disk loading device where not only a disk incorporated in a cartridge but also a naked disk can be easily exchanged with another one, (4) providing a disk adaptor loaded in a disk loading device, which allows a small-diameter disk to be directly inserted or removed with an operability similar to that experienced in the case of a cartridge. and which is not required to be removed whenever the small-diameter disk is exchanged with another one, (5) providing a disk loading device where a disk incorporated in a cartridge or a naked disk can be easily retrieved even when no power is supplied to the device, (6) providing a disk loading device which can be made thin having no large excessive space in the device while being provided with a clamper, (7) providing a disk loading device which can be made thin having no large excessive space in the device while a variation in the thickness of a cartridge is cancelled to allow the cartridge to be accurately positioned with respect to a head unit, and (8) providing a disk loading device which can be installed horizontally or vertically.

These and other advantages of the present invention will become apparent to those skilled in the art upon reading and understanding the following detailed description with reference to the accompanying figures.

BRIEF DESCRIPTION OF THE DRAWINGS

FIGS. 9A and 9B are a plan view and a side sectional view, respectively, of a base section of the disk loading device of the embodiment.

FIGS. 20A to 20D are side sectional views illustrating the loading operation of the disk loading device of the embodiment, when no medium is inserted in a holder.

FIGS. 25A to 25D are side sectional views illustrating the loading operation of the disk loading device of the embodiment, when a cartridge has been inserted in a holder.

FIGS. 26A to 26C are views illustrating the principle of a cartridge thickness allowance cancellation mechanism of the disk loading device of the embodiment.

FIG. 31A is a side view of the disk holder and the disk of the disk loading device of the embodiment.

FIG. 31B is a side view illustrating the insertion of the disk.

FIGS. 35A to 35D are side sectional views illustrating the cartridge retrieval operation in the disk loading device of the embodiment when the device is not powered.

DESCRIPTION OF THE PREFERRED EMBODIMENTS

Hereinbelow, the present invention will be described in detail by way of example with reference to the accompanying drawings.

First, the construction of an embodiment of the disk loading device according to the present invention will be described with reference to the relevant drawings.

The disk loading device of this embodiment can be installed horizontally or vertically. Hereinbelow, however, the case where the disk loading device is installed horizontally will be described for the convenience of description.

The disk loading device of this embodiment can receive a naked disk with a diameter of 12 cm such as a music CD and a CD-ROM (hereinbelow, called a large disk), a naked disk with a diameter smaller than the large disk, such as an 8 cm dia. single CD (hereinafter, called a small disk), and a cartridge incorporating a large disk (hereinafter, called a cartridge). Hereinbelow, these three types of recording media are collectively called media simply. The shapes of the media are taken into consideration as long as the loading mechanism is concerned. The recording/reproduction method and the recording density of the media are not restricted to those of the above types.

First, the entire construction of the disk loading device will be described, and thereafter the constructions of respective components will be described in detail.

(Entire Construction of Disk Loading Device)

Figure 1:
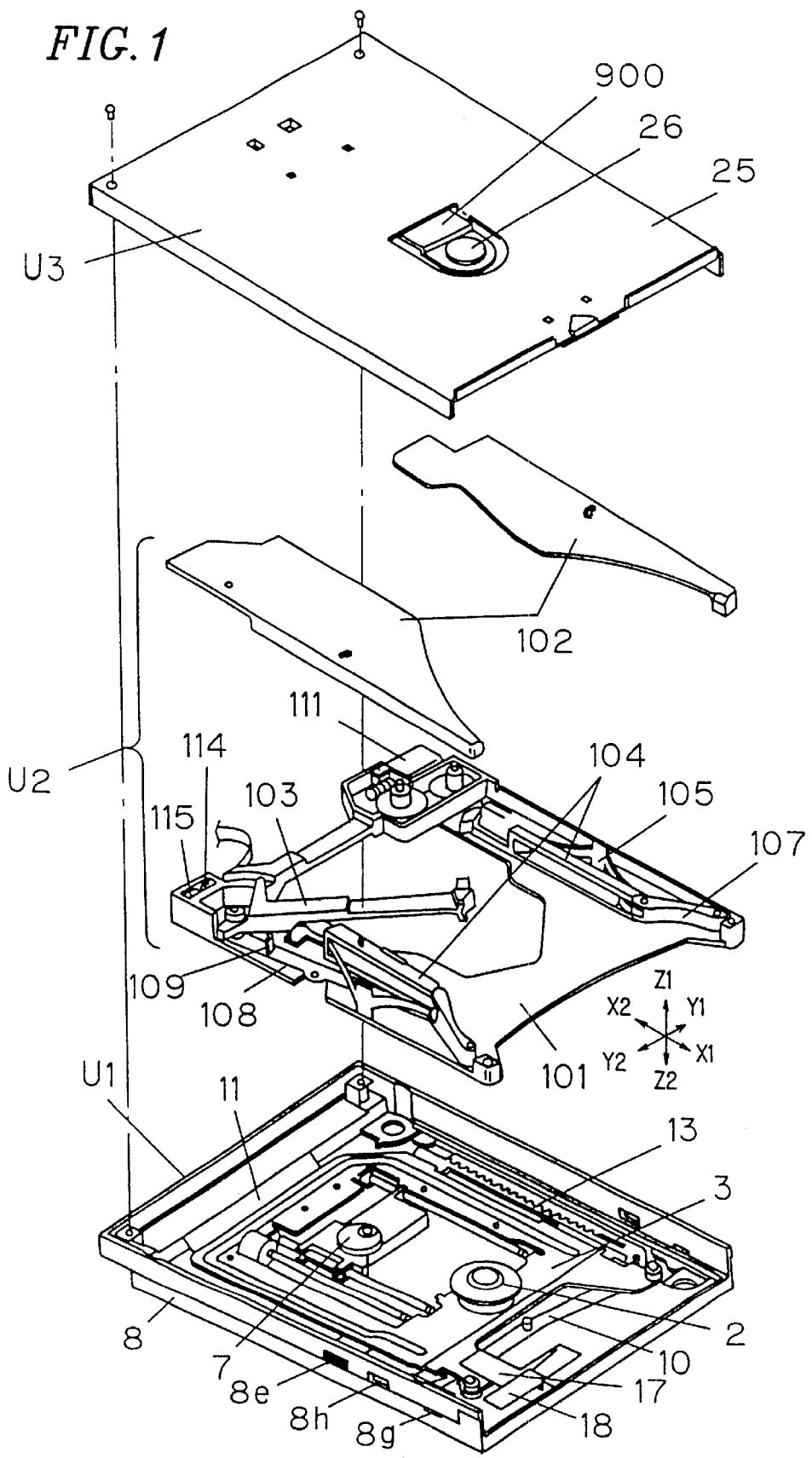
FIG. 1 is an exploded perspective view of one embodiment of the disk loading device according to the present invention.
Figure 2:
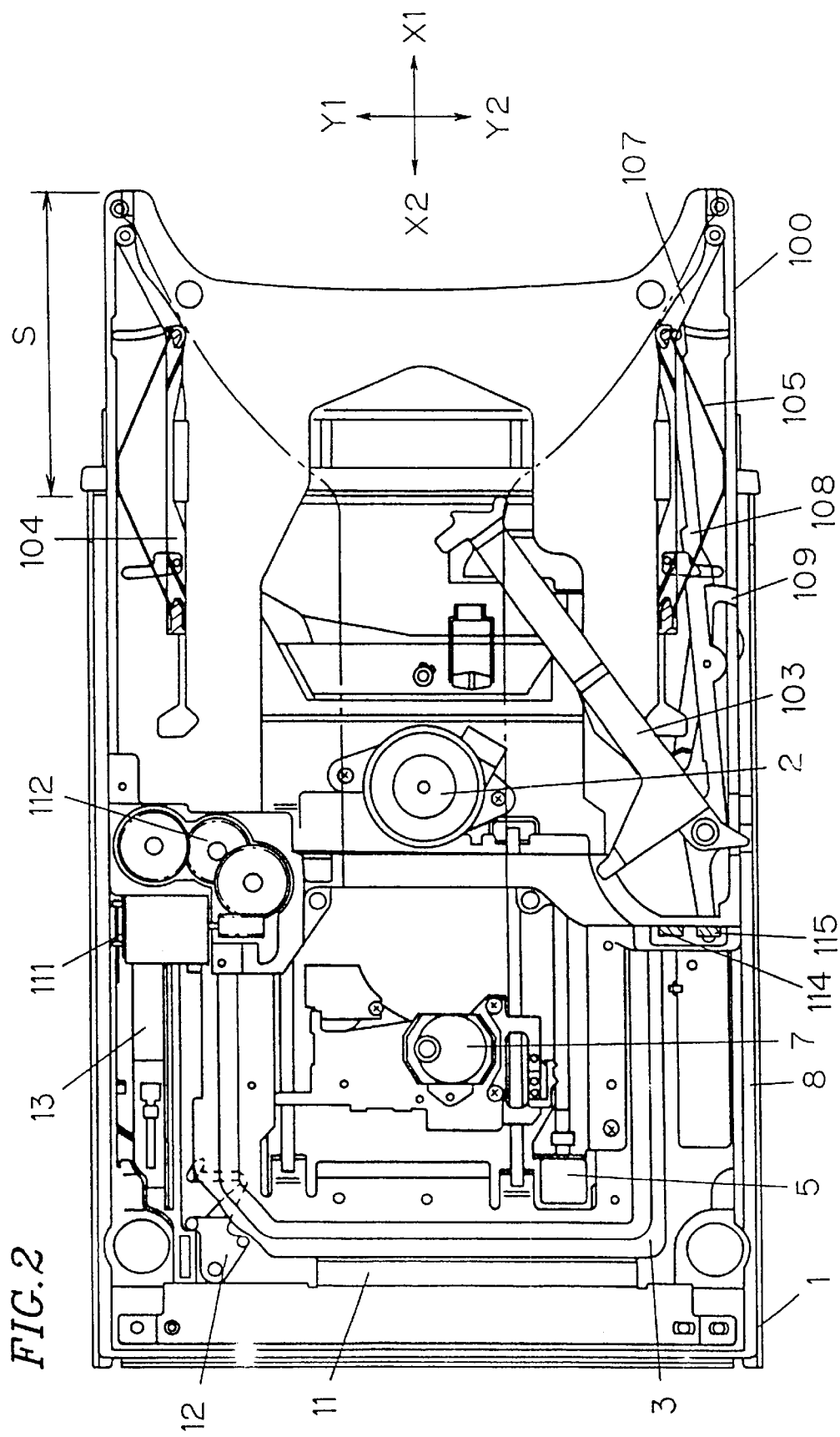
FIG. 2 is a plan view illustrating an internal construction of the disk loading device of the embodiment.

FIG. 1 is an exploded perspective view illustrating a construction of the disk loading device according to the present invention. FIG. 2 is a plan view illustrating an internal construction of the disk loading device. FIGS. 3A to 3D are perspective views of a cartridge and naked disks. FIGS. 3E and 3F are side views of the cartridge. FIG. 4 is an exploded perspective view illustrating a construction of a holder of the disk loading device. In these figures, X, Y, and Z of the coordinate system indicating the directions denote the depth, the width, and the height of the device, respectively.

Referring to FIG. 1, the disk loading device of this embodiment includes a base section U1, a holder section U2, and a clamp section U3.

The base section U1 includes a chassis 3 and a lifting mechanism for moving the chassis 3 upward/downward, which are both disposed on a base 8. An optical head 7 and a turntable-integrated disk motor 2 are mounted on the chassis 3. A holder 100 of the holder section U2 is placed on a guide portion 8f on the side faces of the base 8, and a top board 25 of the clamp section U3 is mounted on the holder 100.

The clamp section U3 includes a clamp lever 27 which is attached to the top board 25 and provided with a clamp 26.

The holder 100 of the holder section U2 has a loading motor Ill and a gear wheel array 112 incorporated therein. A gear wheel 112a at the last stage of the gear wheel array 112 engages with a rack 13a of a slide rack 13 attached to the base 8, so that the holder 100 is driven in directions X1–X2. A current for driving the loading motor 111 is supplied from the side of the base 8 via a flexible substrate 113.

The holder 100 also includes a pair of right and left disk holding mechanisms for guiding and holding the naked disk, a shutter opener 103 for opening/closing a shutter of the cartridge, a lock mechanism for the cartridge, a lock mechanism for the holder, and a spring for urging the cartridge.

Switches 114 and 115 are disposed on the flexible substrate 113, which are turned to the ON/OFF states by the shutter opener 103 and a coupling plate 108, respectively.

As shown in FIG. 2, the holder section U2 is incorporated in the base section Ul. FIG. 2 shows the standby state for medium exchange, where the holder 100 is pulled out by a distance S by the incorporated loading motor 111 so that about a half of the disk placed on the holder 100 is exposed.

(Media to Be Used)

Figure 3A:
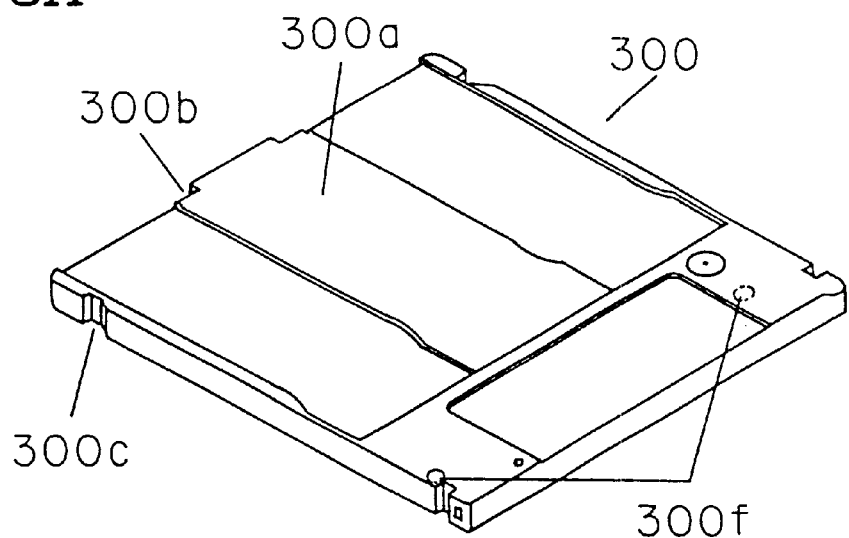
FIGS. 3A and 3B are perspective views of a cartridge.
Figure 4:
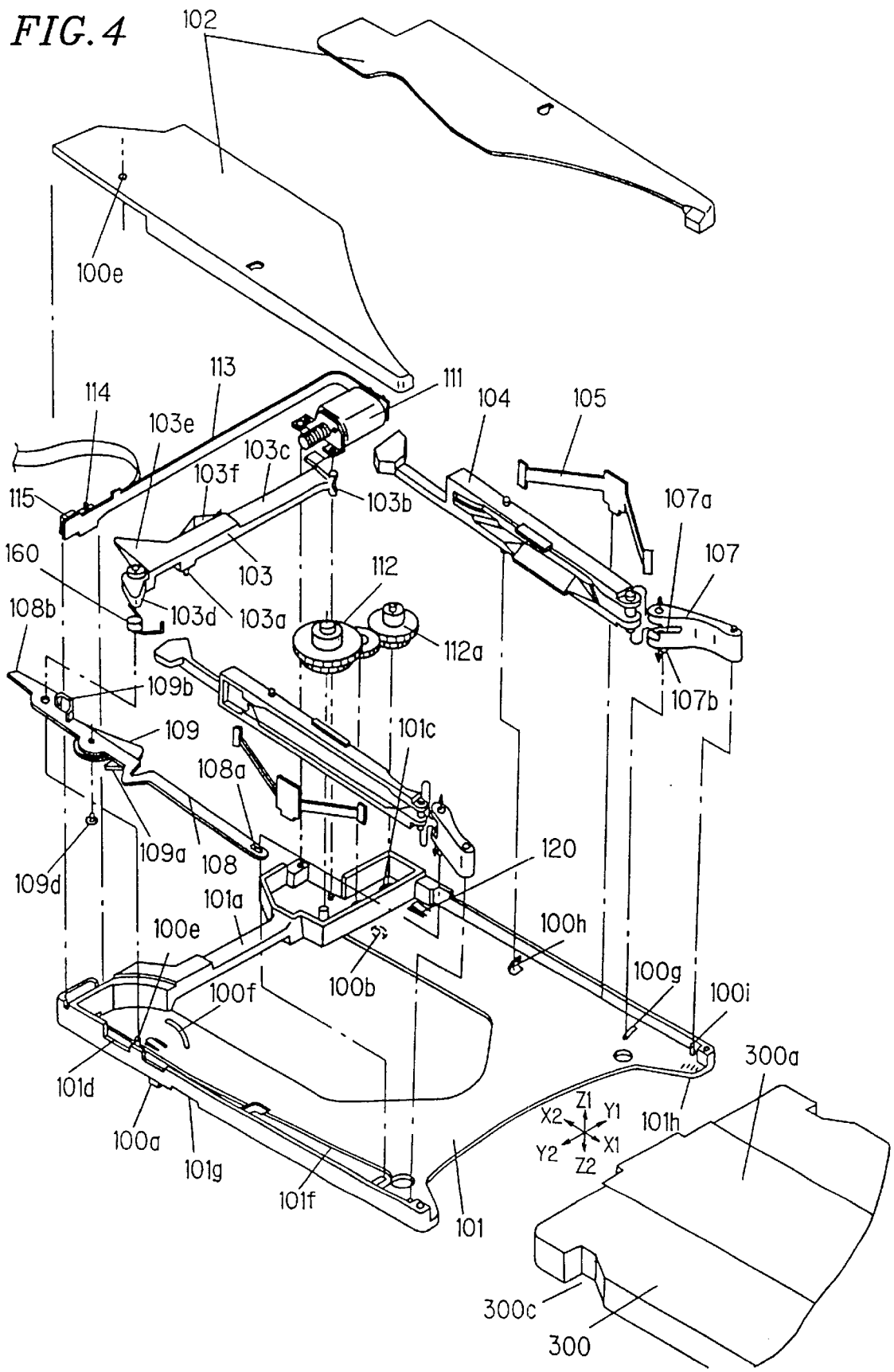
FIG. 4 is an exploded perspective view illustrating an internal construction of a holder of the disk loading device of the embodiment.

FIG. 3A is a perspective view of a cartridge 300 in the state where a shutter 300a thereof is closed. The cartridge 300 has notches 300c for holding and positioning holes 300f.

Figure 3B:
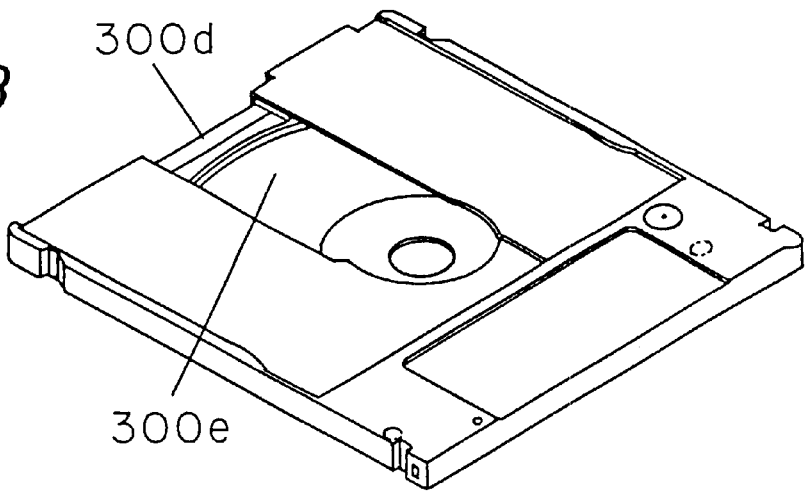

During the insertion of the cartridge 300 into the holder 100, a concave portion 300b at the top end of the shutter 300a engages with the top of the shutter opener 103 of the holder 100. As the cartridge 300 is further inserted to the innermost position, the shutter 300a opens as shown in FIG. 3B, exposing a disk 300e placed inside the cartridge 300. A coupling portion 300d which is thinner than the body of the cartridge 300 is exposed simultaneously.

Figure 3C:
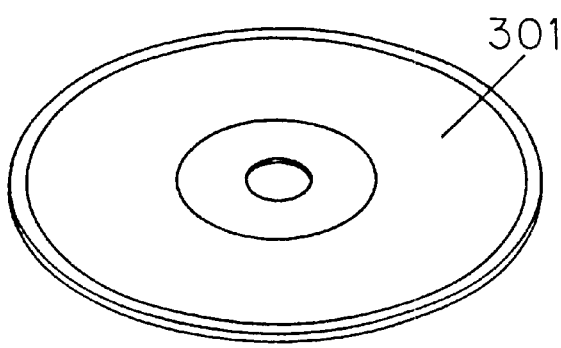
FIGS. 3C and 3D are perspective views of naked disks.
Figure 3D:
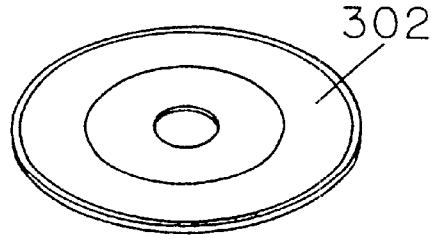
Figure 3E:
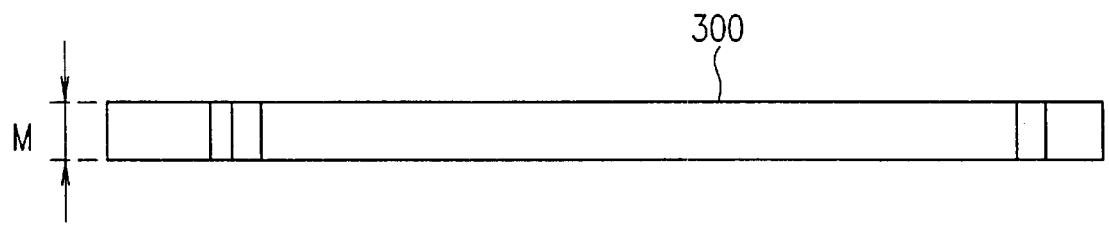
FIGS. 3E and 3F are a side view and a sectional view of the cartridge, respectively.
Figure 3F:
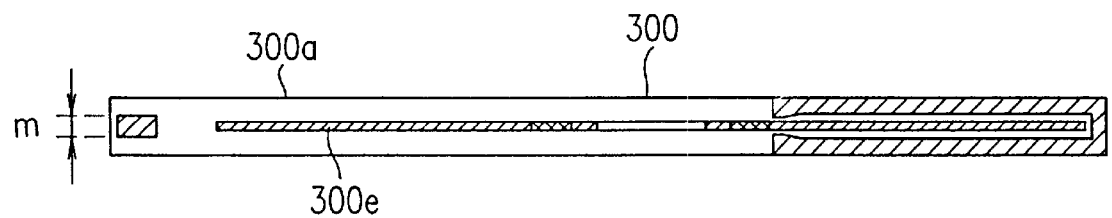

FIGS. 3C and 3D show a large disk 301 and a small disk 302, respectively. FIGS. 3E and 3F show a side view and a sectional view of the cartridge 300, respectively.

The cartridge 300 has a thickness of M. When the shutter 300a of the cartridge 300 is opened, the thickness of the opened portion is m, where m is smaller than M.

Hereinbelow, the constructions of the respective components of the disk loading device will be described in detail.

(Construction of Holder)

Figure 5:
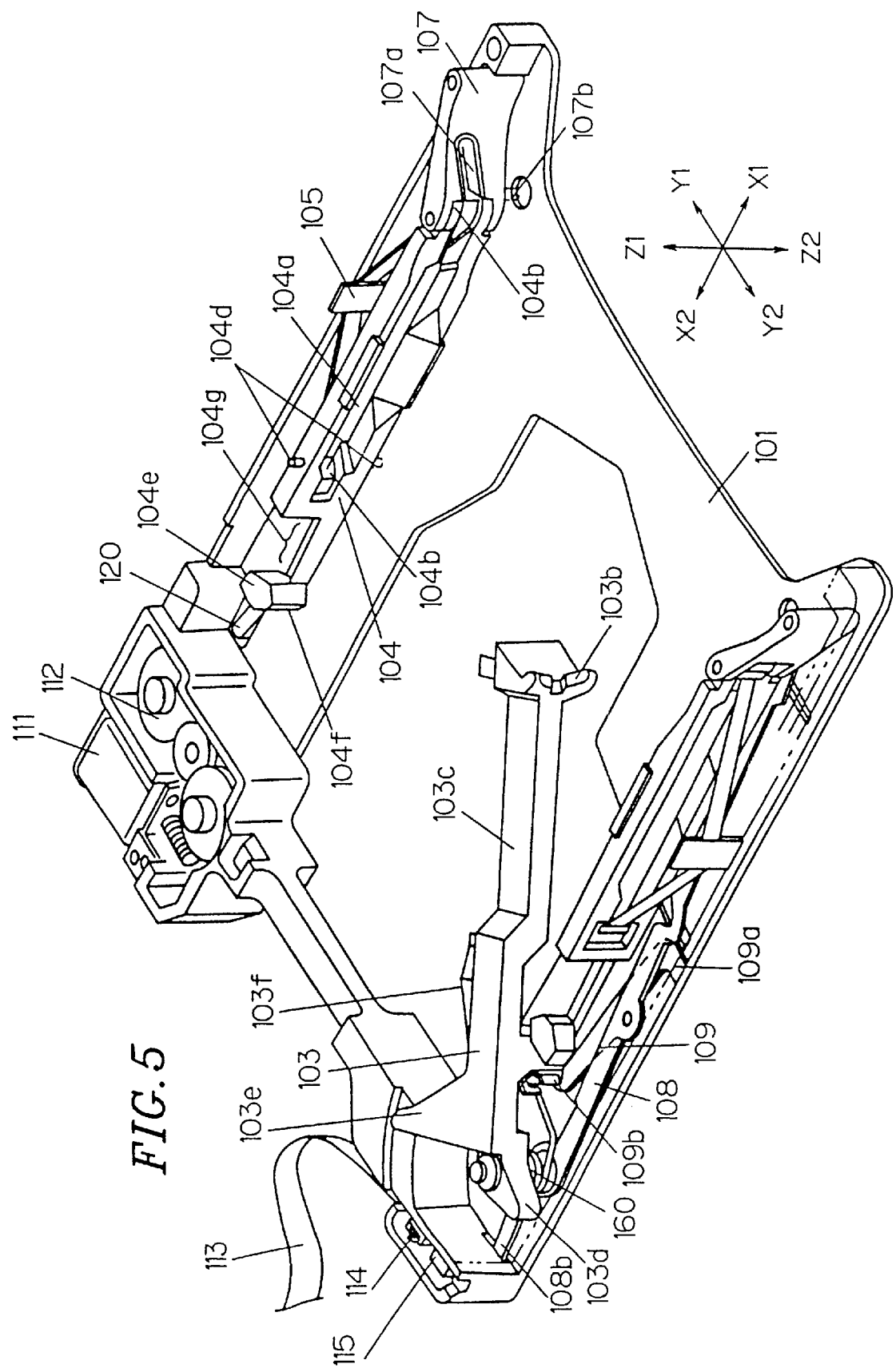
FIG. 5 is a perspective view of the holder of FIG. 4 when assembled.

FIG. 4 is an exploded perspective view of an internal construction of the holder 100. FIG. 5 is a perspective view of the holder 100 in the assembled state.

Referring to FIG. 4, a holder cover 102 is attached to the top surface of a holder case 101 to constitute the box-shaped holder 100. An opening which is open in direction X1 is a medium insertion opening for receiving a medium which is inserted in direction X2. The height of the inside space of the holder 100 corresponds to the thickness of the cartridge 300 with an addition of an appropriate gap. The width of the inside space of the holder 100 corresponds to the width of the cartridge 300 with an addition of a space for retraction of holding mechanisms for the naked disk which will be described later. The bottom surface of the holder case 101 has an opening for receiving the optical head which is inserted from the bottom. The center portion of the rear wall of the holder case 101 is partly cut from the upper and lower sides to form a thin coupling portion 101a. The holder cover 102 is composed of right and left parts, forming an opening in the center portion of the holder 100. The width of the opening is the same as the length of the coupling portion 101a.

The right and left edges of the insertion opening formed between the holder case 101 and the holder cover 102 project in direction X1, and the center of the insertion opening is depressed. The right and left projections of the holder case 101 expand toward each other more than the right and left projections of the holder cover 102, forming receiving portions 101h. At the insertion of the cartridge 300, the head edges of the cartridge 300 can be temporarily placed on the receiving portions 101h, which facilitates the insertion of the cartridge 300.

The rear portion of the holder 100 includes the loading motor 111, a portion for mounting the driving gear wheel array 112, a portion for mounting the shutter opener 103, a portion for mounting the coupling plate 108 and a holder lock 109, and two projections 100a and 100b formed on the back of the bottom surface. Except for these components, the holder 100 is symmetrical right and left.

The gear wheel 112a at the last stage of the driving gear wheel array 112 extends downward via a hole 101c at the bottom surface of the holder case 101, to associate with a driving mechanism incorporated in the base 8. The operation of the gear wheel 112a and the two projections 100a and 100b will be described later.

The shutter opener 103 is incorporated in the holder 100 rotatably around an axis 100e composed of aligned holes of the holder case 101 and the holder cover 102 and a boss. A projection 103a of the shutter opener 103 engages with an arc groove 100f which is concentric with the hole 100e, thereby regulating the rotation angle of the shutter opener 103. When the projection 103a of the shutter opener 103 is urged by a spring 160 to the end of the arc groove 100f on the side of the medium insertion opening, a top portion 103b of the shutter opener 103 is located at a position where it abuts against the concave portion 300b of the cartridge shutter 300a of the cartridge 300 inserted to the holder case 101. The top portion 103b of the shutter opener 103 is of a cylindrical shape having a height substantially identical to the thickness of the cartridge 300. The portion of the wall of the top portion 103b on the side of the medium insertion opening is notched at the center thereof. This prevents the periphery face of the inserted naked disk from slipping upward or downward and being displaced from the top portion 103b after the periphery of the naked disk abuts against the top portion 103b.

A projection 103d at the opposite end of the shutter opener 103 horizontally projects through a hole 101d formed at a side face of the holder case 101. the projection 103d retracts toward the inside of the holder 100 when the shutter opener 103 rotates toward the innermost position. When the holder 100 is pulled outward from the device and is in the medium exchange state, the projection 103d escapes in an escape hole 8e formed at a side wall of the base 8 at a position corresponding to the hole 101d of the holder case 101, to allow the top portion of the shutter opener 103 to rotate in direction X1. On the contrary, when the holder 100 is pushed into the device, the projection 103d is pressed by the side wall of the base 8, entering the inside of the holder 8. This allows the shutter opener 103 to rotate swiftly to the innermost position in the holder 100.

An arm 103c of the shutter opener 103 is partly cut at the upper and lower portions to have a thickness substantially identical to that of the coupling portion 101a at the rear wall of the holder case 101.

An upward projection 103e of the shutter opener 103 serves to turn the switch 114 disposed on the flexible substrate 113 to the ON state when the shutter opener 103 is at a predetermined angular position.

An opener plate spring 103f attached to the shutter opener 103 abuts against the rear wall of the holder case 101 when the shutter opener 103 comes to the end of the rotation, to provide an urging force to the shutter opener 103.

Hereinbelow, a holder lock mechanism will be described. The holder lock mechanism is composed of one of two inlet levers 107, the coupling plate 108, and the holder lock 109.

The holder lock 109 includes a hook 109a and an initiating portion 109b at opposite ends thereof, and is attached to the back surface of the coupling plate 108 so as to rotate around an axis 109d. The coupling plate 108 is disposed so as to rotate around the axis 100e in a concave portion 101f formed on the bottom surface of the holder case 101. The holder lock 109 is urged by the spring 160 so that the initiating portion 109b is directed toward the inside of the holder 100.

An elongate hole 108a formed at the top end of the coupling plate 108 engages and associates with a projection 107b formed at the top end of the inlet lever 107. The inlet lever 107 is attached to the holder case 101 so as to rotate around an axis 100i with a range allowed by an arc groove 100g. The inlet lever 107 is urged by a holder plate spring 105 toward the inside of the holder 100 together with a disk holder 104. Upon insertion of the cartridge 300, the inlet lever 107 is rotated toward the outside of the holder 100. The coupling plate 108 is also rotated toward the outside of the holder 100 to allow the hook 109a of the holder lock 109 to project from the holder 100 through a hole 101g at the side face of the holder case 101. Under this state, the initiating portion 109b of the holder lock 109 enters the passage of the cartridge 300. When the cartridge 300 arrives at the innermost position, the initiating portion 109b is pushed outward. This allows the hook 109a to rotate inward to enter the holder 100. In other words, the hook 109a projects from the holder 100 only when the cartridge 300 is being inserted into the holder 100.

A projection 108b of the coupling plate 108 normally keeps the switch 115 disposed on the flexible substrate 113 in the ON state. When the coupling plate 108 rotates with the rotation of the inlet lever 107, the switch 115 is immediately turned to the OFF state.

Hereinbelow, a cartridge lock mechanism will be described.

The rear end of each of the disk holders 104 is of an elastic structure composed of outer and inner projections 104e and 104f and an arm 104g. When the cartridge 300 is inserted, the inner projection 104f is pressed outward by the side face of the cartridge 300, causing the outer projection 104e to temporarily project outward. When the notch 300c of the cartridge 300 arrives at the position of the projection 104f, the projection 104f enters the notch 300c, allowing the projections 104e and 104f to return to the respective original positions due to the elasticity of the arm 104g.

Hereinbelow, the disk holding mechanism for guiding and holding the naked disk will be described.

Each of the disk holding mechanisms includes the disk holder 104, the holder plate spring 105, and the inlet lever 107.

The disk holder 104 includes a slit 104a slanted toward the inside of the holder 100 for regulating the vertical position of the naked disk and holding portions 104b formed at both ends of the slit 104a for regulating the radial position of the naked disk.

The disk holder rotatably engages with the inlet lever 107 at the top end thereof, and projections 104d formed on the top and back surfaces thereof engages with guide grooves 100h of the holder cover 102 and the holder case 101.

The inlet lever 107 is attached so as to rotate around the axis 100i with the projection 107b rotatably engaging with the arc groove 100g, and is urged by the holder plate spring 105 toward the inside of the holder 100 together with the disk holder 104. Normally, the projections 104d and the projection 107b are located at the innermost positions of the guide grooves 100h and the arc groove 100g, respectively. Under this state, the pair of the right and left disk holders 104 are held parallel to each other in direction X so that the distance therebetween is smaller than the diameter of the naked disk to be inserted.

The inserted naked disk abuts against the top portion of the shutter opener 103. While rotating the shutter opener 103 toward the innermost position, the naked disk temporarily pushes the top ends of the inlet levers 107 and the disk holders 104 outward, to enter the slits 104a. The disk holders 104 then return to the original positions.

At this time, the shutter opener 103 abuts against the naked disk at the position where the switch 114 is still in the OFF state. At this position, when the naked disk is slightly pushed into the holder 100 so as to move the rear ends of the disk holders 104 outward, the projection 103e of the shutter opener 103 turns the switch 114 to the ON state. When the pushing of the naked disk is stopped, the disk holders 104 return to the original positions.

A predetermined gap may be provided between the four holding portions 104b and the outer circumference of the naked disk with respect to the diameter of the naked disk by increasing the distance between the two holding portions 104b on the same side. Also, a predetermined gap may be provided between the width of each slit 104a and the disk thickness. With this arrangement, the rotation of the disk is possible while the disk holders 104 are kept in the original positions.

When the cartridge 300 is to be inserted, the corners of the cartridge 300 push the inlet levers 107 outward. The portions of the inlet levers 107 which abut against the corners of the cartridge 300 have been depressed so that they can be pushed smoothly. When the inlet levers 107 rotate, the top ends of the disk holders 104 move outward widely. As the cartridge 300 is further inserted into the holder 100, the disk holders 104 are also pressed by the cartridge 300, so that the disk holders 104 and the inlet levers 107 retract in lines on the right and left side portions of the holder 100, to secure the passage for the cartridge 300.

As is apparent from the construction described above, the disk holders 104 stand ready for holding a naked disk. When the cartridge 300 is inserted, the inlet levers 107 are pressed by the corners of the cartridge 300, and the disk holders 104 retract to and stay on the right and left side portions of the holder 100.

A cartridge urging spring 120 is incorporated in the holder case 101 to press the corners of the top end of the inserted cartridge 300 toward the holder cover 102 (in direction Z1).

(Construction of Clamp Section)

Figure 6:
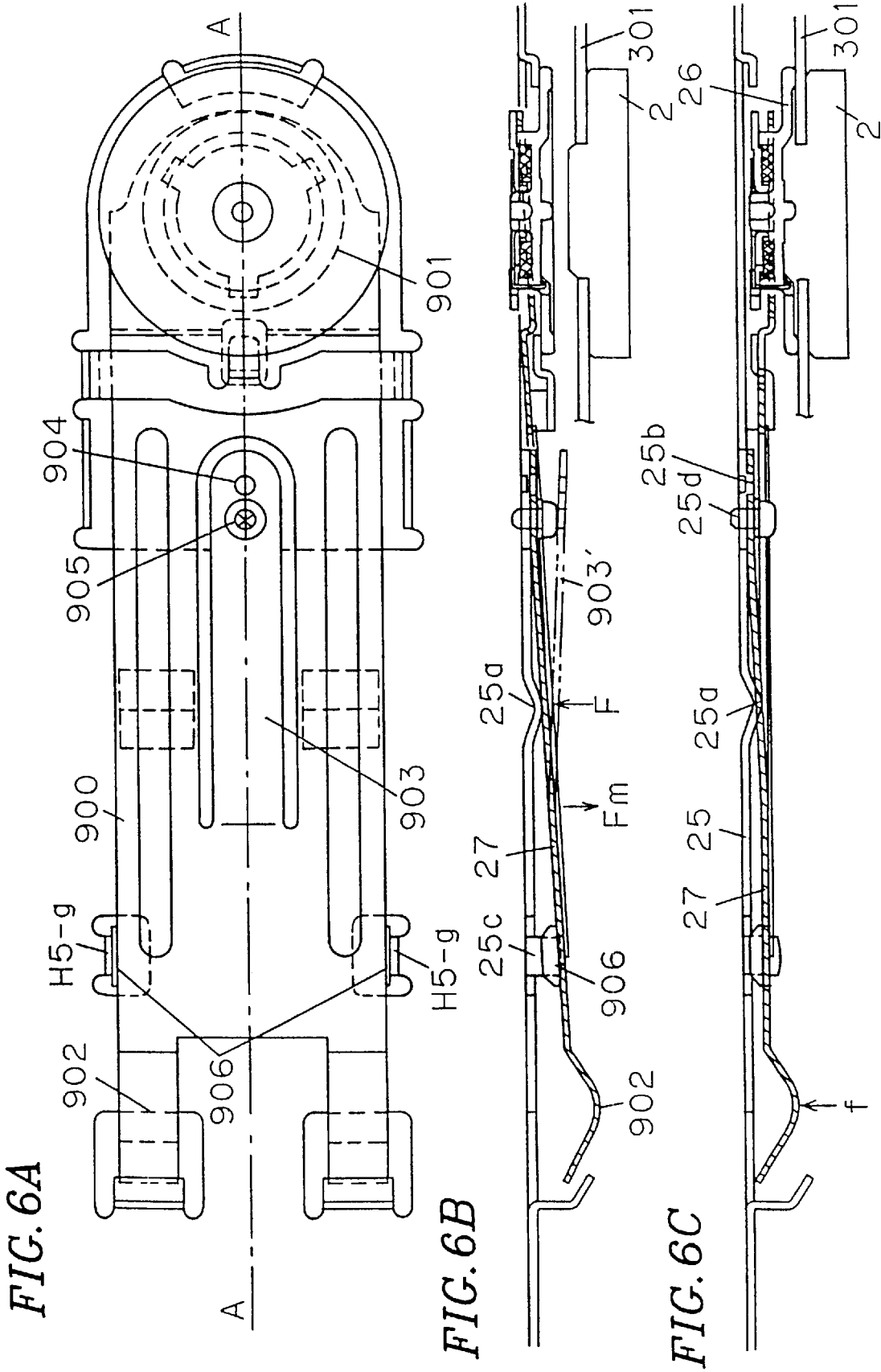
FIG. 6A is a plan view of a disk clamp mechanism of the disk loading device of the embodiment.
FIGS. 6B and 6C are elevational sectional views of the disk clamp mechanism when a clamp is not mounted and when a clamp has been mounted, respectively.

FIG. 6A is a plan view of a disk clamp mechanism according to the present invention. FIGS. 6B and 6C are elevational sectional views of the disk clamp mechanism when a clamp is not mounted and when the clamp has been mounted, respectively.

Referring to FIGS. 6A to 6C, the large disk 301, the disk motor 2, and the clamp 26 are shown. The top board 25 has a supporting point 25a around which the clamp lever 27 rotates to move the clamp 26 upward and downward (see FIGS. 6B and 6C).

The top board 25 also has a reference pin 25b and a folding 25c for regulating the rotation of the clamp lever 27. An opening 901 is formed at the top end of the clamp lever 27 for receiving the clamp 26, while an action site 902 for generating a force f for rotating the clamp lever 27 is formed at the opposite end. A cantilever elastic plate spring 903 is formed by cutting the clamp lever 27 into a strip shape extending from the supporting point 25a toward the clamp 26. A standard hole 904 and a threaded hole 905 are formed at the top end of the cantilever elastic plate spring 903 so as to be fixed to the top board 25 with a screw. Other fixing methods such as welding may be employed.

A width-regulating folding 906 engages with the folding 25c of the top board 25 for regulating the rotation of the clamp lever.

The initial state of the cantilever elastic plate spring 903 is shown by the two-dot chain line in FIG. 6B as the numeral reference 903'. This initial bending of the cantilever elastic plate spring 903 generates a pressing force F toward the top board 25 and a return spring force Fm.

Figure 7:
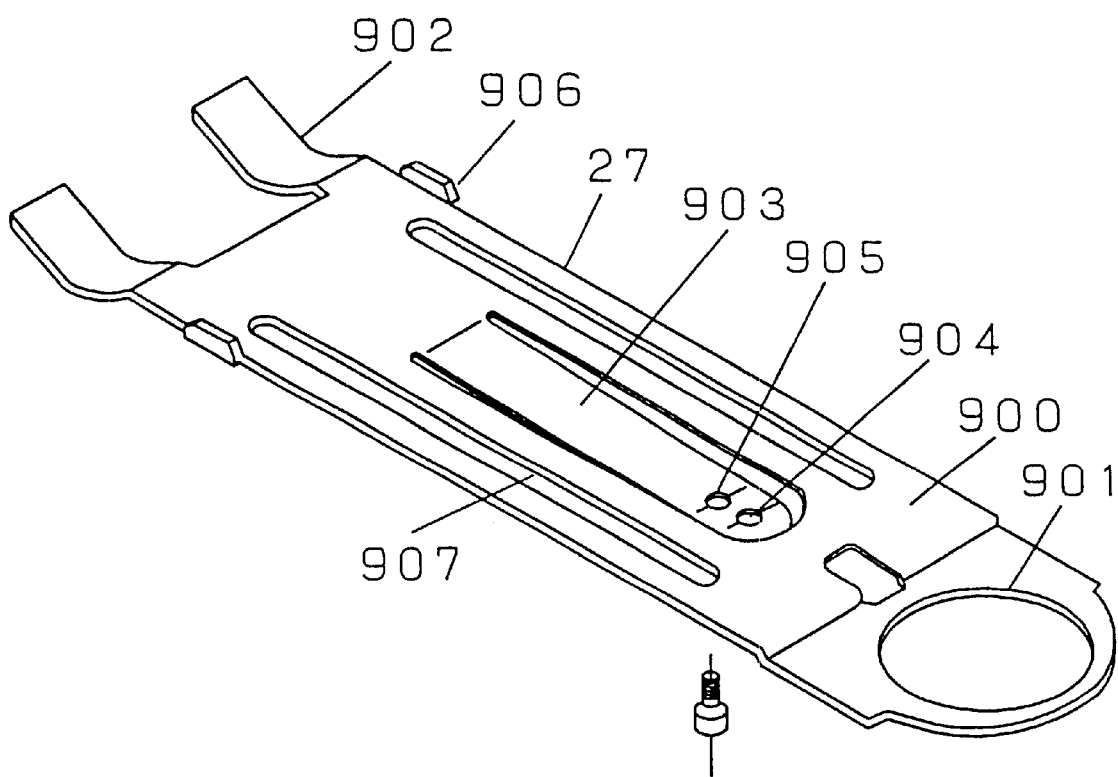
FIG. 7 is a perspective view of a clamp lever of the disk clamp mechanism of FIGS. 6A to 6C.

FIG. 7 is a perspective view of the clamp lever 27, which is disposed so as to be located inside the open window which appears when the shutter 300a of the cartridge 300 opens. This allows the disk loading device to be made thin.

Figure 8A:
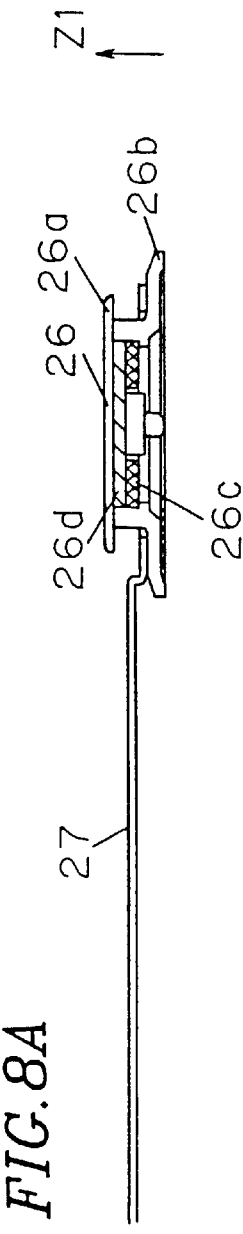
FIGS. 8A to 8C are views for illustrating the operation of the disk clamp mechanism of FIGS. 6A to 6C.

FIG. 8A shows the construction of the clamp 26. A magnet 26c and a magnetic body 26d are incorporated in a clamper 26b which is placed inside the center hole of the clamp lever 27 made of a magnetic material, and are fixed with a clamp cover 26a. Under this state, the clamp 26 magnetically levitates in the direction where the magnetic body 26d and the clamp lever 27 are away from each other with respect to the magnet 26d as the magnetically stable state with the clamp lever 27.

Figure 8B:
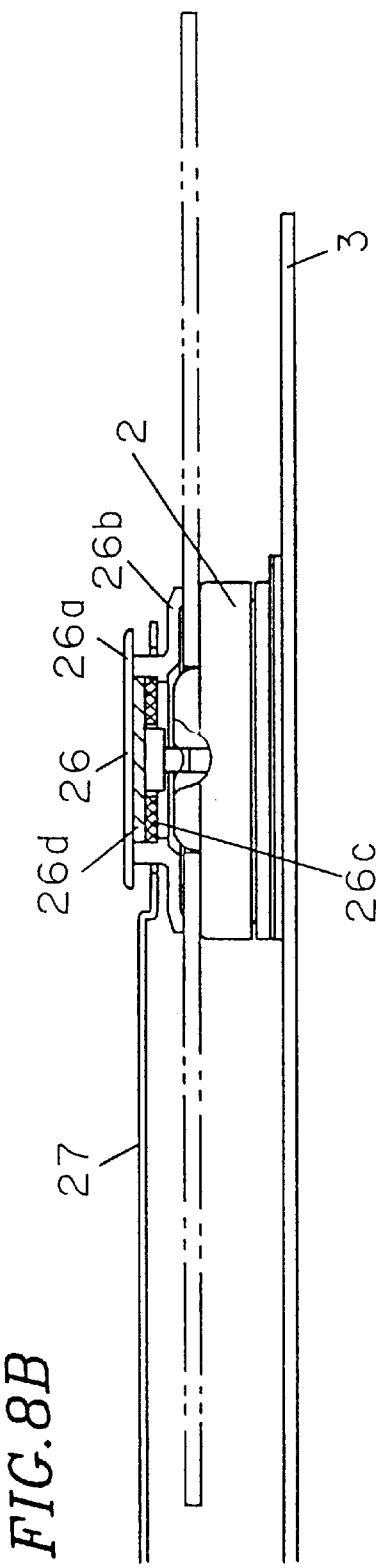

FIG. 8B shows the case where the disk motor 2 is located near the clamp 26. In this case, the clamp 26 is attracted to a magnetic body of the disk motor 2, cancelling the magnetic levitation between the clamp 26 and the clamp lever 27. When a disk is loaded, the clamp 26 forces the disk to magnetically attach to the turntable on the disk motor 2.

Figure 8C:
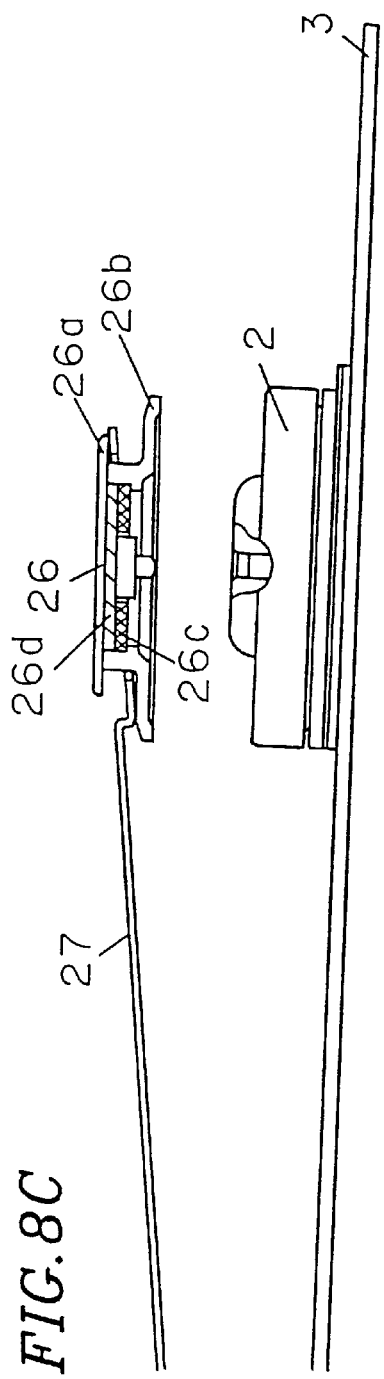

FIG. 8C shows the case where the disk motor 2 having a magnetic body is not located near the clamp 26. In this case, the clamp 26 magnetically levitates in the direction away from the disk motor 2 as the magnetically stable state with the clamp lever 27.

(Construction of Base Section)

FIGS. 9A and 9B are a plan view and a side sectional view, respectively, of the base section of the disk loading device according to the present invention.

Referring to FIG. 9A, a housing 1 of the disk loading device includes a printed board 20 with circuit components for recording/reproduction provided thereon, a panel 21, and a shutter 22 for blocking a front opening 21a of the housing 1 when the holder 100 is loaded.

The panel 21 includes buttons (not shown) for loading and unloading the holder 100 and a hole (not shown) for forced ejection for retrieving the cartridge 300 or the naked disk (the large disk 301 or the small disk 302) when the device is not powered.

The base 8 is elastically supported to the housing 1 via a damper 9 for damping vibration and shock from outside. A torsion leaf 11 is fixed to the chassis 3 and is attached to the base 8 so that a top end 3a of the chassis 3 is always urged toward direction Z2.

A lift cam 10 is rotatably supported with an axis 8a of the base 8. When the lift cam 10 is rotated in direction R1 by a driving means composed of the decelerating device (gear wheel array) 112 and the loading motor 111 disposed in the holder 100, a slant rib 10a of the lift cam 10 engages with a slit 3b of the chassis 3, to press the top end 3a of the chassis 3 upward against the spring urging force of the torsion leaf 11 and thus to make the chassis 3 substantially horizontal. At this time, the chassis 3 is supported by the horizontal surface at the end of the slant rib 10a. On the contrary, when the lift cam 10 is rotated in direction R2, the chassis 3 is slanted in direction Z2 from the horizontal position by the spring urging force of the torsion leaf 11. A head unit urging spring (not shown) is disposed between the lift cam 10 and the base 8 to urge the holder 100 toward the top board 25 via the chassis 3.

The slide rack 13 has a rack-shaped upper surface 13a which engages with the driving gear wheel 112a, a groove 13b which engages with a projection 8b of the base 8 so as to be held by the base 8 slidably in directions X1–X2, and a groove 13c which engages with a pin 10b of the lift cam 10. When a claw 12c of a clutch 12 engages with a projection 8c of the base 8 to fix the slide rack 13, the holder 100 is free to move. When the engagement between the claw 12c of the clutch 12 and the projection 8c of the base 8 is released, the slide rack 13 slides to allow the lift cam 10 to rotate. A slant rib 10a of the lift cam 10 abuts against a drive detection switch 23b upon completion of the loading operation at which the holder 100 has completely retracted and the chassis 3 is substantially horizontal. This causes a main processing unit (MPU) to instruct the driving means to stop the operation.

A forced eject lever 14 is urged by a forced eject spring 15 in direction X1 and held between the base 8 and the slide rack 13 slidably in directions X1–X2. The forced eject lever 14 has a claw 14a which engages with an engaging portion 100c formed on the back surface of the holder 100. In the case where a medium loaded in the holder 100 located inside the device is retrieved when the device is not powered such as at a power failure, a pin is inserted in direction X2 through a forced eject hole (not shown) provided at the panel 21. When the forced eject spring 15 is compressed using the pin, the claw 14a is made engaged with the engaging portion 100c of the back surface of the holder 100. When the forced eject spring 15 is released, the holder 100 engaging with the claw 14a is ejected from the device by the elastic force of the forced eject spring 15. Then, by manually pulling out the holder 100 to the eject completion position, the cartridge 300 or a naked disk placed in the holder 100 can be retrieved.

A disk regulating member 29 is composed of a roller 29a made of a rubber having a hardness lower than polycarbonate (PC), a disk base material, and a coil spring 29b (shown in FIGS. 20A to 20D and 25A to 25D). The disk regulating member 29 comes into contact with the naked disk placed in the holder 100 or the disk 300e in the cartridge 300 during the movement of the holder 100 from the eject completion position to the retract completion position, to regulate the posture of the disk so that the disk is substantially parallel to the chassis 3 which is in the slant state urged toward the base 8. Thus, contact between the disk and the turntable 2a on the chassis 3 is prevented. Upon completion of the retract of the holder 100 in the disk loading device, the back surface 100d of the holder 100 abuts against the roller 29a, to cause the disk regulating member 29 to be pressed into the base 8, releasing the regulation of the disk by the disk regulating member 29.

The base 8 also includes the clutch 12 which switches the movement of the slide rack 13, and a drive detection circuit board 23 having a switch 23a for detecting the completion of the ejection of the holder 100 and a switch 23b for detecting the completion of the retraction of the holder 100.

On the chassis 3 are mounted the disk motor 2 integrally formed with the turntable 2a, guide shafts 6, a motor 5, a cartridge detection circuit board 18 elastically supported via a switch circuit board support 17, and a pin 16 for positioning the cartridge. A magnetic body (not shown) is provided on the surface of the turntable 2a which faces the clamp 26, to generate an attraction force with the magnet in the clamp 26.

A head transport lever 4 is disposed on the guide shaft 6 so that it is movable in directions X1–X2 with respect to the chassis 3 and can abut against the optical head 7 at one end and the forced eject lever 14 at the other end.

The optical head 7 is reciprocated in directions X1–X2 by the motor 5 attached to the guide shaft 6. The optical head 7 has a laser light emitting portion for recording/reproduction and a light receiving portion for receiving reflected light from the disk (300e, 301, or 302).

The clamp 26 attached to the top board 25 has a magnet which forces the disk to adsorb to the turntable 2a. The clamp 26 is urged in a direction away from the turntable 2a by a clamp pressing spring 28 via the clamp lever 27 which projects toward the holder 100 from the top board 25. The top board 25 is attached to the base 8 by a fixing means such as a stop claw. When the holder 100 has retracted from the eject completion position to the retract completion position, the clamp lever 27 is pressed by an operation piece 101a of the holder 100, to cause the clamp 26 to rotate against the force of the clamp pressing spring 28 and thus press the disk against the center cone of the turntable 2a. On the contrary, when the holder 100 starts to move toward the eject completion position, the operation piece 101a moves away from the clamp lever 27. As a result, the clamp 26 moves away from the turntable 2a.

The clamp 26 is unnecessary if the disk includes a magnetic metal hub and the turntable 2a includes a magnet so that the disk is held on the turntable by the adsorption of the metal hub to the magnet. In this way, different mechanisms should be provided depending on the methods employed.

Figure 10:
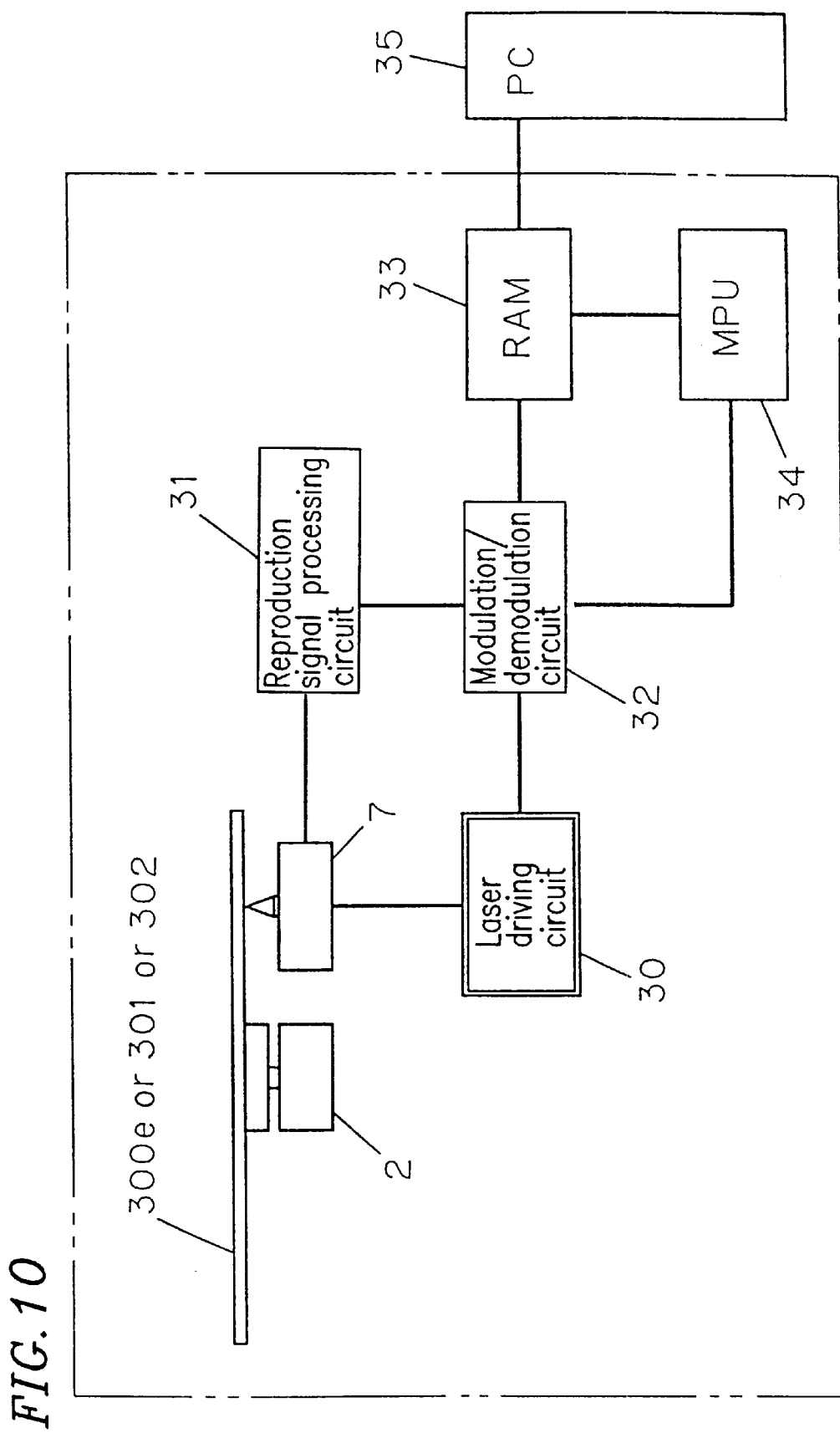
FIG. 10 is a block diagram of a recording/reproduction device used together with the disk loading device of the embodiment.

FIG. 10 is a block diagram of a recording/reproduction device used together with the disk loading device of this embodiment. The recording/reproduction device is installed on the chassis 3 and the circuit board 20.

In this recording/reproduction device, a laser driving circuit 30 controls the optical head 7 so that the disk (300e, 301, or 302) can be irradiated with laser light from the optical head 7 and a signal from the disk can be received by a light receiving portion of the optical head 7. The output of the optical head 7 is processed by a reproduction signal processing circuit 31, and the output of the reproduction signal processing circuit 31 is demodulated by a modulation/demodulation circuit 32. Data obtained by this demodulation is output to an external personal computer 35 via a memory 33. When receiving data from the external personal computer 35 via the memory 33, the modulation/demodulation circuit 32 modulates the data and supplies the modulated data to the laser driving circuit 30. The laser driving circuit 30 controls the optical head 7 so that the disk (300e, 301, or 302) can be irradiated with laser light from the optical head 7 so that the modulated data can be recorded on the disk. A main processing unit (MPU) 34 controls the entire recording/reproduction device.

Figure 11:
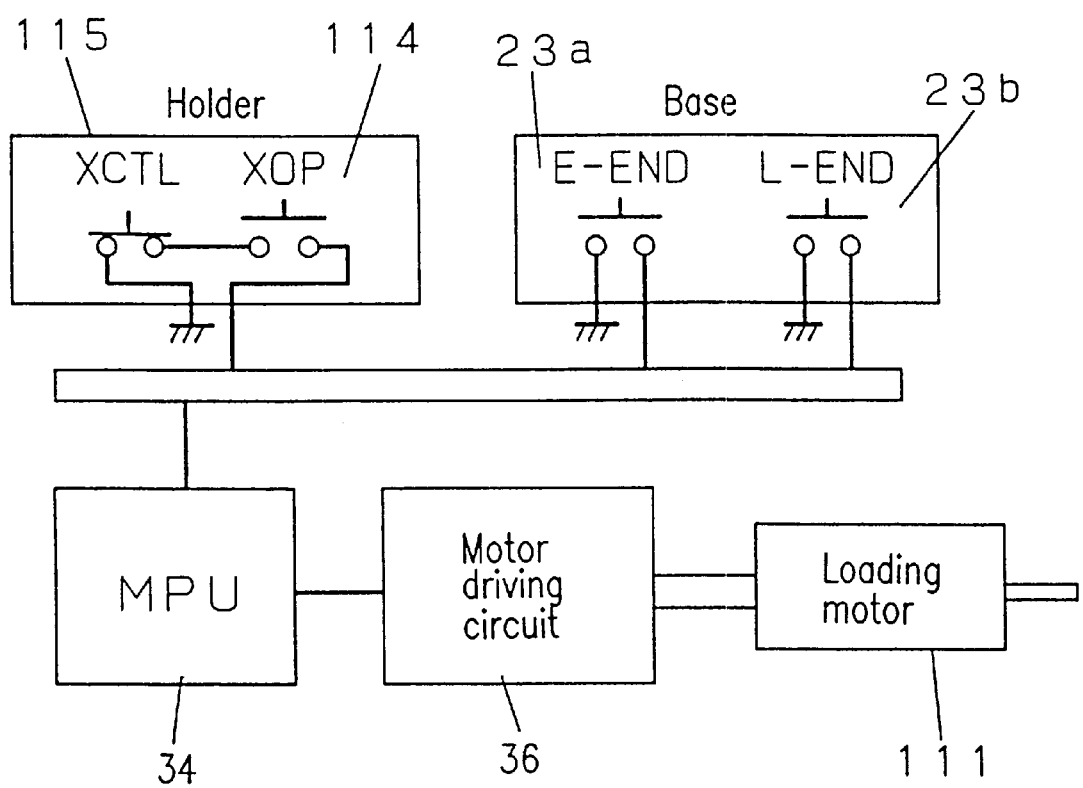
FIG. 11 is a wiring diagram of switches of the disk loading device of the embodiment.

FIG. 11 is a structural view showing the wiring of the switches provided on the holder 100 and the base 8.

The switches 114 and 115 of the holder 100 are connected in series and monitored by the MPU 34 together with the switches 23a and 23b of the base 8. The switches 114 and 115 operate only when the holder 100 is in the eject completion position (i.e., when the switch 23a is in the ON state).

More specifically, when a naked disk is inserted in the holder 100 and the switch 114 is turned to the ON state by the shutter opener 103, the MPU 34 drives and controls the loading motor 111 via a motor driving circuit 36.

When a cartridge is inserted, first, the inlet levers 107 are rotated and the switch 115 is turned to the OFF state via the coupling plate 108. Accordingly, the loading motor 111 will not be driven even if the switch 114 is turned to the ON state by the shutter opener 103 during the insertion of the cartridge.

(Operation of Disk Loading Device)

The operation of the disk loading device with the above construction will be described.

Figure 12A:
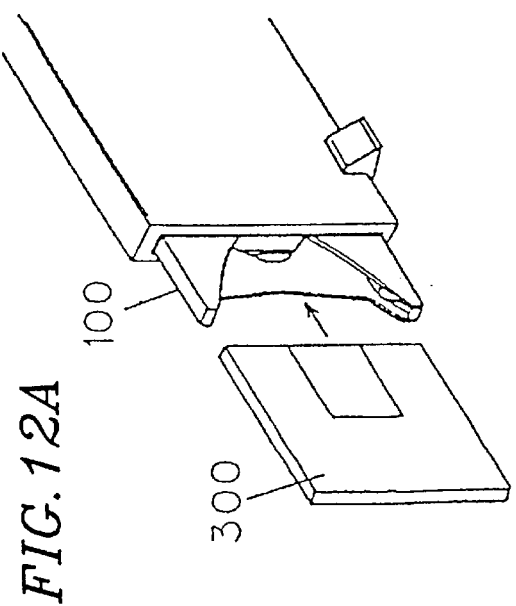
FIGS. 12A to 12D are perspective views illustrating the insertion of a medium into the disk loading device of the embodiment.
Figure 12C:
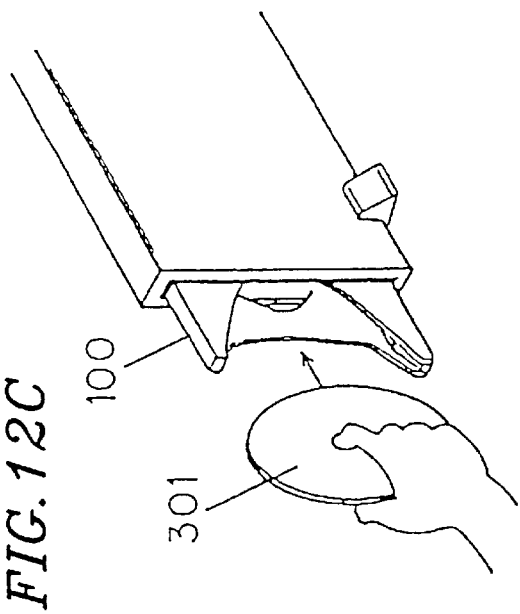
Figure 12B:
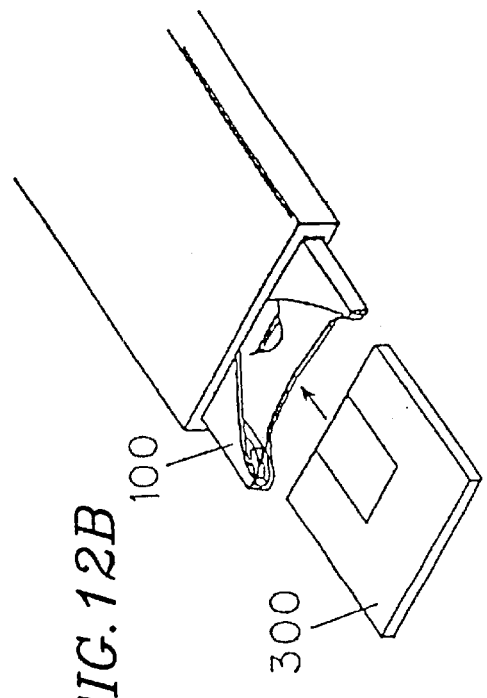
Figure 12D:
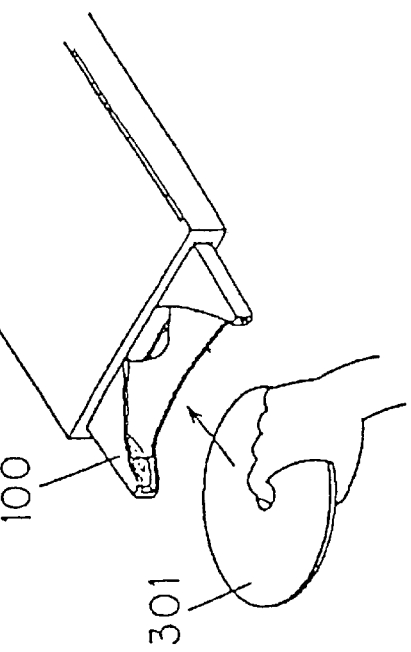

FIGS. 12A to 12D are perspective views illustrating how a medium is inserted into the disk loading device. With the above-described construction of the holder 100, the loading mechanism of this embodiment can be installed vertically or horizontally. FIGS. 12A and 12B show the insertion of a cartridge, while FIGS. 12C and 12D show the insertion of a large disk.

The loading operation as used herein refers to the operation which is schematically described as follows. When a button provided on the front side of the device is pressed, the holder 100 is ejected to the position shown in FIGS. 12A to 12D, which is in the standby state for the insertion of a medium. Under this state, when the button is pressed again or the holder 100 is pushed, the holder 100 retracts into the device.

(I) Loading Operation with No Medium in the Holder

FIGS. 13A, 13B, 14A, 14B, 15A, and 15B are plan views of the disk loading device for illustrating the loading operation when no medium is present in the holder 100, showing time-sequential operational states of the device. FIGS. 16A, 16B, 16C, 17A, 17B, and 17C are partial plan views showing the upper portions of FIGS. 13A, 13B, 14A, 14B, 15A, and 15B in detail, respectively. FIGS. 18A, 18B, 18C, 19A, 19B, and 19C are partial plan views showing the lower portions of FIGS. 13A, 13B, 14A, 14B, 15A, and 15B in detail, respectively. FIGS. 20A to 20D are side sectional views of the disk loading device when no medium is present in the holder 100, showing time-sequential operational states of the device.

Figure 13A:
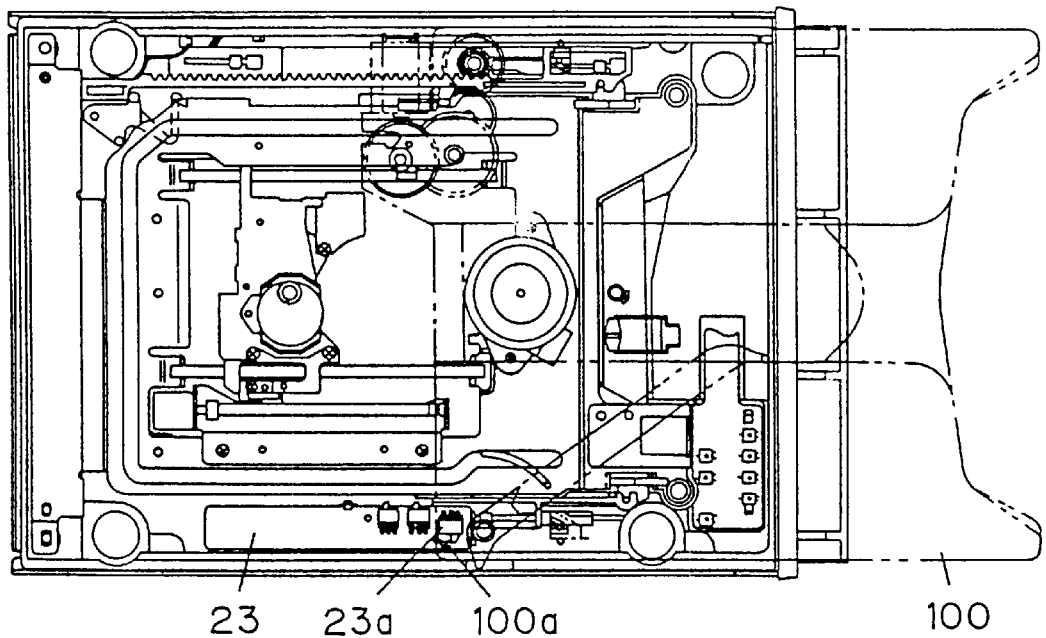
FIGS. 13A and 13B are plan views illustrating the loading operation of the disk loading device of the embodiment.
Figure 16A:
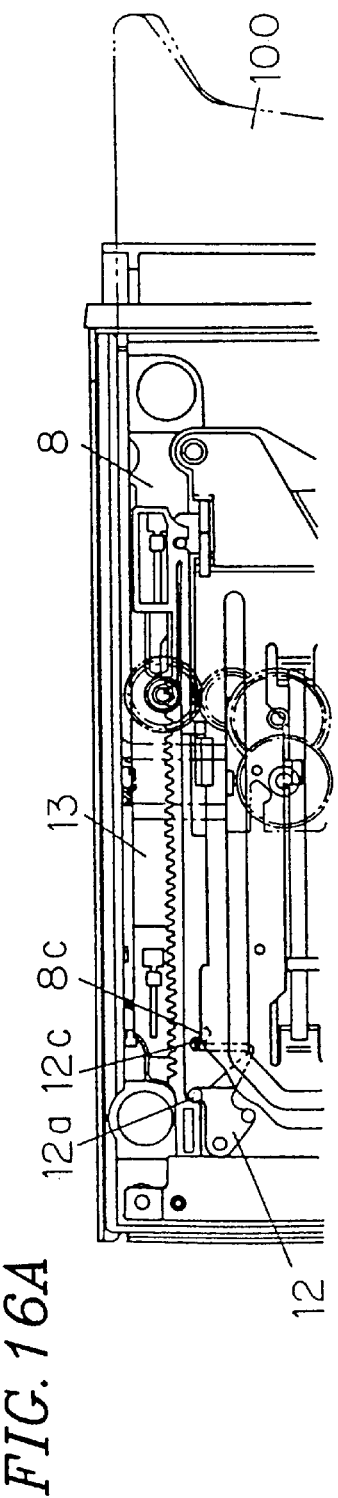
FIGS. 16A to 16C are partial plan views showing the upper portions of FIGS. 13A, 13B, and 14A in detail, respectively, for illustrating the loading operation of the disk loading device of the embodiment.
Figure 18A:
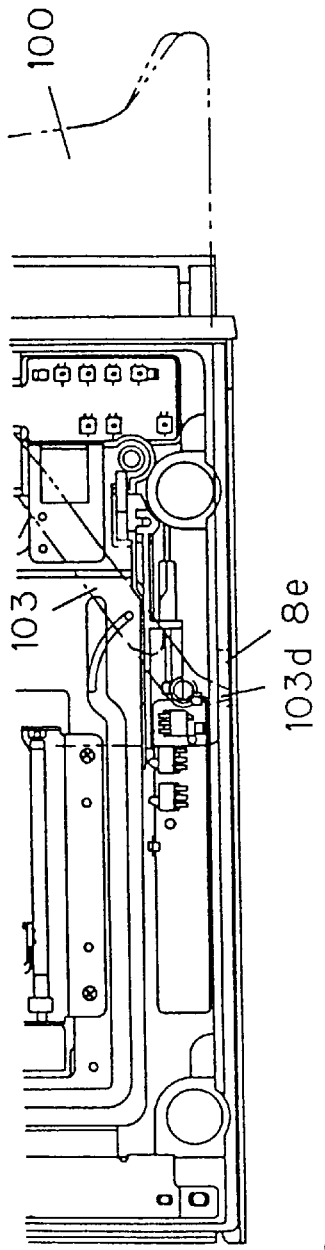
FIGS. 18A to 18C are partial plan views showing the lower portions of FIGS. 13A, 13B, and 14A in detail, respectively, for illustrating the loading operation of the disk loading device of the embodiment.

FIG. 13A shows the state where the holder 100 is in the eject completion state. The projection 100a formed on the back surface of the holder 100 abuts against the switch 23a on the drive detection switch circuit board 23, and the holder 100 stops at the eject completion position accurately. In this state, either a naked disk or a cartridge is selectively placed on the holder 100. In this state, as shown in FIG. 16A, the claw 12c of the clutch 12 engages with the projection 8c of the base 8 to cause a boss 12a of the clutch 12 to regulate the sliding of the slide rack 13, fixing the slide rack 13 to the base 8. As shown in FIG. 18A, the projection 103d of the shutter opener 103 is rotatable by entering the escape hole 8e at the side face of the base 8. When the cartridge 300 is inserted into the holder 100, the shutter opener 103 rotates as the cartridge 300 is further inserted, thereby opening the shutter 300a.

In this state, as shown in FIG. 20A, the chassis 3 is urged toward the base 8 in the slant state, and the clamp 26 is being pressed against the top board 25 by the urging force of the clamp pressing spring 28 via the clamp lever 27. The cartridge detection circuit board 18 is pressed against the bottom surface of the base 8 by the urging force of the switch circuit board support 17. The disk regulating member 29 is lifted toward the center opening of the holder 100 from the base 8 by the return force of the coil spring 29b.

Figure 13B:
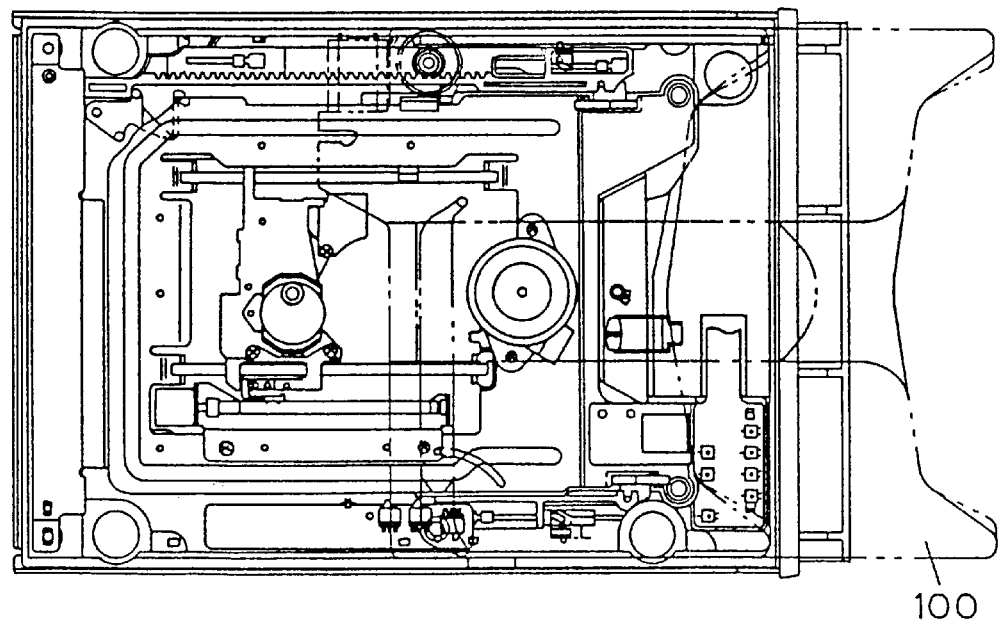
Figure 16B:
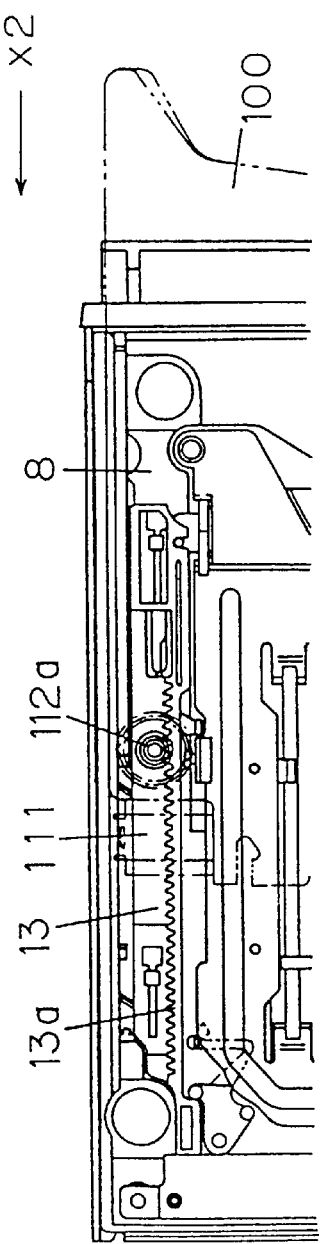
Figure 16C:
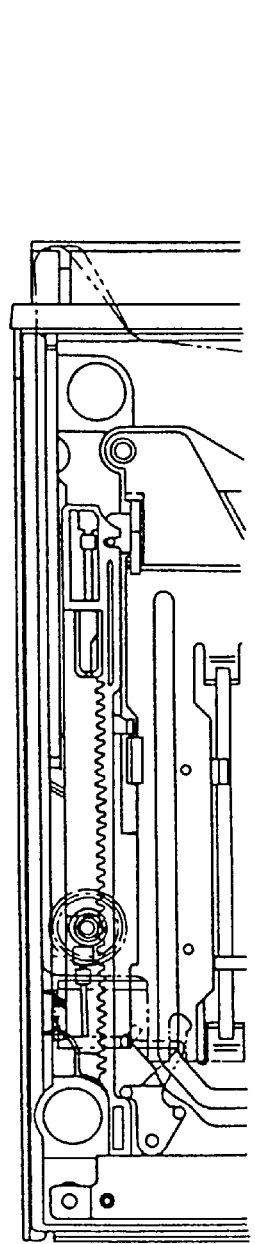
Figure 18B:
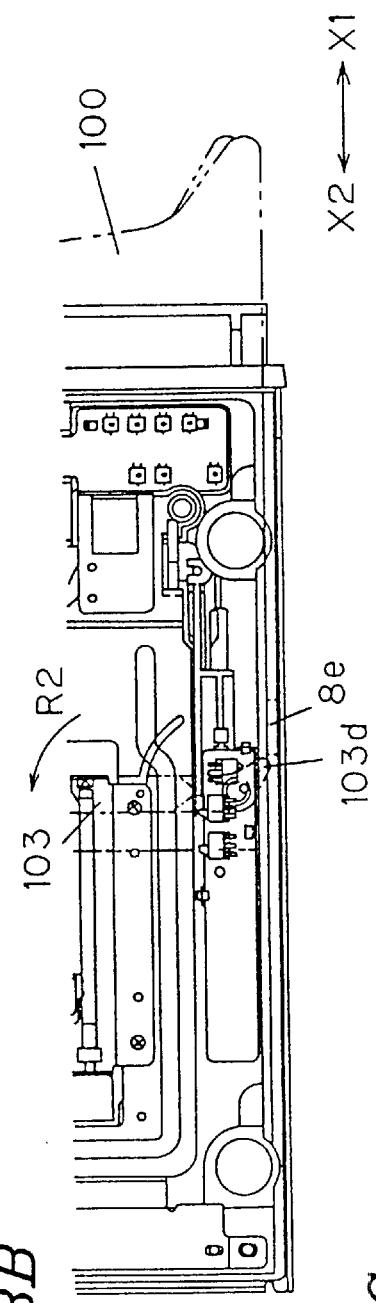
Figure 18C:
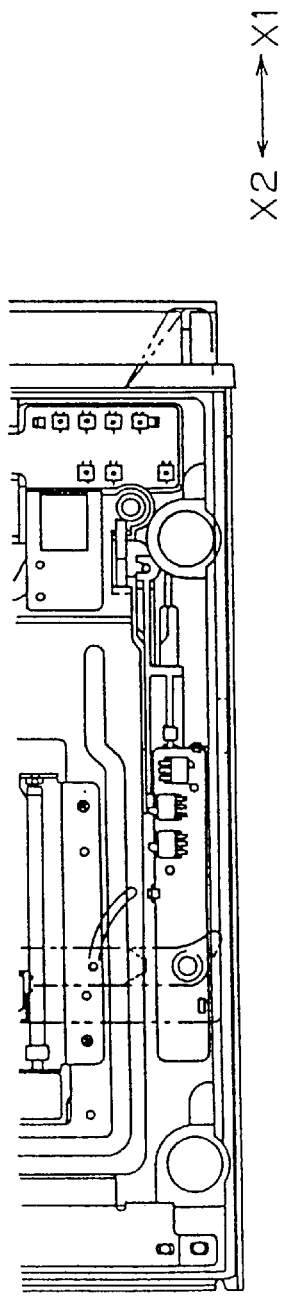
Figure 19A:
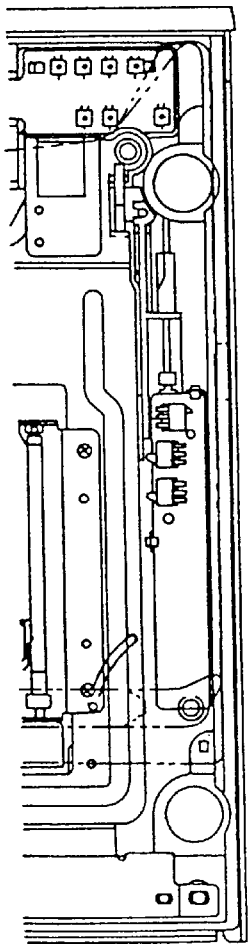
FIGS. 19A to 19C are partial plan views showing the lower portions of FIGS. 14B, 15A, and 15B in detail, respectively, for illustrating the loading operation of the disk loading device of the embodiment.
Figure 19B:
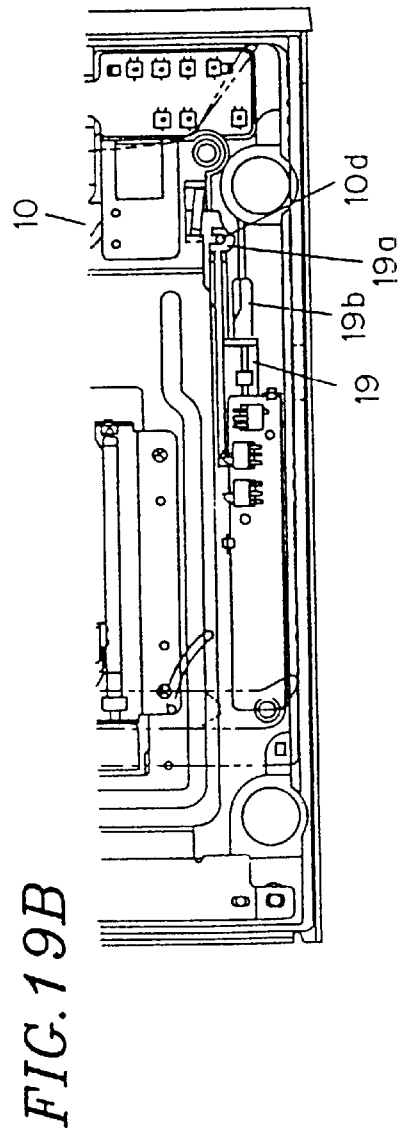
Figure 19C:
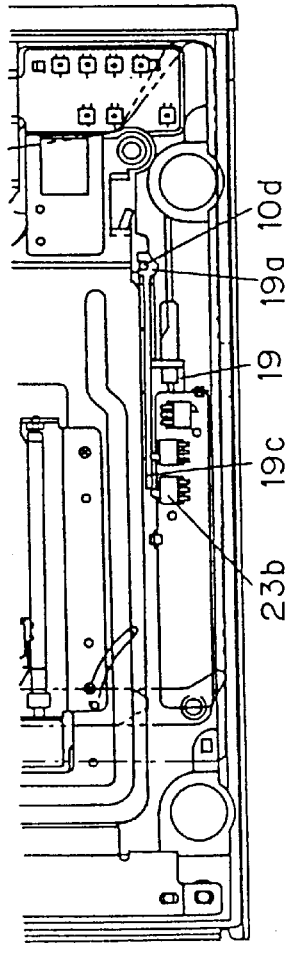

FIG. 13B shows the state where the holder 100 starts to retract. As shown in FIG. 16B, when a button (not shown) on the panel 21 is pressed, the loading motor 111 in the holder 100 starts to rotate, and the driving force is transmitted to the driving gear wheel 112a of the gear wheel array 112, the gear wheel 112a engages with the rack-shaped surface 13a of the slide rack 13 fixed to the base 8, to allow the holder 100 to start the movement in direction X2. At this time, as shown in FIG. 18B, the projection 103d of the shutter opener 103 rotates away from the escape hole 8e at the side wall of the base 8 in direction R2 to a position where the shutter opener 103 does not interfere with the large disk 301 when the large disk 301 is loaded or when no medium is loaded. In this state, as shown in FIG. 20B, the holder 100 gradually retracts into the device.

Figure 14A:
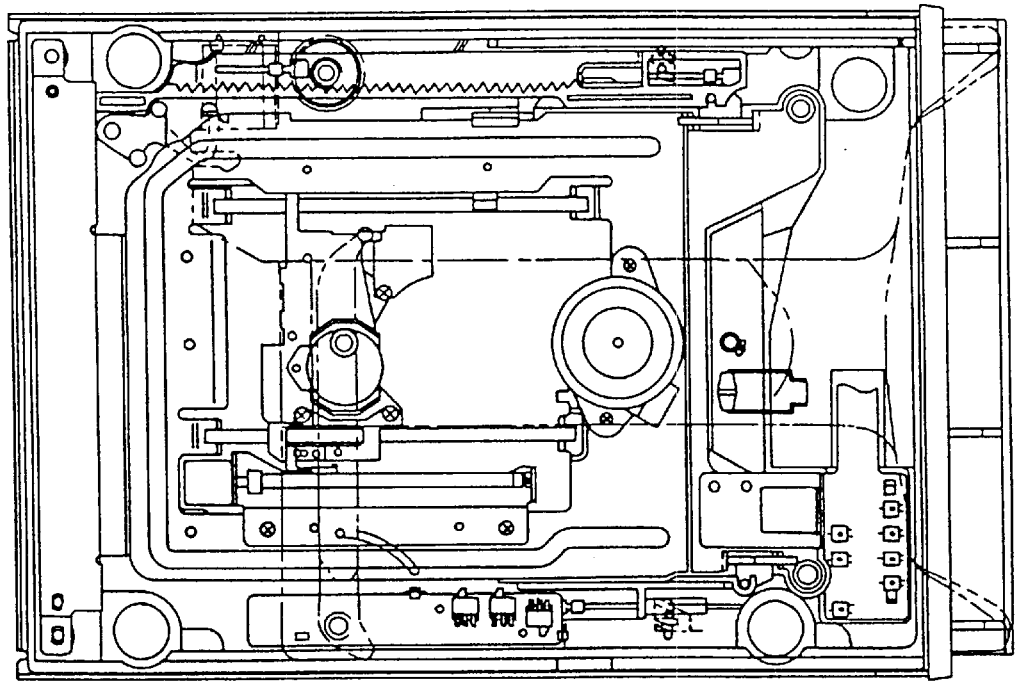
FIGS. 14A and 14B are plan views illustrating the loading operation of the disk loading device of the embodiment.

FIG. 14A shows the state where the holder 100 further retracts into the disk loading device.

Figure 14B:
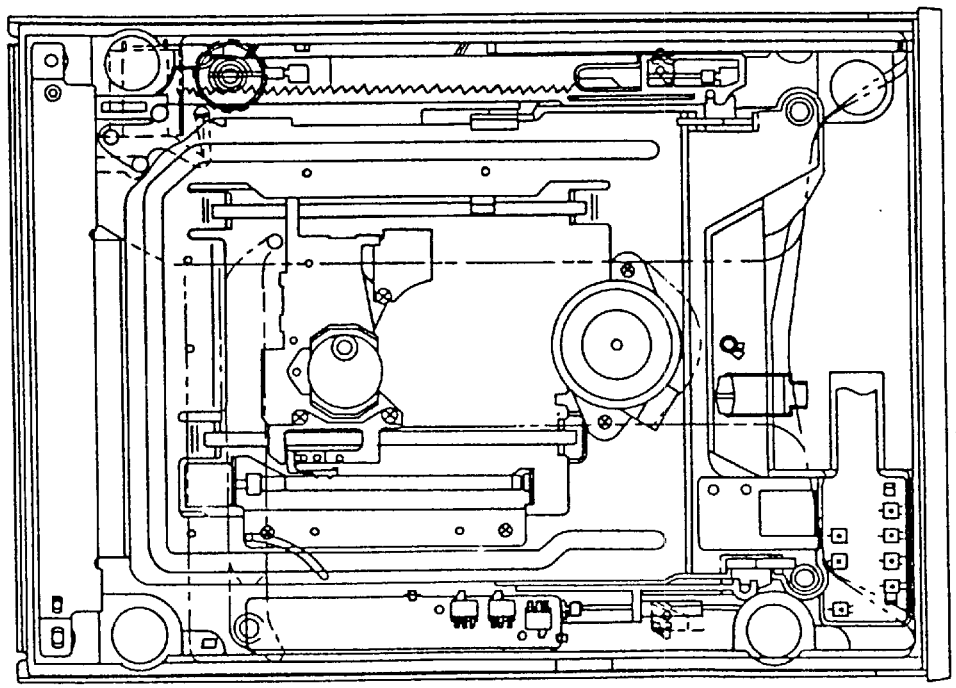
Figure 17A:
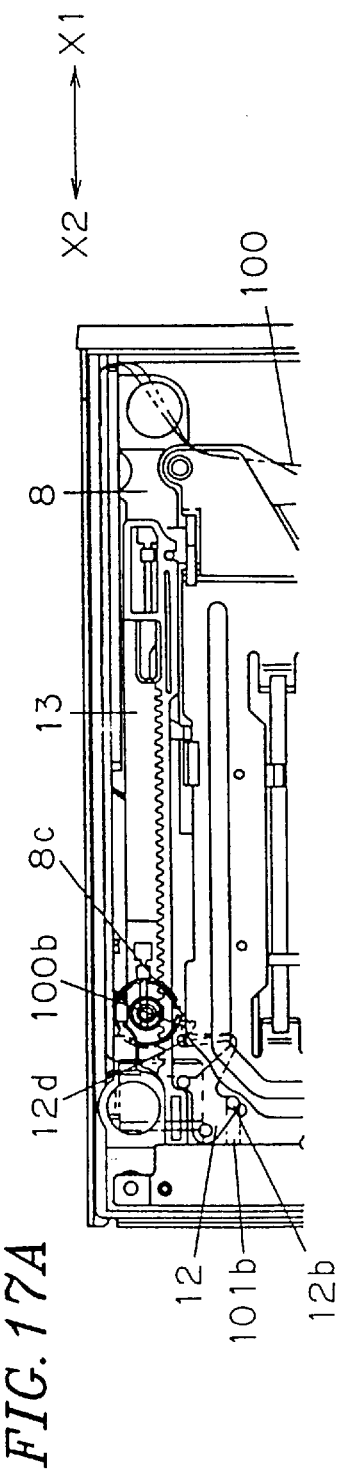
FIGS. 17A to 17C are partial plan views showing the upper portions of FIGS. 14B, 15A, and 15B in detail, respectively, for illustrating the loading operation of the disk loading device of the embodiment.

FIG. 14B shows the state where the holder 100 has completely retracted in the disk loading device. As shown in FIG. 17A, the projection 100b on the back surface of the holder 100 abuts against the claw 12d of the clutch 12 to release the engagement with the projection 8c of the base 8. This releases the restriction of the slide rack 13 by the clutch 12 to allow the slide rack 13 to slide in direction X1.

At the same time, as shown in FIG. 17A, an elongate hole 101b of the holder 100 engages with a boss 12b of the clutch 12. Under this state, as shown in FIG. 20C, the operation piece 101a of the holder 100 abuts against an end 27a of the clamp lever 27, causing the clamp lever 27 to rotate around the clamp pressing spring 28 and thus the clamp 26 to move downward to a position facing the turntable 2a. The roller 29a of the disk regulating member 29 abuts against the back surface 100d of the holder 100, so that the disk regulating member 29 retracts in the base 8.

Figure 15A:
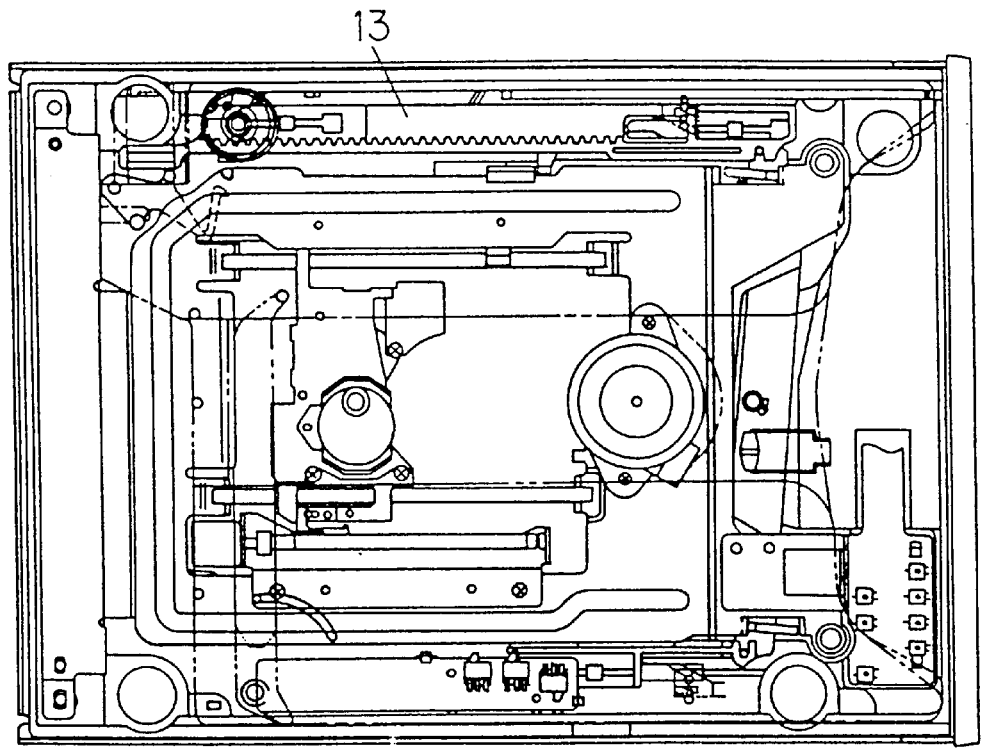
FIGS. 15A and 15B are plan views illustrating the loading operation of the disk loading device of the embodiment.
Figure 17B:
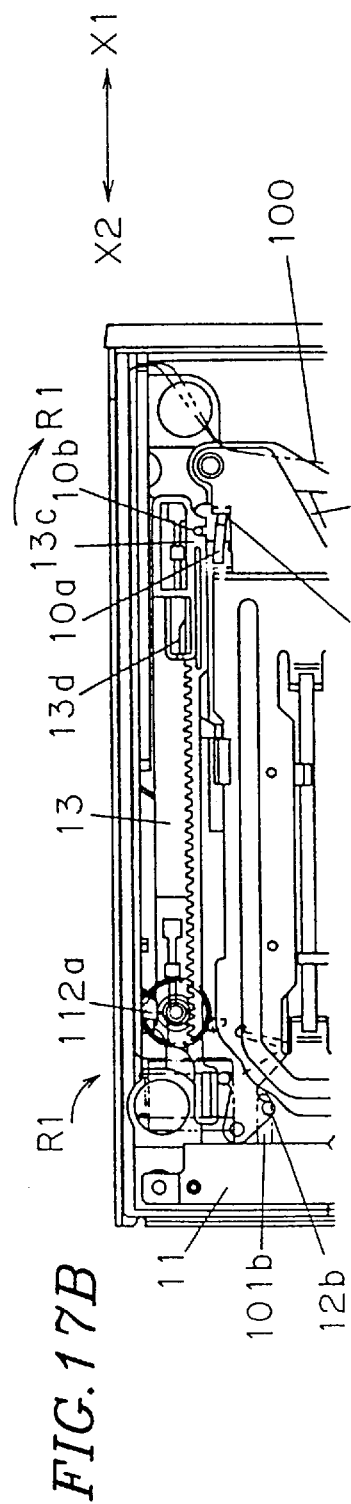

FIG. 15A shows the operation of the slide rack 13 after the holder 100 has completely retracted in the disk loading device. As shown in FIG. 17B, the slide rack 13 slides in direction X1 by the driving force of the driving gear wheel 112a. This causes the clutch 12 to disengage from the slide rack 13 and the boss 12b of the clutch 12 to rotate in direction R1 in the elongate hole 101b, thereby regulating the movement of the holder 100 in direction X2. Thus, the holder 100 is held at a predetermined position. With the movement of the slide rack 13 in direction X1, the lift cam 10 of which boss 10b engages with the groove 13c of the slide rack 13 rotates in direction R1 around the axis 8a of the base 8. With this rotation of the lift cam 10, the chassis 3 abuts against the slant rib 10a of the lift cam 10 at the slit 3b thereof, and is gradually made horizontal from the slant state thereof, with the rotation of the lift cam 10 against the urging force of the torsion leaf 11.

Figure 15B:
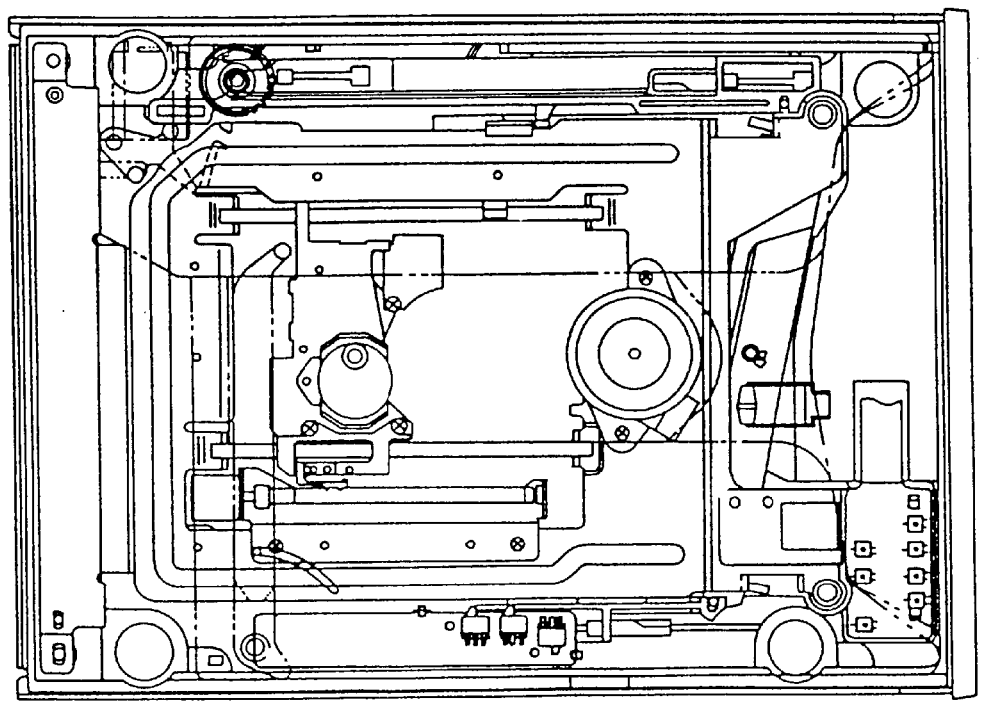
Figure 17C:
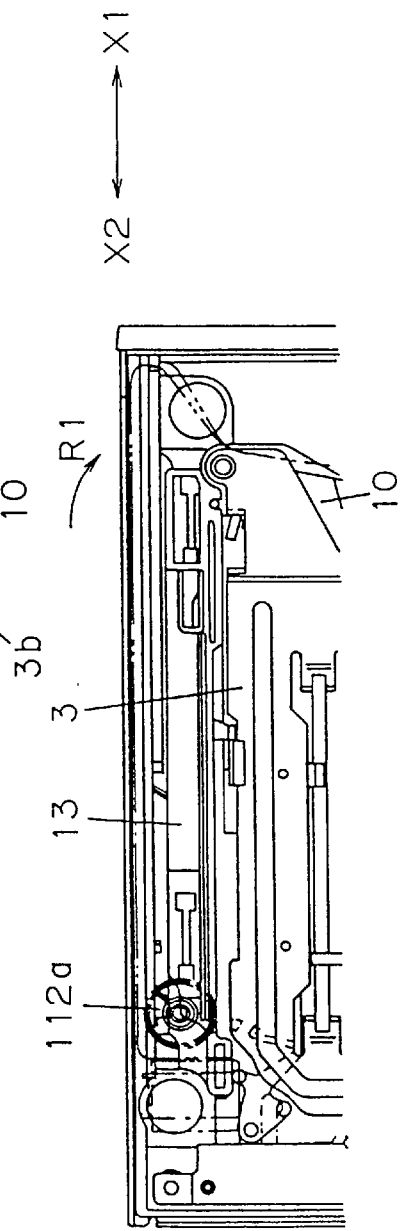

FIG. 15B shows the state where the slide rack 13 has completed the sliding. As shown in FIG. 17C, when the sliding of the slide rack 13 in direction X1 by the driving force of the driving gear wheel 112a has been completed, the chassis 3 rides on the horizontal surface of the slant rib 10a as the lift cam 10 rotates in direction R1, putting the chassis 3 in the substantially horizontal state. When the loading operation is completed where the chassis 3 is substantially horizontal, the slant rib 10a of the lift cam 10 abuts against the drive detection switch 23b. This causes the MPU 34 to stop the loading motor 111. At this state, as shown in FIG. 20D, the turntable 2a on the chassis 3 which is now in the substantially horizontal state after the completion of the rotation moves upward to a position facing the clamp 26. The cartridge detection circuit board 18 is lifted from the base 8 by the return force of the switch circuit board support 17 up to a predetermined position inside the holder 100. In this way, the loading operation is completed.

The ejection of the holder 100 is performed in the procedure reverse to the operation described above. When the loading motor 111 rotates in the direction reverse to the above direction, the slide rack 13 slides in direction X2 to rotate the lift cam 10 in direction R2 and the chassis 3 rotates in direction Z2. When the sliding of the slide rack 13 in direction X2 is completed, the holder 100 starts the movement in direction X1 by the driving force of the driving gear wheel 112a, and the boss 12b of the clutch 12 which has engaged with the elongate hole 101b of the holder 100 and restricted the movement of the holder 100 starts the rotation in direction R2. With the rotation of the clutch 12 in direction R2, the claw 12c of the clutch 12 engages with the boss 8b of the base 8, causing the slide rack 13 to be fixed to the base 8 via the boss 12a of the clutch 12. Then, the holder 100 is ejected from the disk loading device until the projection 100a on the back surface of the holder 100 abuts against the switch 23a of the drive detection circuit board 23, and stops at the holder eject completion position as shown in FIG. 13A.

(II) Loading Operation with a Cartridge Placed in the Holder

First, the operation of the insertion of the cartridge 300 into the ejected holder 100 will be described.

FIGS. 21A, 21B, 21C, 22A, and 22B are plan views illustrating the operation of the holder 100 when the cartridge 300 is inserted into the holder 100, showing time-sequential operational states of the holder 100. FIGS. 23A to 23E are enlarged views of the cartridge lock mechanism and the holder lock mechanism.

Figure 21A:
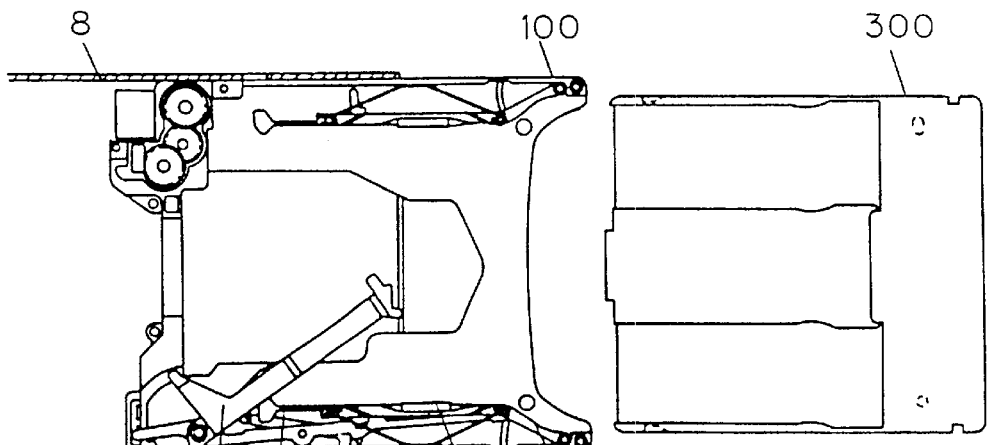
FIGS. 21A to 21C are plan views illustrating the operation of the holder at the insertion of a cartridge in the disk loading device of the embodiment.

FIG. 21A shows the standby state where the holder 100 has been completely ejected. The disk holders 104 are at their standby positions for holding the large disk 301. In this state, the switch 115 is in the ON state due to the action of the projection 108b of the coupling plate 108.

Figure 21B:
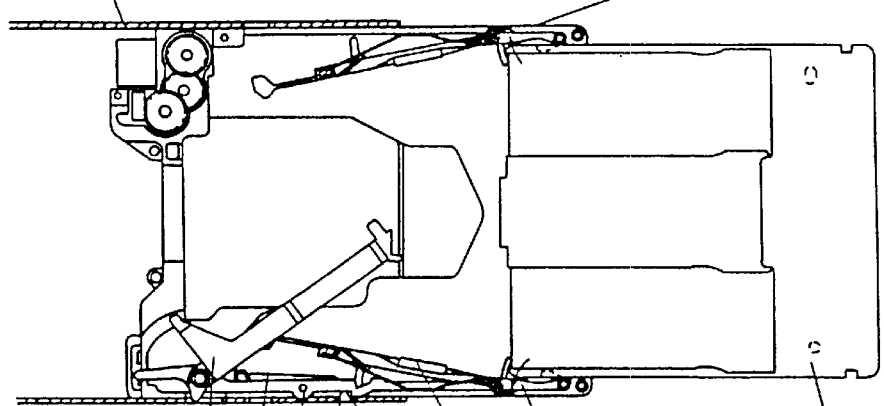

FIG. 21B shows the state where the cartridge 300 has been slightly inserted into the holder 100. The inlet levers 107 at the edges of the opening move outward by a light pressing force of the cartridge 300. In association with this movement, the coupling plate 108 and the holder lock 109 integrally rotate outward, causing the hook 109a of the holder lock 109 to engage with the escape hole 8g at the side wall of the base 8. Thus, the holder 100 is locked to be protected from entering the base 8. At the same time, the projection 108b of the coupling plate 108 moves away from the switch 115 which is then turned to the OFF state (see FIG. 23B).

Figure 21C:
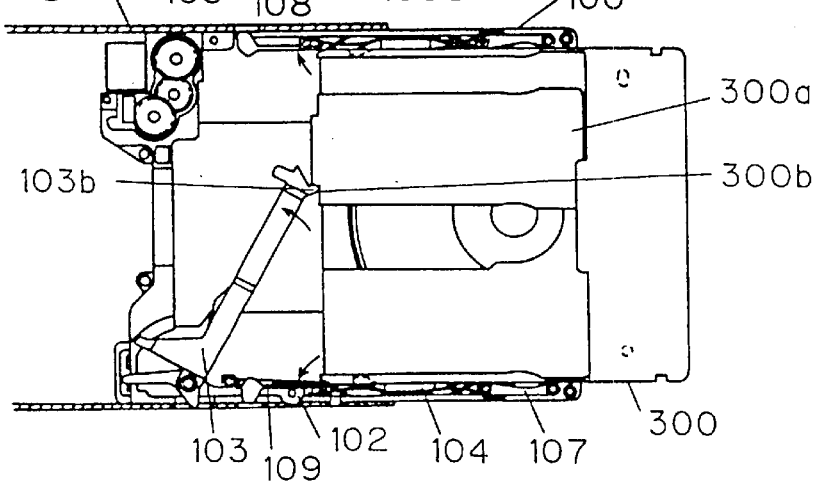

Referring to FIG. 21C, as the cartridge 300 is further inserted, the disk holders 104 also move outward. The top portion 103b of the shutter opener 103 abuts against the concave portion 300b of the cartridge shutter 300a, thereby opening the shutter 300a.

Figure 22A:
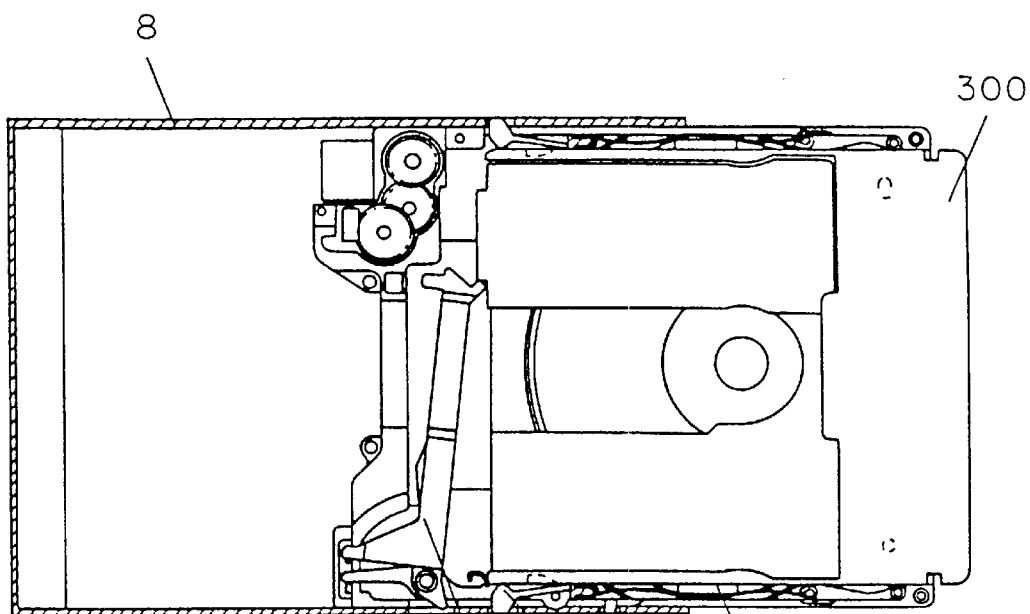
FIGS. 22A and 22B are plan views illustrating the operation of the holder at the insertion of a cartridge in the disk loading device of the embodiment.

Referring to FIG. 22A, when the top end of the cartridge 300 reaches the positions of the projections 104e of the disk holders 104, the projections 104e are pushed outward into holes 8h at the side walls of the base 8. When the opener projection 103e reaches the switch 114, the switch 114 turns to the ON state. However, since the switch 115 is in the OFF state, the holder 100 will not be driven (see FIG. 23C).

Figure 22B:
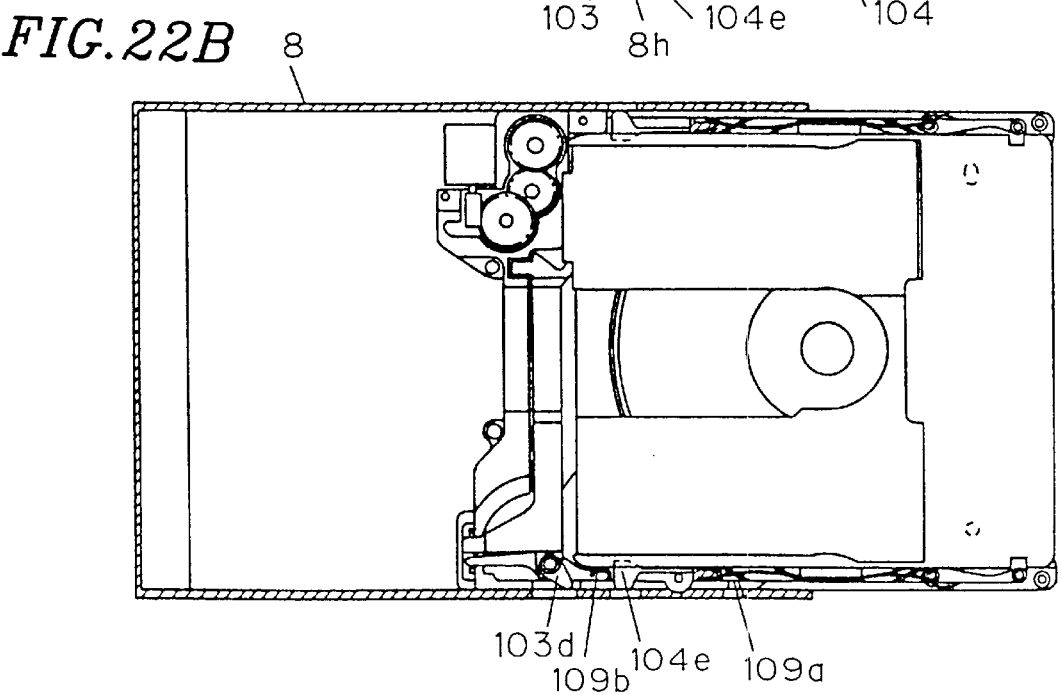

Referring to FIG. 22B, the top end of the cartridge 300 presses the initiating portion 109b of the holder lock 109 outward, causing the holder lock 109 to rotate and thus the hook 109a of the holder lock 109 to enter the holder 100. Once the cartridge 300 has been completely inserted, the projections 104e enter the notches 300c of the cartridge 300, returning to their original positions. Thus, the lock of the holder 100 is released (see FIG. 23D).

At this time, the shutter opener 103 has rotated to its innermost position, and the projection 103d has entered the holder 100.

Figure 23A:
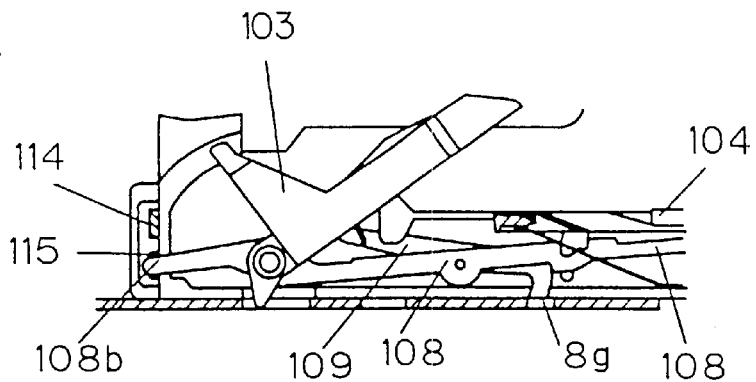
FIGS. 23A to 23E are enlarged partial view of a cartridge lock mechanism and a holder lock mechanism of the disk loading device of the embodiment.
Figure 23B:
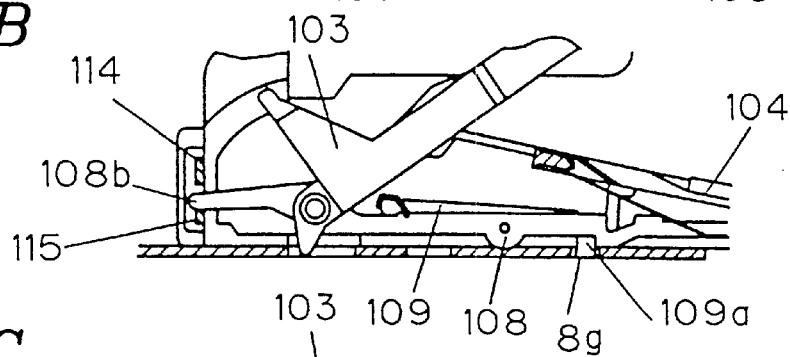
Figure 23C:
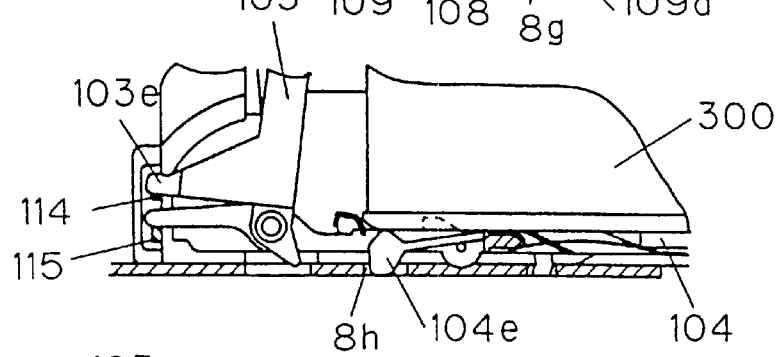
Figure 23D:
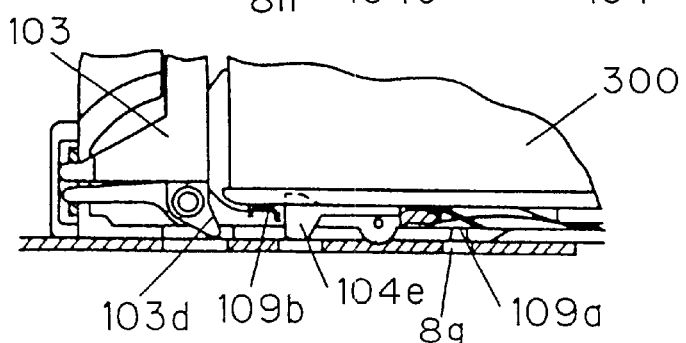
Figure 23E:
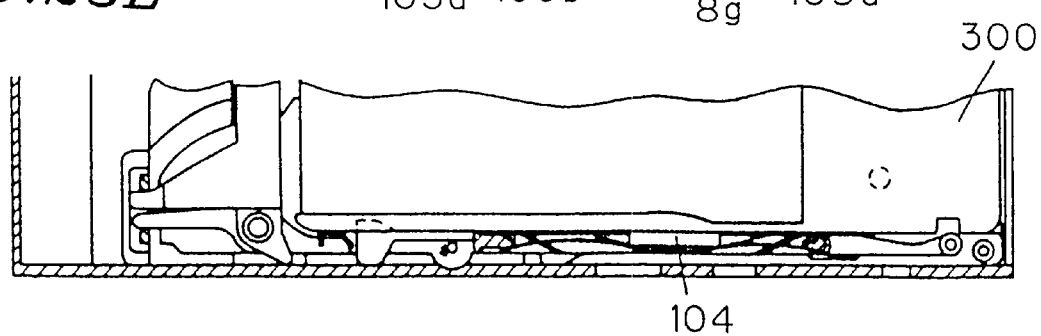

In this state, by further pushing the holder 100 or pressing the button provided on the front face of the device, the holder 100 retracts into the device (see FIG. 23E).

Once the holder 100 has retracted in the device, since no escape hole is present at the side wall of the base 8, the cartridge lock 110 is prevented from rotating outward. Thus, the cartridge 300 is secured in the holder 100.

Figure 24:
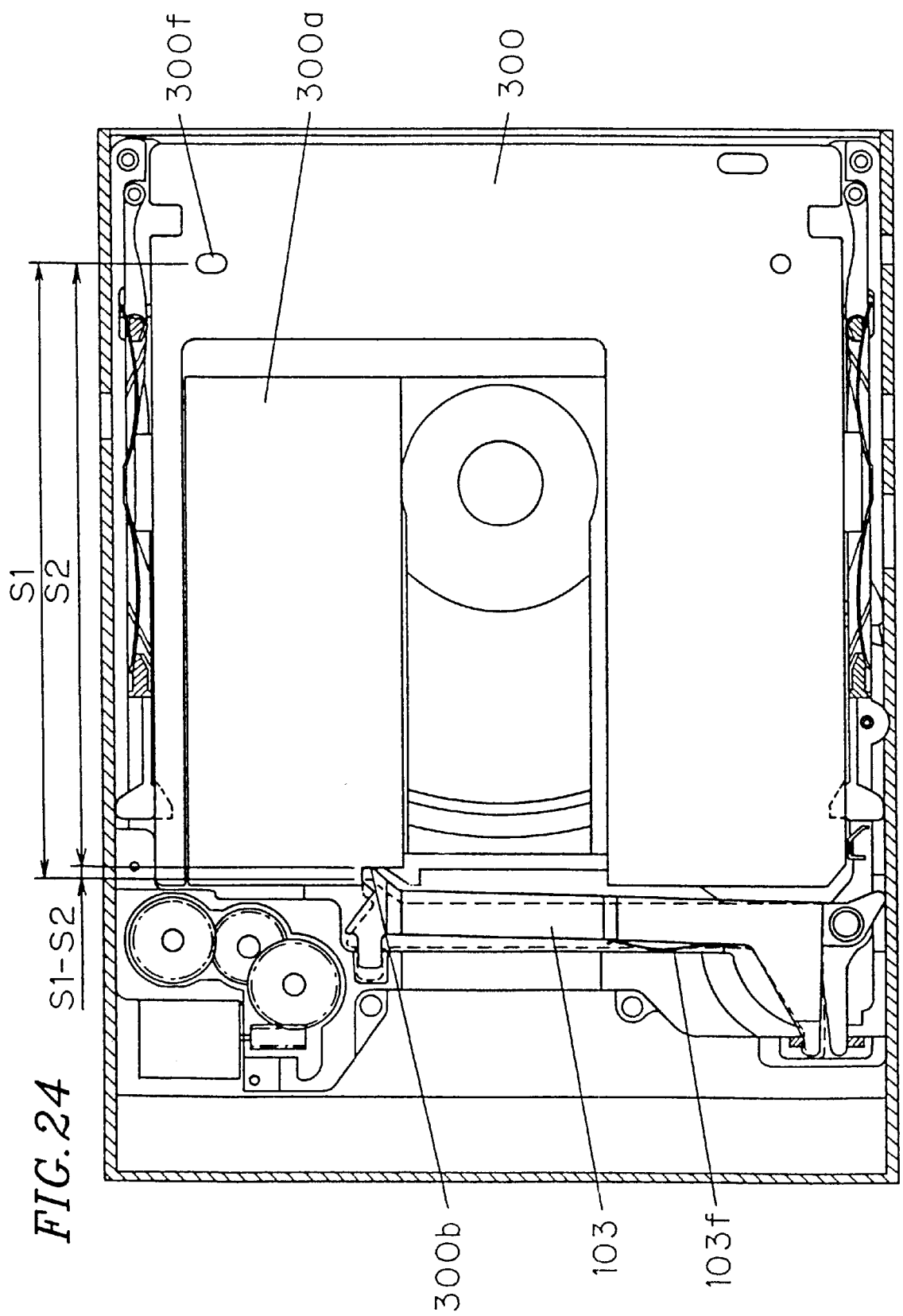
FIG. 24 is a plan view of the holder of the disk loading device of the embodiment, when a cartridge of which shutter end is different in size is inserted.

FIG. 24 is a plan view of the holder where a cartridge having a shutter top end with a different size has been loaded.

As shown in FIG. 24, when the cartridge placed in the holder 100 has a distance S2 between the positioning hole 300f and the concave portion 300b at the front end of the shutter 300a which is shorter than a distance S1 for cartridges normally used, the shutter opener 103 stops at a position upstream of the innermost terminal position by an amount corresponding to the difference S1–S2. At this time, the opener plate spring 103f abuts against the rear wall of the holder 100, and thus urges the shutter opener 103 in the direction of the holder entrance side. This prevents the shutter opener 103 from rotating to the innermost position and thus disengaging from the shutter 300a by vibrating due to a shock at the insertion of the cartridge or during the operation.

Hereinbelow, the loading operation when the holder includes a cartridge therein will be described.

FIGS. 25A to 25D are side sectional views illustrating the loading operation when the holder 100 includes the cartridge 300 therein, showing the time-sequential operation states.

Referring to FIG. 25A, when the cartridge 300 has been inserted in the holder 100, the turntable 2a is at the low position since the chassis 3 is in the slant state urged toward the base 8, and the clamp 26 is being pressed against the top board 25 by the urging force of the clamp pressing spring 28 via the clamp lever 27. Accordingly, when cartridge 300 has been inserted in the holder 100, the coupling portion 300d of the cartridge 300 exposed when the shutter 300b is opened does not come into contact with either the turntable 2a or the clamp 26. As the shutter 300a of the cartridge 300 is opened, the disk regulating member 29 comes into contact with the disk 300e in the cartridge 300 to regulate the posture of the disk 300e so as to be substantially parallel with the slanted chassis 3 urged toward the base 8. This prevents the disk 300e from contacting with the turntable 2a.

As in the previous case where no medium is inserted, when the loading operation is started by pressing the eject button (not shown), the holder 100 gradually retracts into the device as shown in FIG. 25B. At this time, the disk 300e in the cartridge 300 does not come into contact with either the turntable 2a or the clamp 26. The disk 300e comes into contact with the roller 29a of the disk regulating member 29. However, since the roller 29a is made of a material having a hardness lower than the base material of the disk 300e and rotates, the disk 300e is prevented from being damaged.

Referring to FIG. 25C, once the holder 100 has completely retracted into the disk loading device, the roller 29a of the disk regulating member 29 is pressed by the back surface 100d of the holder 100, so that the disk regulating member 29 retracts to the base 8. The operation piece 101a of the holder 100 abuts against the end 27a of the clamp lever 27. The clamp lever 27 then rotates around the clamp pressing spring 28, causing the clamp 26 to move downward to the position facing the turntable 2a. The clamp 26 is now in its standby state above the disk 300e.

Referring to FIG. 25D, when the chassis 3 completes its rotation, it becomes substantially horizontal, lifting the turntable 2a on the chassis 3. The turntable 2a then engages with the center hole of the disk 300e. Due to the adsorption force between the clamp 26 and the turntable 2a, the disk 300e is forced to be placed on the turntable 2a. The positioning holes 300f of the cartridge 300 and the pins 16 on the chassis 3 engage with each other, to realize accurate positioning between the cartridge 300 and the disk 300e in the cartridge 300.

At the same time, the cartridge detection circuit board 18 moves upward to a predetermined position in the holder 100 from the base 8 by the return force of the switch circuit board support 17, to detect whether or not a detection hole (not shown) is present at the back surface of the cartridge 300.

The ejection of the holder 100 is performed in the procedure reverse to the loading operation described above. When the cartridge 300 is removed from the holder 100, the roller 29a of the disk regulating member 29 does not interfere with the shutter 300a of the cartridge 300 since the roller 29a is of a cone shape.

As is apparent from FIGS. 25A to 25D, only the disk 300e in the opening of the cartridge 300 exposed when the shutter 300a is opened passes between the turntable 2a and the clamp 26. Accordingly, the distance between the turntable 2a and the clamp 26 can be only a little larger than the thickness m of the disk 300e.

The clamp lever 27 and the like associated with the clamp 26 are arranged in the area corresponding to the opening of the cartridge 300. Accordingly, the clamp lever 27 and the like can be disposed so as not to interfere with the disk 300e in the opening, and not with the body of the cartridge 300.

More specifically, in the disk loading device of this embodiment, the cartridge 300 is introduced into the rear side of the holder 100 after the shutter 300a of the cartridge 300 has been opened. Accordingly, the entire cartridge 300 does not interfere with the inner mechanisms of the disk loading device, but only the disk 300e may interfere in the range corresponding to the opening of the cartridge 300. This makes it possible to effectively use the internal space of the disk loading device as far as it does not interfere with the disk 300e in the opening of the cartridge 300. Therefore, the device can be made thin.

On the contrary, in the conventional devices, the shutter of the cartridge is opened after the cartridge has been introduced into the rear side of the device. With this arrangement, the entire cartridge may interfere with internal mechanisms of the disk loading device. This makes the device thick. For example, the distance between the turntable 2a and the clamp 26 must be greater than the thickness M of the cartridge 300 shown in FIG. 3E. The resultant device is therefore thick.

FIGS. 26A to 26C show a thickness cancelling mechanism when the thickness t of various cartridges 300 vary from t−a to t+b within the allowance thereof.

FIG. 26A shows the case where the thickness of the cartridge 300 is t−a. When the cartridge 300 is inserted in the space between the holder case 101 and the holder cover 102, an excessive gap exists between the cartridge 300 and the holder case 101 since the thickness of the cartridge 300 is the minimum allowance. The cartridge 300 is pressed against the holder cover 102 by the urging force of the cartridge urging spring 120 disposed on the holder case 101 and the urging force of the switch circuit board support 17 disposed on the chassis 3. The holder 100 abuts against the lower portion of the positioning pin 16 disposed on the chassis 3, and is urged by a head unit urging spring 40 urging the chassis 3 and by the torsion leaf 11 so that the holder case 102 comes into contact with the top board 25. Thus, while the excessive gap due to the size difference remains inside the device, the cartridge 300 and the holder 100 are urged with respect to the top board 25.

FIG. 26B shows the case where the cartridge 300 has the standard thickness t. When the cartridge 300 is inserted in the space of the holder 100, a gap exists between the cartridge 300 and the holder case 101. The cartridge 300 is pressed against the holder cover 102 by the urging force of the cartridge urging spring 120 disposed on the holder case 101, the urging force of the switch circuit board support 17 disposed on the chassis 3, and the positioning pin 16 disposed on the chassis 3. The holder 100 abuts against the lower end portion of the positioning pin 16, and is urged by the head unit urging spring 40 urging the chassis 3 and by the torsion leaf 11 so that the holder case 102 becomes in contact with the top board 25. Thus, while the gap is remained inside the device, both the cartridge 300 and the holder 100 are urged with respect to the top board 25.

FIG. 26C shows the case where the thickness of the cartridge 300 is t+b. When the cartridge 300 is inserted in the space of the holder 100, substantially no gap exists between the cartridge 300 and the holder case 101. The cartridge 300 is pressed against the holder cover 102 by the urging force of the holder urging spring 120 disposed in the holder case 101, the urging force of the switch circuit board support 17 disposed on the chassis 3, and the positioning pin 16 disposed on the chassis 3. The holder 100 does not abut against the lower end portion of the positioning pin 16, and is urged by the head unit urging spring 40 urging the chassis 3 and by the torsion leaf 11 so that the holder case 102 becomes in contact with the top board 25. Thus, both the cartridge 300 and the holder 100 are urged with respect to the top board 25.

With the above arrangement, no clearance space is required for the cartridge urging spring in the height direction as conventionally required in order to cancel the thickness difference of cartridges. Therefore, the dev ice can be mad e thin. In either of FIGS. 26A to 26C, both the disk 300e in the cartridge 300 and the optical head 7 are kept in position.

(III) Loading Operation with a Large Disk Placed in the Holder

The operation of the holder 100 when the large disk 301 is inserted into the ejected holder 100 will be described.

FIGS. 27A, 27B, 27C, and 28 are plan views illustrating the operation of the holder 100 when the large disk 301 is inserted into the holder 100, showing the time-sequential operation states.

Figure 27A:
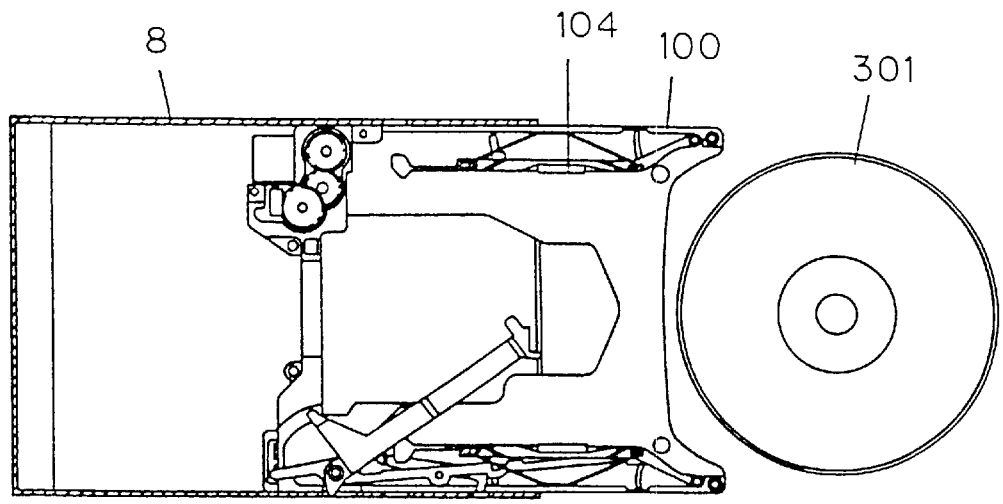
FIGS. 27A to 27C are plan views illustrating the operation of the holder at the insertion of a large-size disk in the disk loading device of the embodiment.

FIG. 27A shows the standby state where the holder 100 has been ejected. The disk holders 104 are in the standby state for holding the large disk 301.

Figure 27B:
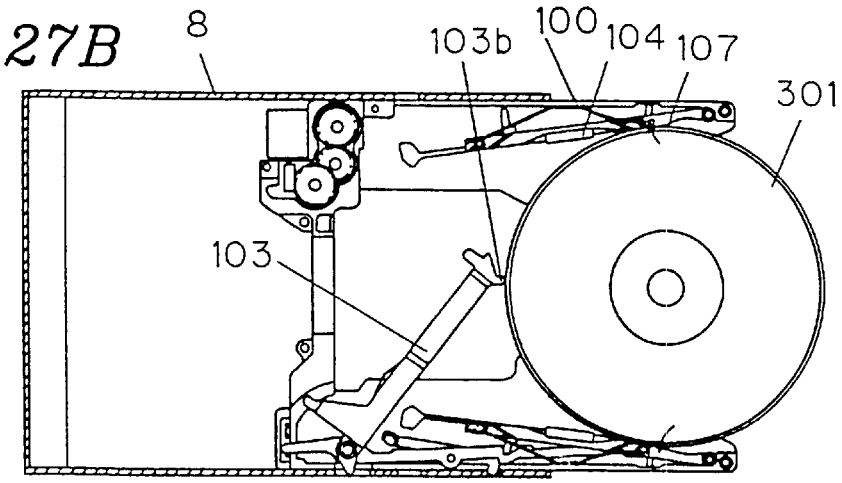

FIG. 27B shows the state where the large disk 301 is inserted and the inlet levers 107 have been rotated outward. The top portion 103b of the shutter opener 103 is pressed by the periphery of the large disk 301 toward the rear side.

Figure 27C:
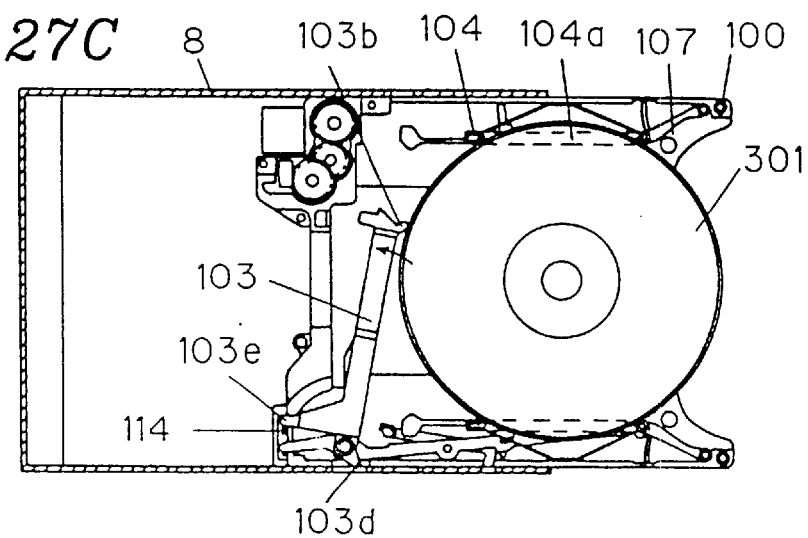

In FIG. 27C, the large disk 301 overrides the inlet levers 107 to enter the slits 104a of the disk holders 104. The inlet levers 107 and the disk holders 104 then return to their respective original positions.

The top portion 103b of the shutter opener 103 abuts against the periphery of the large disk 301, and the projection 103d thereof projects from the holder 100. At this time, the switch 114 is in the OFF state.

Figure 28:
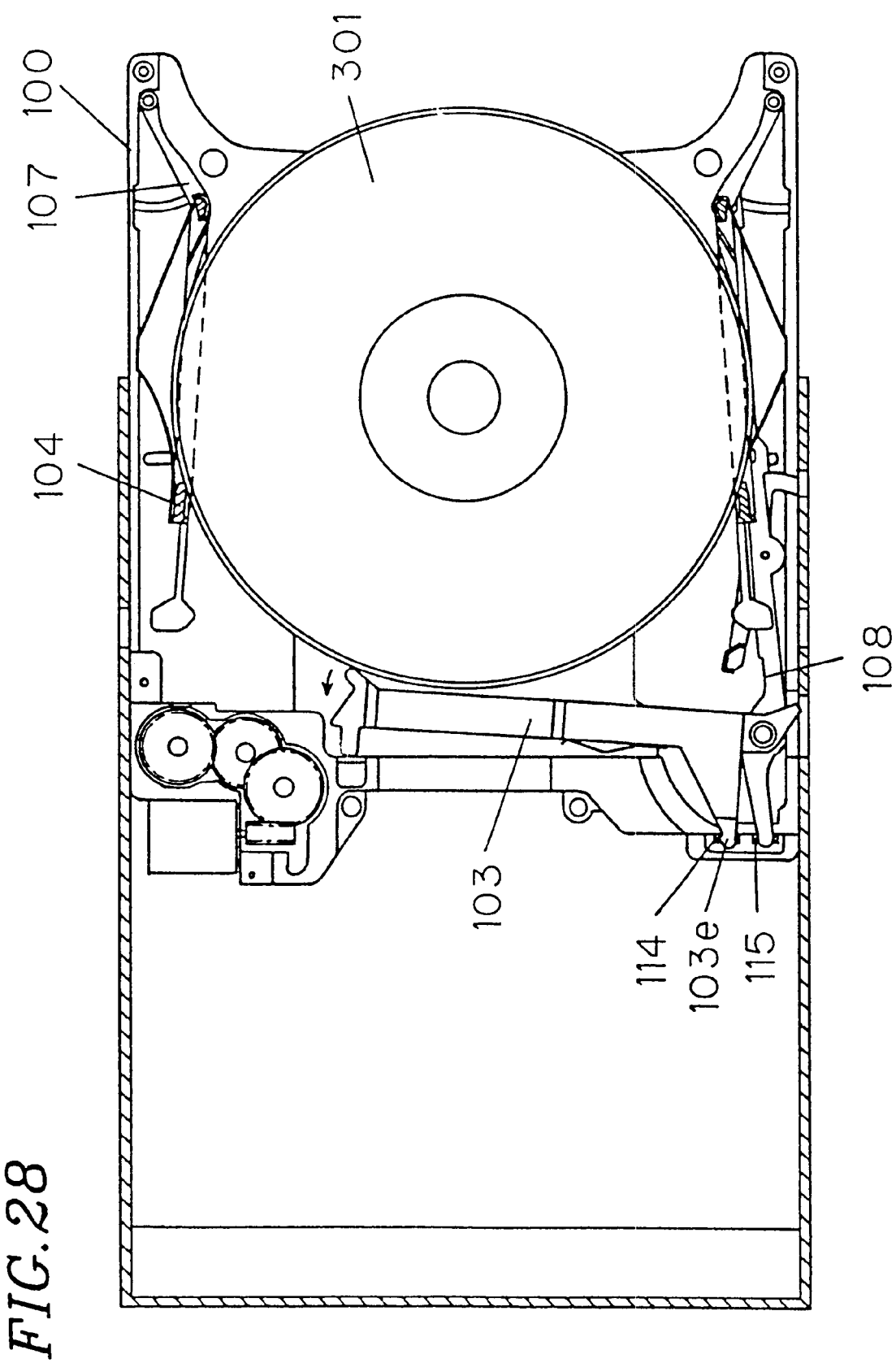
FIG. 28 is a plan view illustrating the operation of the holder at the insertion of a large-size disk in the disk loading device of the embodiment.

In FIG. 28, the large disk 301 is further pushed slightly into the holder 100. The shutter opener 103 further rotates to turn the switch 114 to the ON state. At this time, the inlet levers 107 and the coupling plate 108 are in their initial states, and the switch 115 is in the ON state. Under these circumstances, retraction of the holder 100 is started.

Figures 29A, 29B:
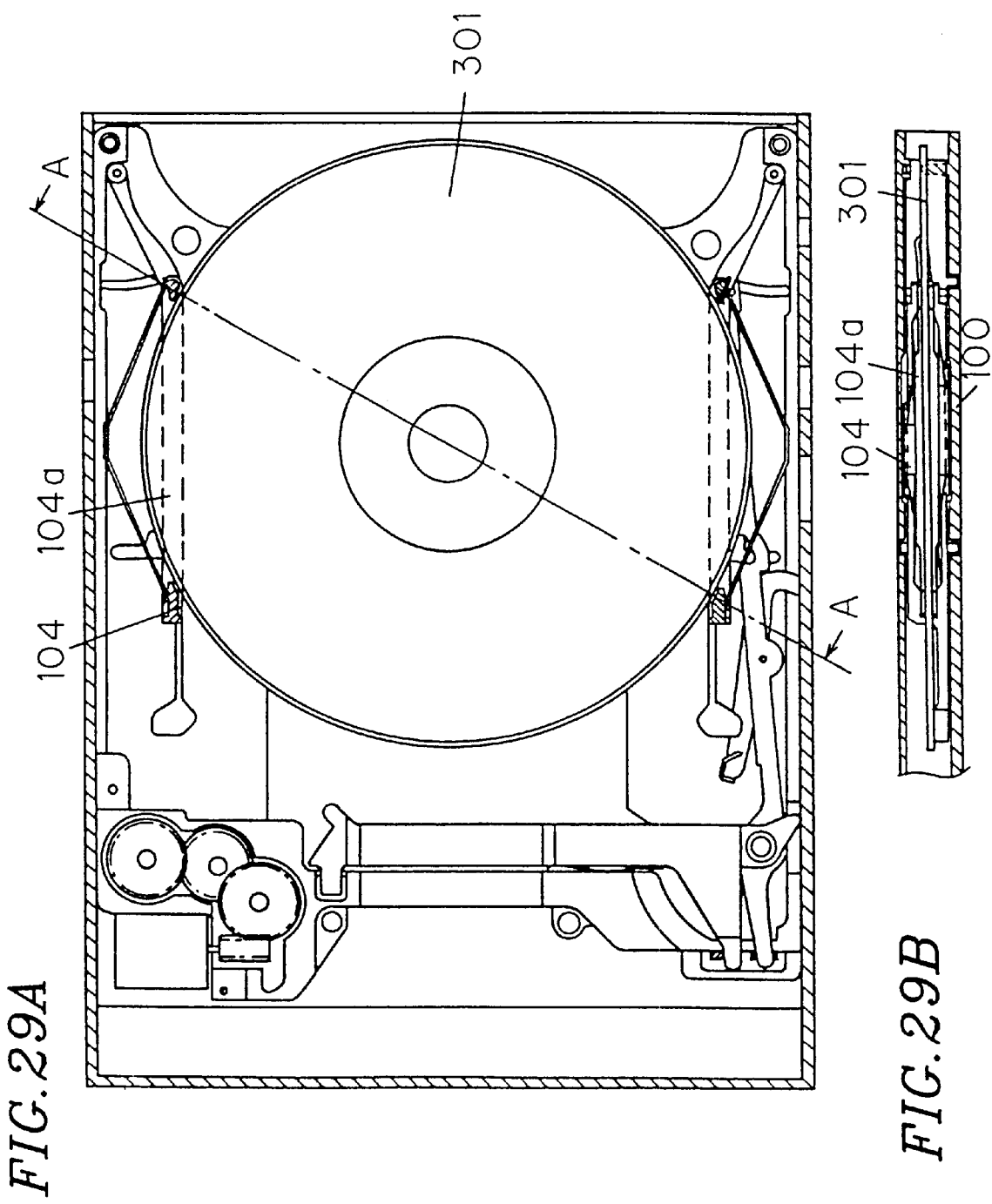
FIG. 29A is a partial enlarged view of the disk loading device of the embodiment when a large-size disk has been loaded.
FIG. 29B is a side view showing a disk holder and the disk.

FIG. 29A is a plan view illustrating the state where the large disk 301 is placed in the holder 100. FIG. 29B is a side view of the disk holder 104, the inlet lever 107, and the large disk 301. As shown in FIG. 29B, the large disk 301 is held in the slits 104a of the disk holders 104 with gaps both in the radial direction and the thickness direction.

Figure 30A:
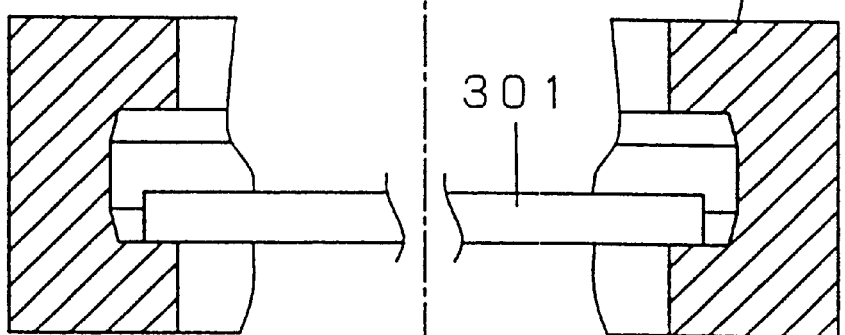
FIGS. 30A and 30B are partial sectional views of a disk holding portion of the disk loading device of the embodiment.
Figure 30B:
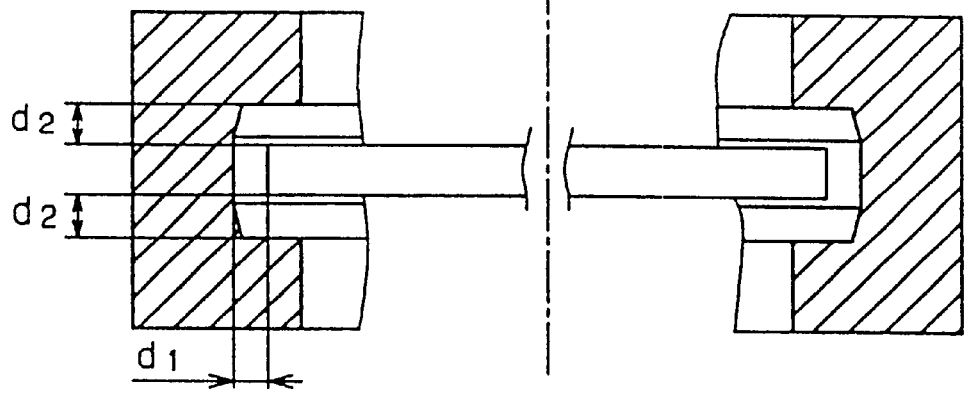

FIGS. 30A and 30B are sectional views taken along line A—A of FIG. 29A, showing the position of the large disk 301 during the movement of the holder 100 and after the completion of the loading of the holder 100, respectively. When the device is installed horizontally, the large disk 301 is placed on the lower faces of the slits 104a during the movement of the holder 100, as shown in FIG. 30A. When the disk is lifted by the turntable upon completion of the loading, a gap d1 in the radial direction of the large disk 301 and a gap d2 in the vertical direction are secured between the large disk 301 and the slits 104a, as shown in FIG. 30B. The large disk 301 is rotated with these gaps.

FIG. 31A is a side view of the disk holder 104 and the inlet lever 107. FIG. 31B is a side view illustrating the insertion of the large disk 301. As shown in FIGS. 31A and 31B, the inlet lever 107 is provided with a groove 107a for guiding the large disk 301 so as to have an angle a with respect to the bottom surface of the holder 100. This serves to guide the large disk 301 in a slanted direction when the large disk 301 is inserted or removed. This prevents the periphery of the disk from abutting against the clamp portion, and also improves the operability.

Hereinbelow, the loading operation when the holder includes a large disk therein will be described.

FIGS. 32A to 32D are side sectional views illustrating the loading operation when the holder 100 includes the large disk 301 therein, showing the time-sequential operation status.

Figure 32A:
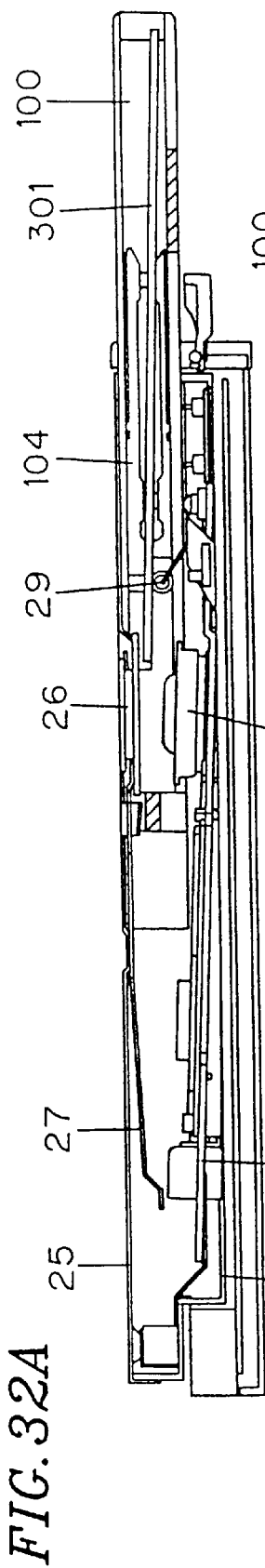
FIGS. 32A to 32D are side sectional views illustrating the loading operation of the disk loading device of the embodiment, when a large disk has been inserted in the holder.

When the large disk 301 has been inserted in the holder 100, as shown in FIG. 32A, the turntable 2a is at the low position since the chassis 3 is in the slant state urged toward the base 8, and the clamp 26 is being pressed against the top board 25 by the urging force of the clamp pressing spring 28 via the clamp lever 27. Accordingly, the large disk 301 placed in the holder 100 does not come into contact with the clamp 26. The disk regulating member 29 comes into contact with the large disk 301 to regulate the posture of the large disk 301 to be substantially parallel with the slanted chassis 3 urged toward the base 8. This prevents the large disk 301 from contacting the turntable 2a.

Figure 32B:
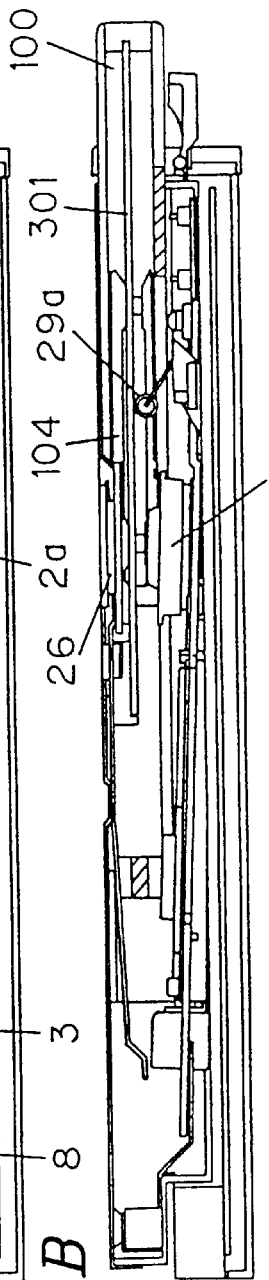

As in the previous case where no medium is inserted, when the loading operation is started by pressing the eject button (not shown), the holder 100 gradually retracts into the device, as shown in FIG. 32B. At this time, the large disk 301 does not come into contact with either the turntable 2a or the clamp 26. The large disk 301 comes into contact with the roller 29a of the disk regulating member 29. However, since the roller 29a is made of a material having a hardness lower than the base material of the large disk 301 and rotates, the large disk 301 is prevented from being damaged.

At this time, as shown in FIG. 18B, the projection 103d of the shutter opener 103 moves away from the hole 8e at the side face of the base 8, and the shutter opener 103 rotates in direction R2 to a position where the shutter opener 103 no longer holds the large disk 301. The shutter opener 103 therefore does not engage with the large disk 301.

Figure 32C:
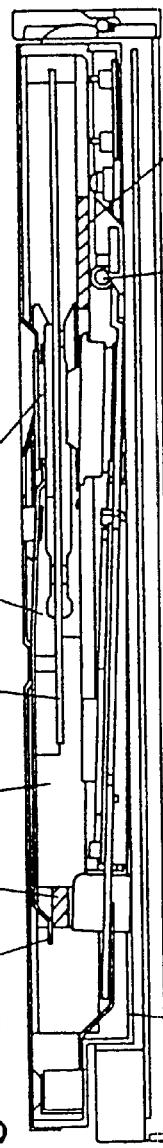

As shown in FIG. 32C, once the holder 100 has completely retracted in the disk loading device, the roller 29a of the disk regulating member 29 is pressed by the back surface 100d of the holder 100, so that the disk regulating member 29 retracts to the base 8. The operation piece 101a of the holder 100 abuts against the end 27a of the clamp lever 27. The clamp lever 27 then rotates around the clamp pressing spring 28, causing the clamp 26 to move downward to the position facing the turntable 2a. The clamp 26 is now in the standby state above the disk 300e.

Figure 32D:
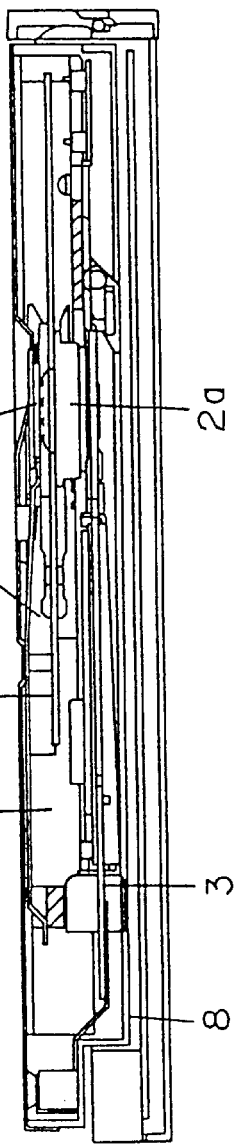

As shown in FIG. 32D, when the chassis 3 completes its rotation, it becomes substantially horizontal. Since the large disk 301 is not restricted by the shutter opener 103 or the disk holders 104, the turntable 2a on the chassis 3 moves upward to engage with the center hole of the large disk 301. Due to the adsorption force between the clamp 26 and the turntable 2a, the large disk 301 is forced to be placed on the turntable 2a. Thus, the loading operation is completed.

The ejection of the holder 100 is performed in the procedure reverse to the loading operation described above.

(IV) Medium Retrieval Operation When the Device is Not Powered

In the above description, the loading operation has been performed under power supply. Hereinbelow, the operation of retrieving a medium placed in the disk loading device when the device is not powered will be described.

FIGS. 33A, 33B, 34A, and 34B are plan views illustrating the operation for retrieving the large disk 301 placed in the disk loading device when the device is not powered. FIGS. 35A to 35D are side sectional views corresponding to FIGS. 33A, 33B, 34A, and 34B, respectively. FIGS. 36A to 36D show the engagement between the claw 14a of the forced eject lever 14 and the engaging portion 100c of the holder 100 by the insertion of the eject pin 24.

Figure 33A:
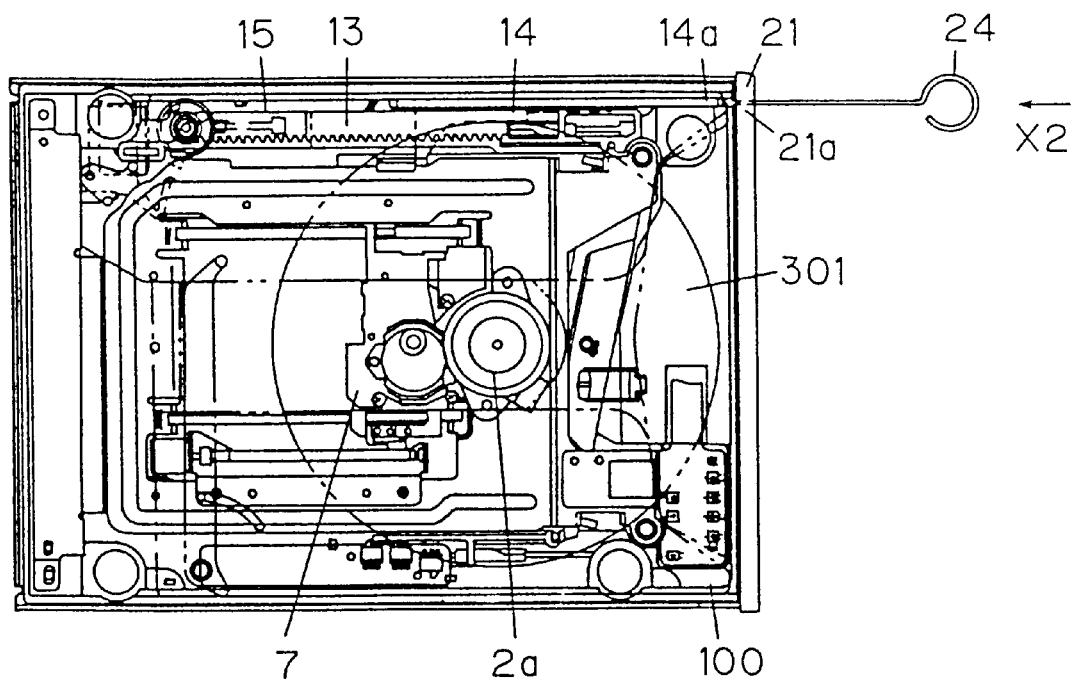
FIGS. 33A and 33B are plan detailed views illustrating the cartridge retrieval operation in the disk loading device of the embodiment when the device is not powered.
Figures 36A, 36B, 36C, 36D:
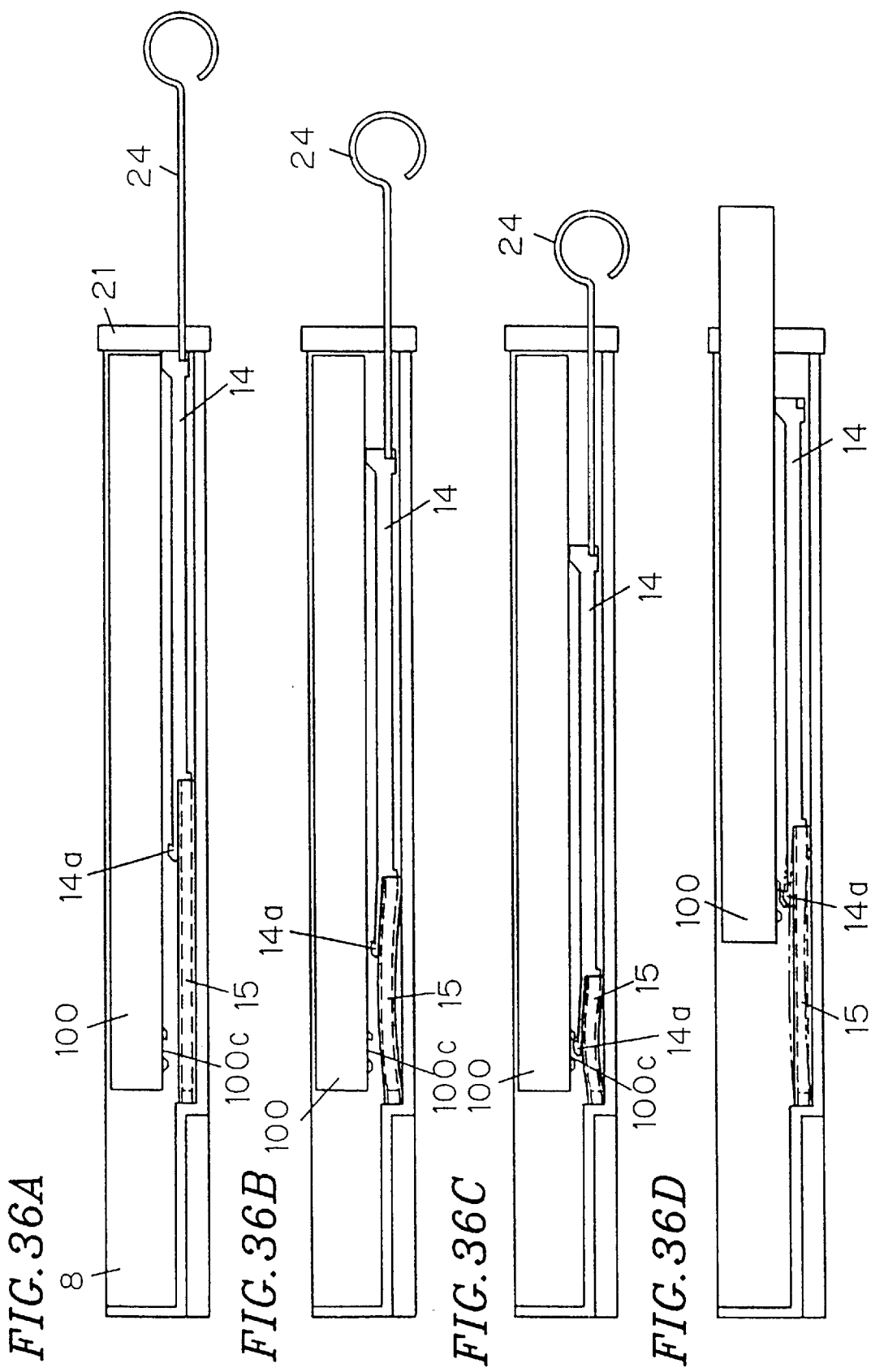
FIGS. 36A to 36D are side sectional views showing a cartridge retrieval operation engaging portion of the disk loading device of the embodiment when the device is not powered.

As shown in FIG. 33A, the eject pin 24 is inserted into the disk loading device through the forced eject hole 21a of the panel 21. The eject pin 24 engages with the claw 14a of the forced eject lever 14. The forced eject lever 14 is disposed between the slide rack 13 and the base 8 slidably in directions X1–X2, and is lightly urged by the forced eject spring 15 in direction X1. It is assumed that the optical head 7 is located at the position corresponding to the inner circumference of the large disk 301, i.e., the position closest to the turntable 2a. Under this state, as shown in FIG. 35A, the chassis 3 is substantially horizontal. As shown in FIG. 36A, the forced eject spring 15 is in its natural state, and thus the claw 14a of the forced eject lever 14 and the engaging portion 100c of the holder 100 are away from each other.

Figure 33B:
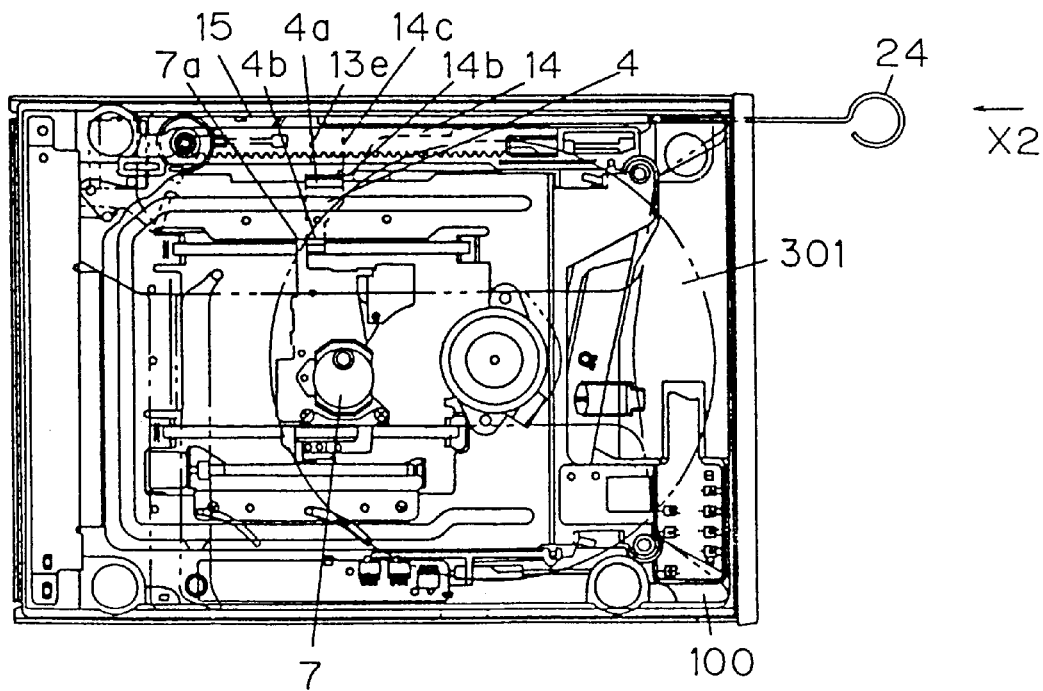

As shown in FIG. 33B, as the eject pin 24 is inserted farther into the disk loading device compressing the forced eject spring 15 (in direction X2), the forced eject lever 14 is pressed in direction X2, causing a rib 14b of the forced eject lever 14 to abut against an end 4a of a head shifting lever 4 disposed on the chassis 3 slidably in directions X1–X2. The end 4a of the head shifting lever 4 then abuts against an end 7a of the optical head 7, and the optical head 7 is shifted in direction X2 as the eject pin 24 is inserted farther. Under this state, as shown in FIG. 35B, the end face 13e of the slide rack 13 has not yet abutted against the end face 14c of the forced eject lever 14. Accordingly, while the optical head 7 shifts in direction X2, the chassis 3 is kept substantially horizontal.

As shown in FIG. 36B, the forced eject spring 15 is compressed to accumulate a force for ejecting the holder 100. Also, a space is formed for allowing the holder engaging claw 14a of the forced eject lever 14 to be deformed only in the direction closer to the engaging portion 100c of the holder 100. Accordingly, the claw 14a of the forced eject lever 14 is deformed in the direction closer to the holder 100.

Figure 34A:
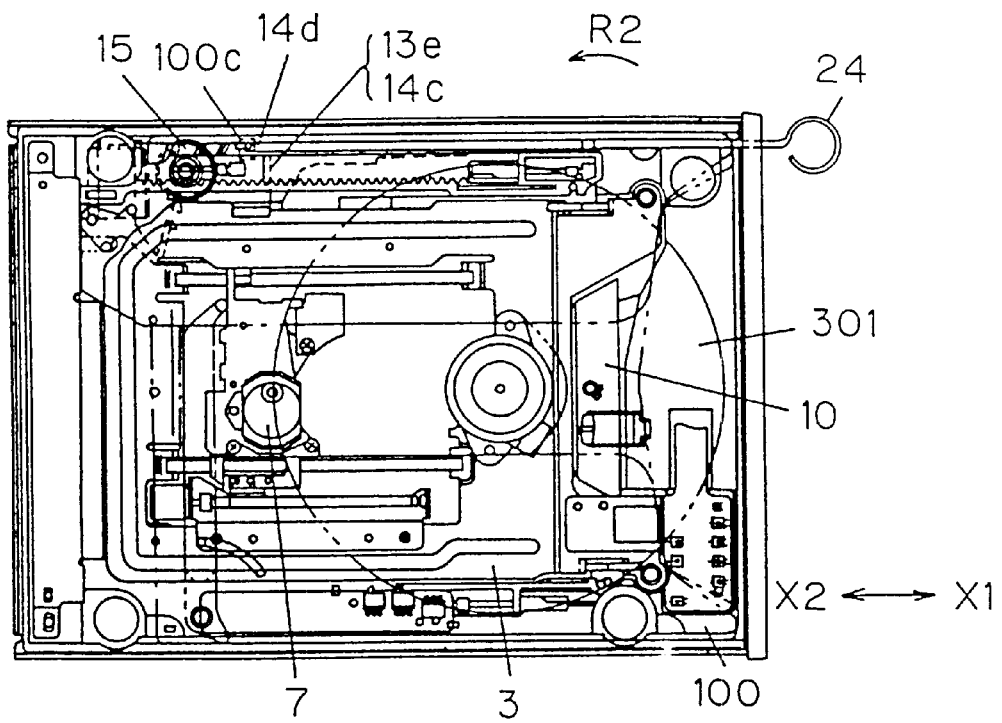
FIGS. 34A and 34B are plan detailed views illustrating the cartridge retrieval operation in the disk loading device of the embodiment when the device is not powered.

When the forced eject pin 24 is inserted farther, as shown in FIG. 34A, the optical head 7 is shifted to the position corresponding to the outer circumference of the large disk 301, causing the claw 14a of the forced eject lever 14 to engage with the engaging portion 100c of the holder 100. At the same time, the end face 13e of the slide rack 13 abuts against the end face 14c of the forced eject lever 14. As the slide rack 13 slides in direction X2, the lift cam 10 rotates in direction R2, causing the chassis 3 to be rotated to the slant state from the substantially horizontal state. Under this state, as shown in FIG. 35C, by arranging so that the rotation of the chassis 3 is completed after the optical head 7 has retracted to the position corresponding to the disk outer circumference, the bottom portion of the optical head 7 will not project from the bottom surface of the base 8. This serves to thin the disk loading device.

As shown in FIG. 34A and 36C, it is arranged so that the insertion stroke of the forced eject pin 24 is at the terminal position where the claw 14a of the forced eject lever 14 engages with the engaging portion 100c of the holder 100. With this arrangement, when the insertion of the forced eject pin 24 in direction X2 is terminated, the holder 100 starts the movement in direction X1 by the return force of the compressed forced eject spring 15.

Figure 34B:
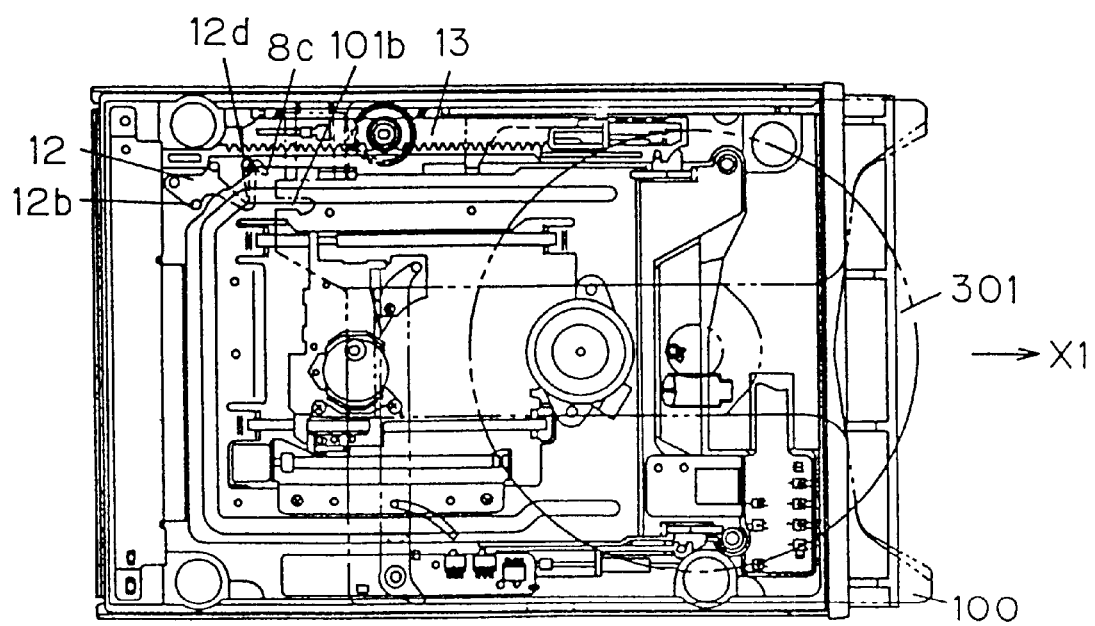

When the forced eject pin 24 is pulled out from the disk loading device under the above state, as shown in FIG. 34B, with the movement of the holder 100, the elongate hole 101b of the holder 100 is disengaged from the boss 12b of the clutch 12, releasing the holder 100 to move in direction X1. At the same time, the claw 12d of the clutch 12 engages with the projection 8c of the base 8 to restrict the slide rack 13. Under this state, as shown in FIG. 35D, the holder 100 is slightly ejected from the disk loading device. By manually pulling out the holder 100 to the holder eject completion position, the large disk 301 placed in the holder 100 can be removed. Also, as shown in FIG. 36D, after the forced eject pin 24 is pulled out, the holder 100 is ejected from the device by the urging force of the forced eject spring 15. When the holder 100 has been ejected to a predetermined position, the engagement between the claw 14a of the forced eject lever 14 and the engaging portion 100c of the holder 100 by the forced eject spring 15 is released.

In the above description, the case where the optical head 7 is located at the position corresponding to the inner circumference of the large disk 301 was taken as an example. It should be understood that the optical head 7, which may be in the standby state at any arbitrary position, can be shifted to the position corresponding to the outer circumference of the disk before the movement of the chassis 3 to the slant position is completed.

The case where the large disk 301 is retrieved when the device is not powered has been described. It should be understood that the cartridge 300 and the small disk 302 can also be retrieved in the same manner.

When the device is powered, the loading operation including the retraction of the holder 100 is completed, and the optical head 7 is shifted to the position corresponding to the disk inner circumference with the motor 5 under the control of the MPU 34. Then, the head shifting lever 4 is moved to a predetermined position near the disk inner circumference by the optical head 7, resuming the initial state shown in FIG. 33A. The head shifting lever 4 therefore will not interrupt the operation of the optical head 7.

(V) Loading Operation When an Adaptor is Placed in the Holder

Figure 37:
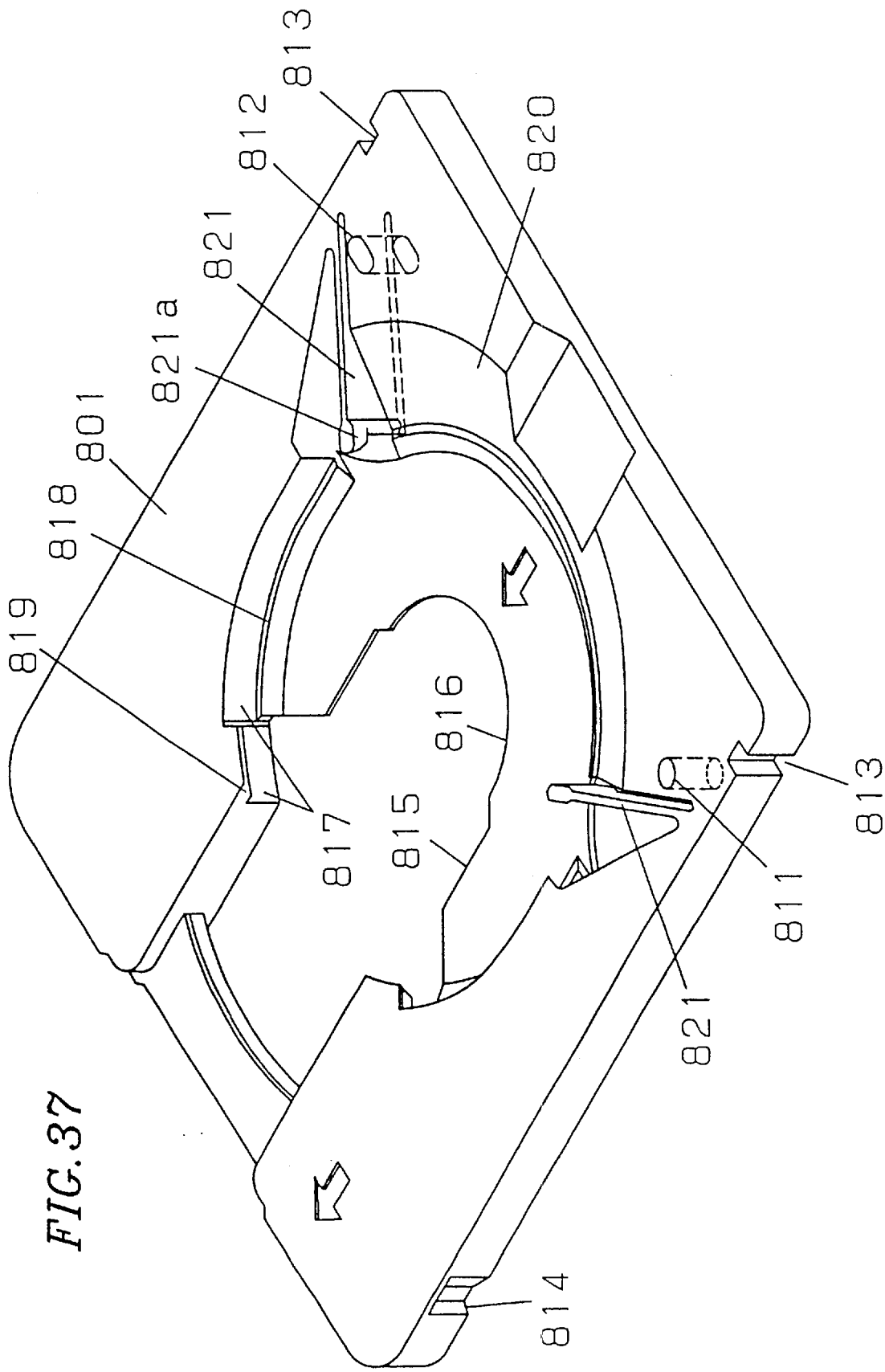
FIG. 37 is a perspective view of an adaptor of the first example according to the present invention.

FIG. 37 is a perspective view of the first example of an adaptor according to the present invention.

An adaptor 801 of this example has the same size as that of the cartridge 300 in the width, length, and thickness of the adaptor body, and the positional dimensions of alignment holes 811 and 812. The adaptor 801 is therefore useable with the loading device for the cartridge 300. The adaptor 801 includes grips 813 for being captured by an automatic exchange device and notches 814. The shapes and sizes of these portions also comply with those of the cartridge 300. With this arrangement, the adaptor 801 can be used for an automatic exchange device and is protected from erroneous insertion by using the notches.

The adaptor 801 also includes an opening 815 for receiving the optical head 7 and an opening 816 for receiving the turntable 2.

The adaptor 801 further includes a cylindrical vertical face which is concentric with but a little larger in outer diameter than the small disk 302 and parallel to the direction of the insertion of the small disk 302, and projecting pieces 818 and 819 for regulating the lower and upper surfaces of the small disk 302, respectively. These portions constitute a holding portion for holding the small disk 302 with gaps both in the radial direction and the thickness direction of the small disk 302.

Figure 39A:
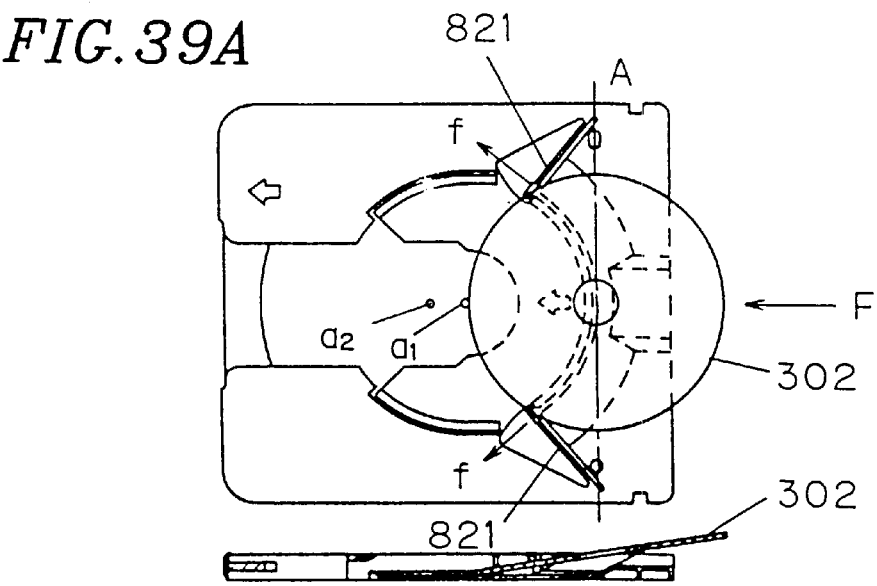
FIGS. 39A to 39C are plan views and sectional views illustrating the insertion of a disk into the adaptor of FIG. 37.

A disk insertion portion 820 composed of a conical surface is disposed at the rear of the adaptor body along the center line in the direction of the insertion to the disk loading device. The ridgeline shape between the adaptor upper surface and the conical surface is larger than the shape of the small disk 302. As shown in FIG. 39A, the small disk 302 is inserted into the adaptor 801 in the slanted state.

A pair of disk guide members 821 composed of flat cantilevers vertical to the surface of the small disk 302 are disposed on both sides of the disk insertion portion 820. As shown in FIG. 39A, an intersection point a2 between the extension line of the beam of the disk guide member 821 and the center line in the direction of the insertion of the adaptor is located closer to the front of the adaptor than a center point a1 of the disk holding position. With this arrangement, when the small disk 302 is inserted, the disk guide members 821 are pressed outward to accept the disk. After the completion of the insertion of the small disk 302, the top ends of the disk guide members 821 hold the small disk 302 with a gap therebetween. Projection pieces 821a are provided to regulate the upper surface of the small disk 302.

Figure 39B:
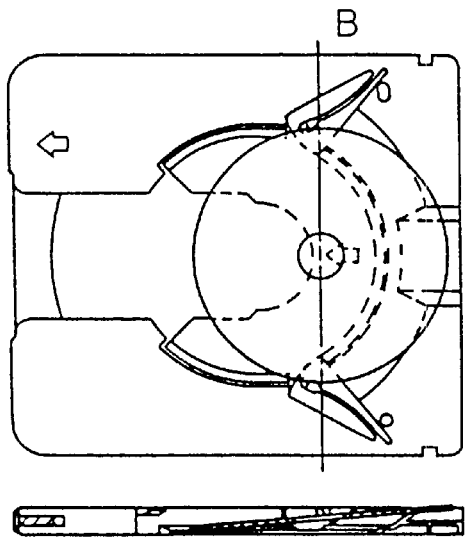
Figure 39C:
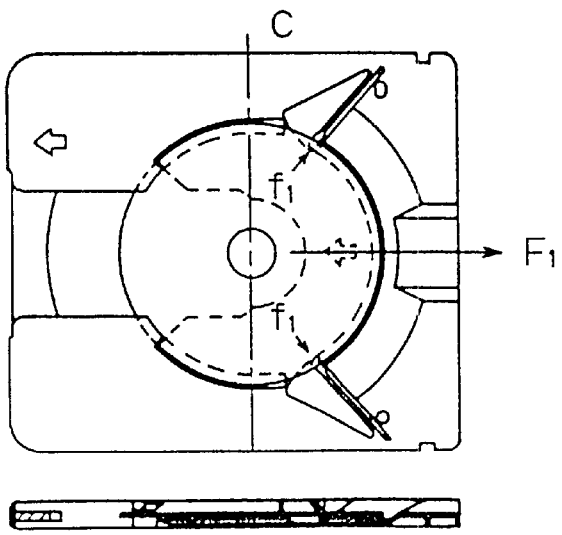

FIGS. 39A to 39C show the states of the insertion of the small disk 302. FIG. 39A shows the state where the outer circumference of the small disk 302 comes into contact with the top ends of the disk guide members 821 which are the cantilevers. When a force F is applied in the insertion direction, a partial force f in the direction toward the cantilevers is large enough to bend the cantilevers. The small disk 302 can therefore be easily inserted into the adaptor. FIG. 39B shows the state where the disk guide members 821 have been bent at the maximum by further insertion of the small disk 302. FIG. 39C shows the state where the small disk 302 is placed at the disk holding position in the adaptor 801. Once the small disk 302 is at the disk holding position, if a force F1 is applied in the direction of the removal of the small disk 302, a force f1 in the direction toward the beams mainly acts to compress the beams, with only a small force acting to bend the beams. Thus, the cantilevers are hard to bend. If they bend, the bending is in the direction of the circumference of the small disk 302. The deformation in the radial direction of the small disk 302 is therefore extremely small, which secures the positional accuracy of the small disk 302.

When the small disk 302 is to be removed, the intersection point a2 between the extension line from the free end of the disk guide member 821 which is the cantilever and the center line in the direction of the insertion of the adaptor is located closer to the front of the adaptor than the point a1 of the disk holding position. With this arrangement, the small disk 302 can be removed by applying a little large force F1.

In short, the small disk 302 can be easily inserted into the adaptor since the disk guide members 821 are bent. The small disk 302 is removed utilizing the return force against the bending of the disk guide members 821. This provides good operability at the insertion/removal of the small disk 302.

Figure 38:
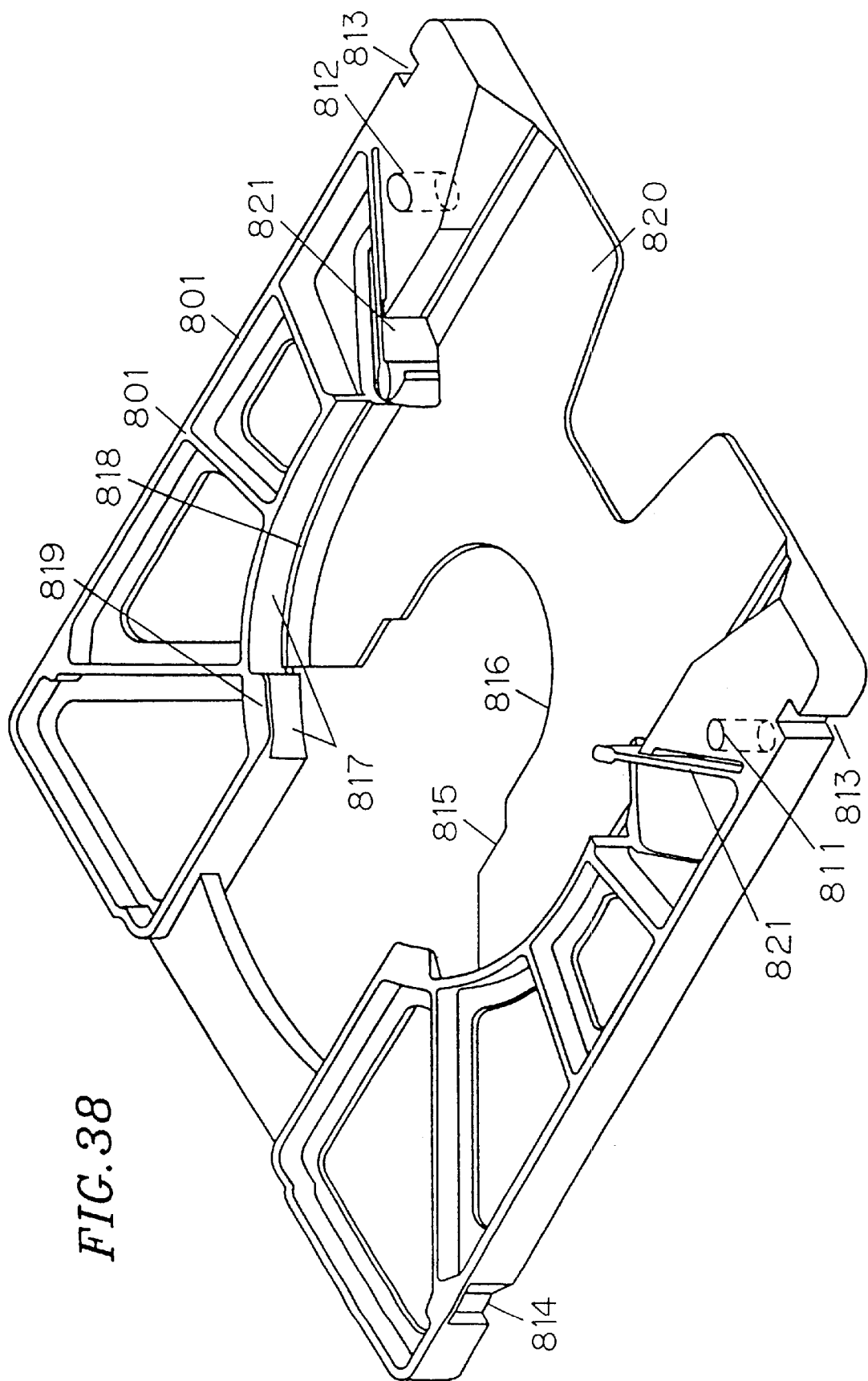
FIG. 38 is a perspective view of an adaptor of the second example according to the present invention.

FIG. 38 is a perspective view of the second example of the adaptor according to the present invention. The construction of the adaptor of this example is the same as that of the first example shown in FIG. 37 except for the following points.

An insertion portion 820 located in the rear of the adaptor body along the center line of the insertion to the disk loading device is composed of a plane parallel to the adaptor plane. The small disk 302 is inserted in parallel with the plane of the adaptor 801. The adaptor 801 of this example is of a rib structure having cut portions. Various designs may be provided to the structure.

Figure 40A:
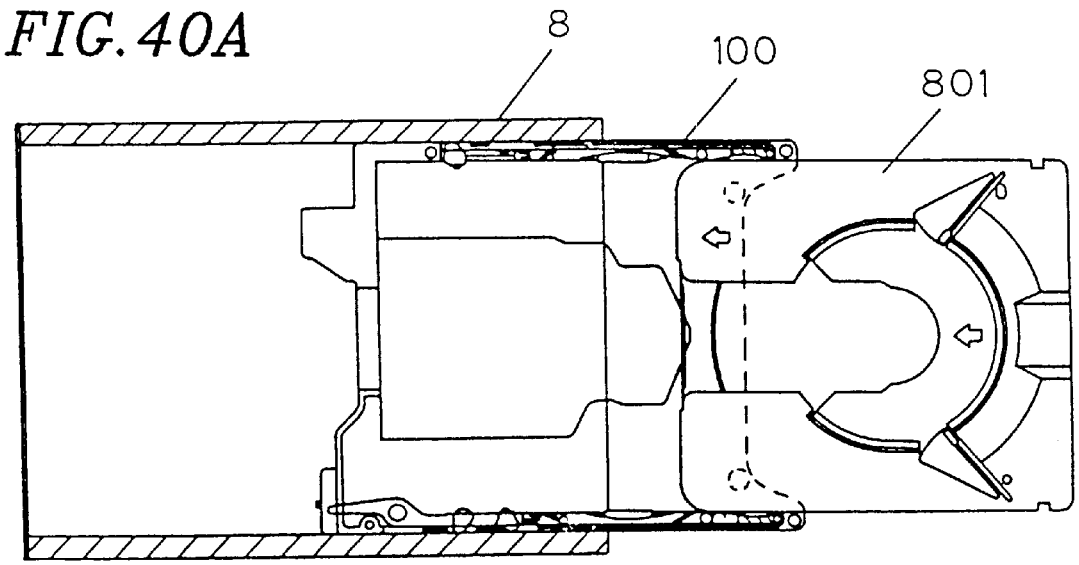
FIGS. 40A to 40C are plan views illustrating the insertion of the adaptor of FIG. 37 into the holder.
Figure 40B:
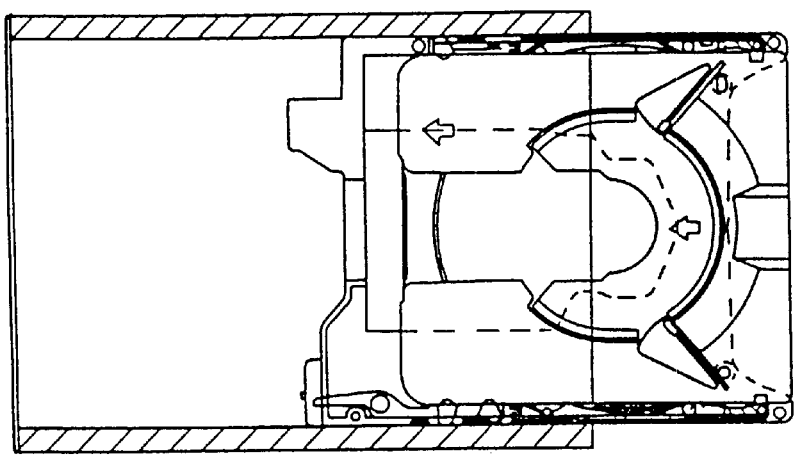
Figure 40C:
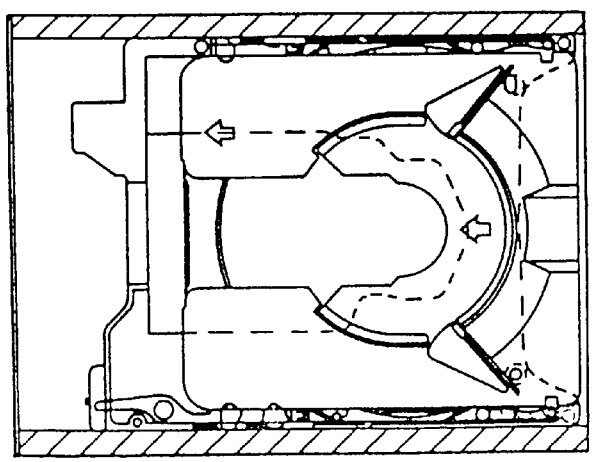
Figure 41:
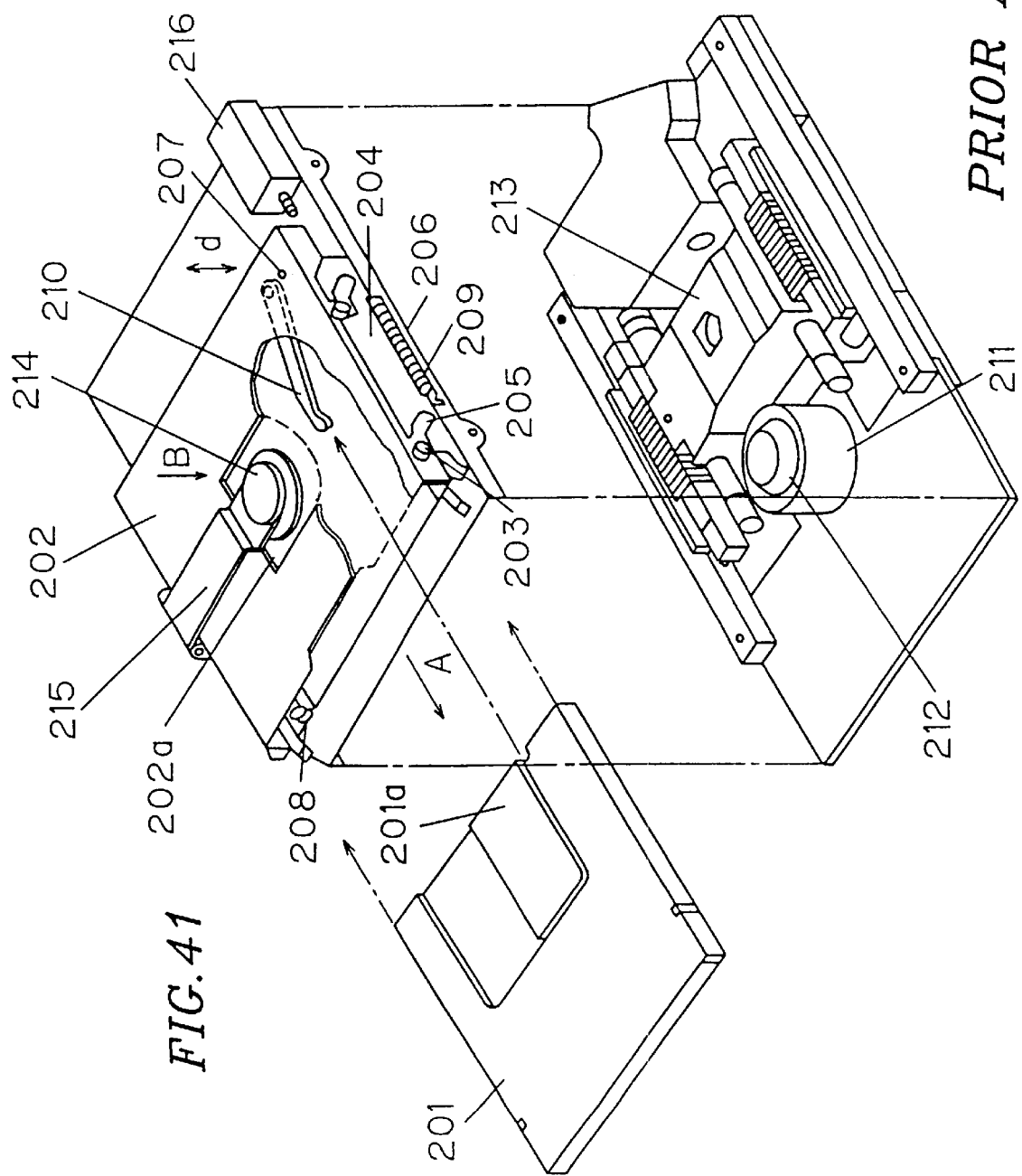
FIG. 41 is a perspective view of the disk loading mechanism of Conventional Example 1.
Figure 42A:
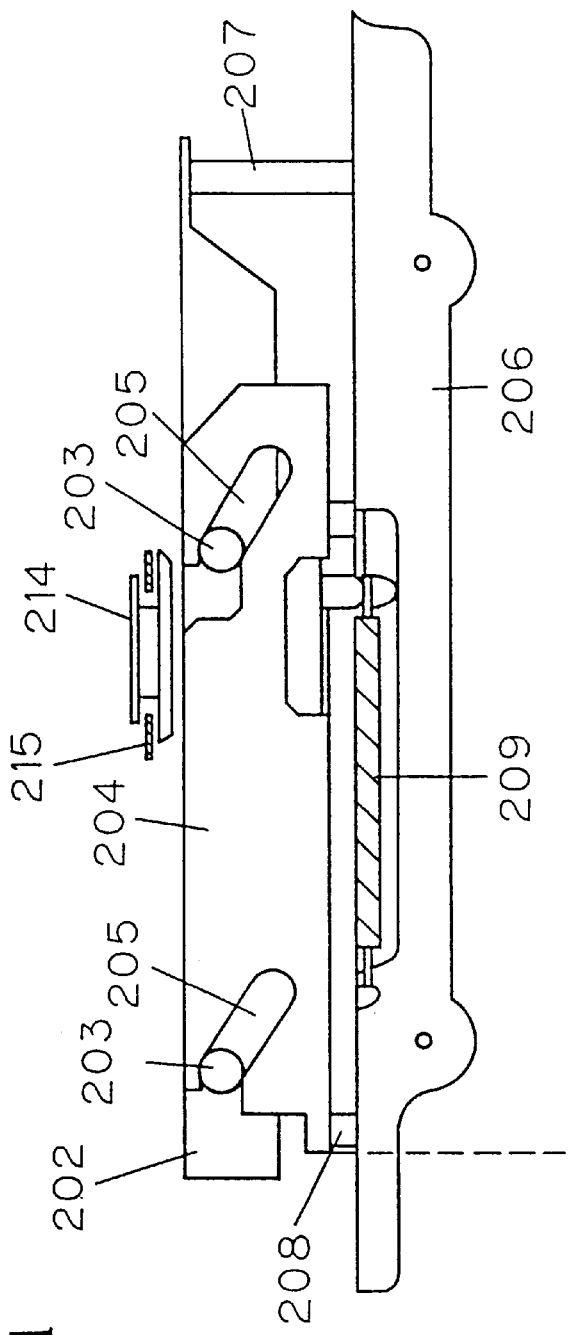
FIGS. 42A and 42B are side views of the disk loading mechanism of FIG. 41.
Figure 42B:
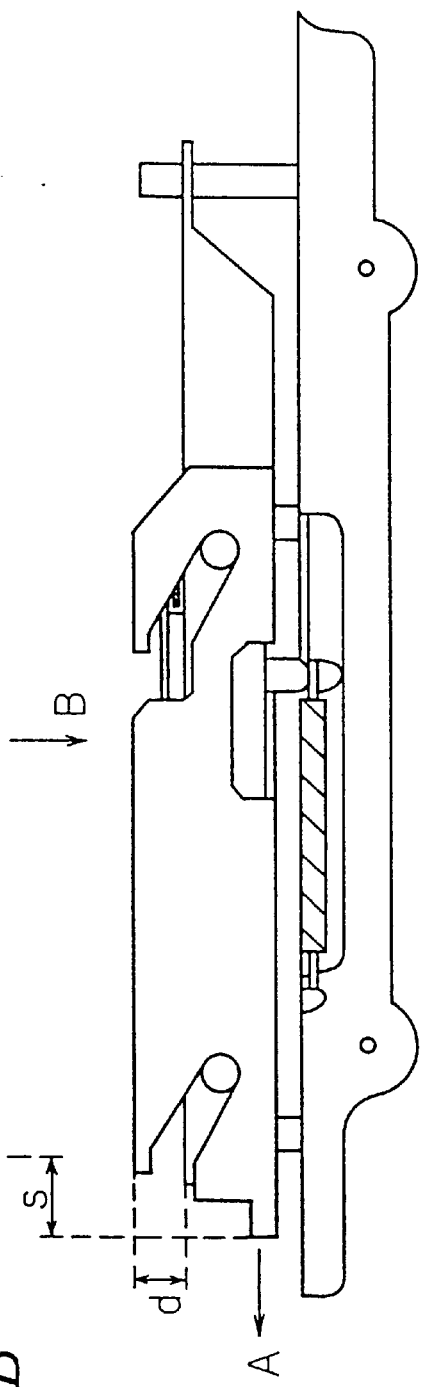
Figure 43:
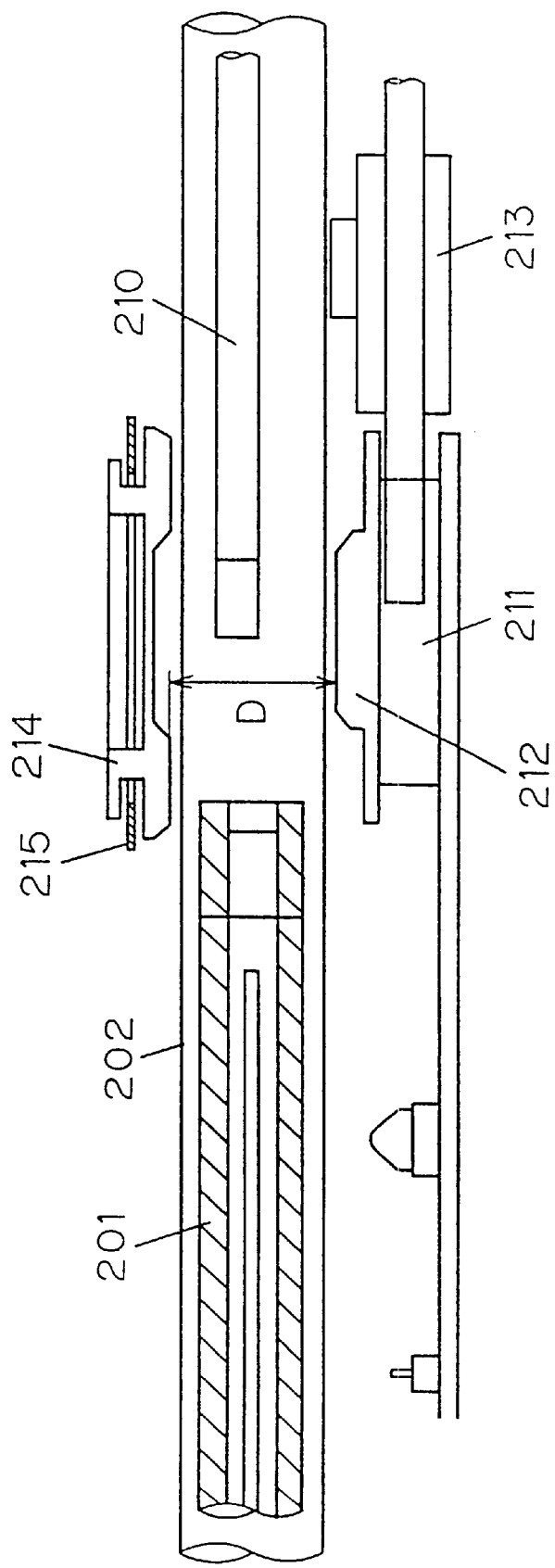
FIG. 43 is a schematic view illustrating the dimensional relationship in the thickness direction of the disk loading mechanism of FIG. 41.
Figure 44:
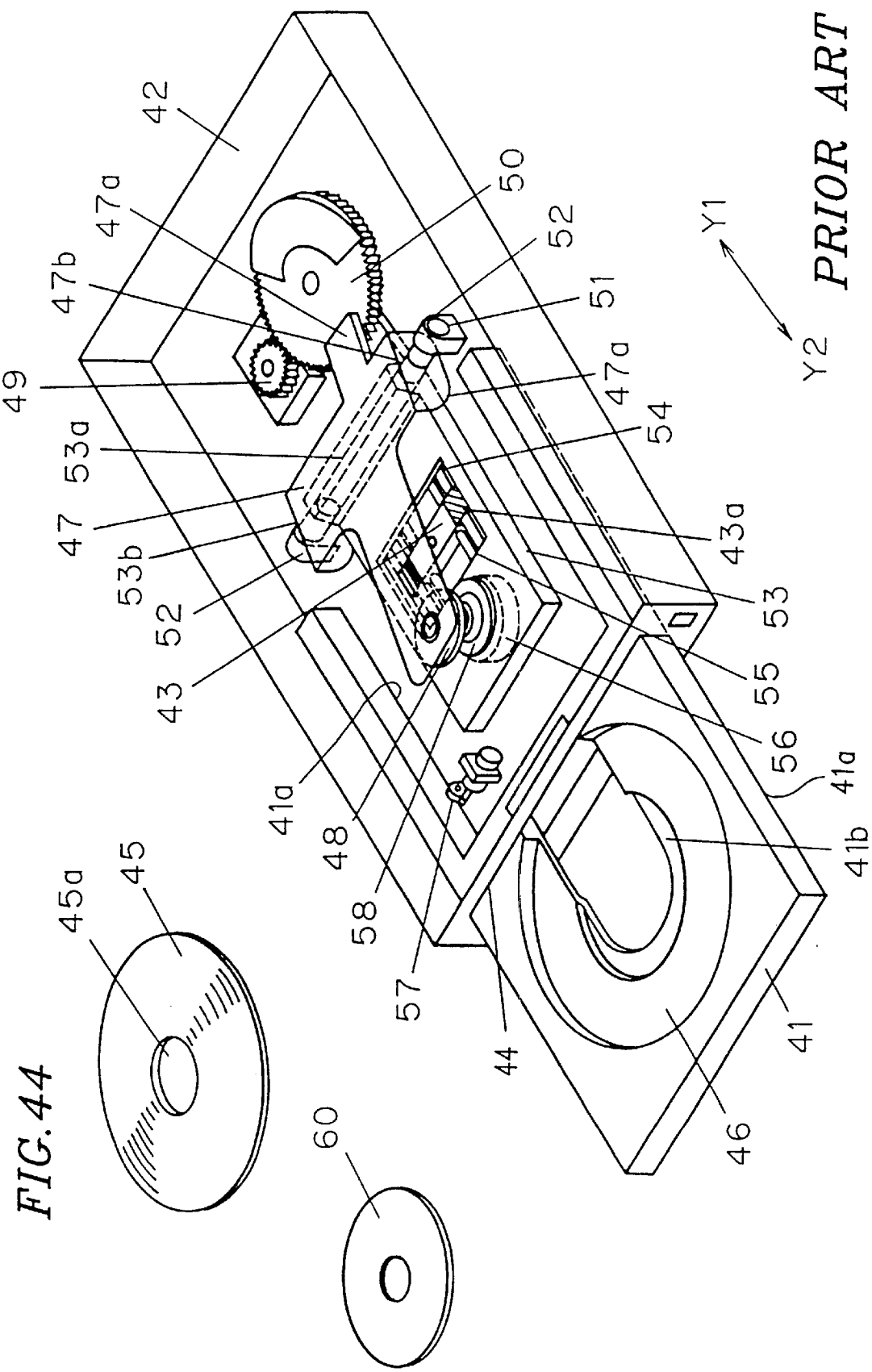
FIG. 44 is a perspective view of a disk loading mechanism of Conventional Example 2.
Figure 45A:
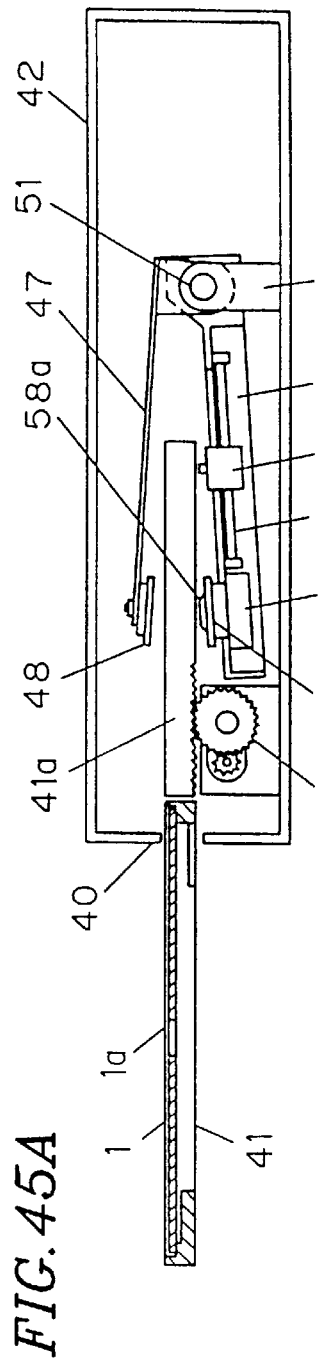
FIGS. 45A, 45B, and 45C are side views of the disk loading mechanism of FIG. 44.
Figure 45B:
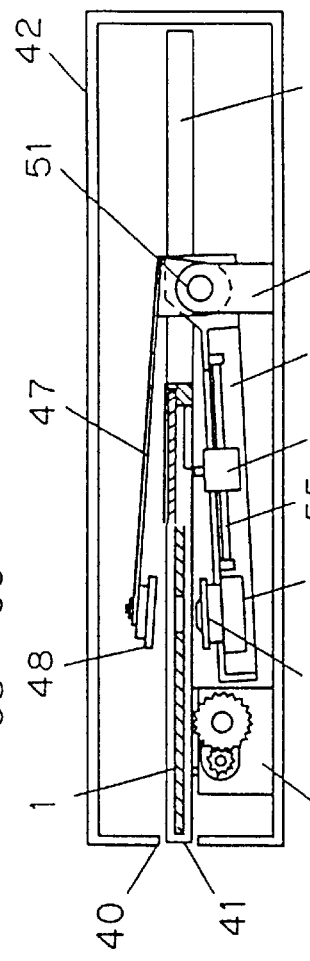
Figure 45C:
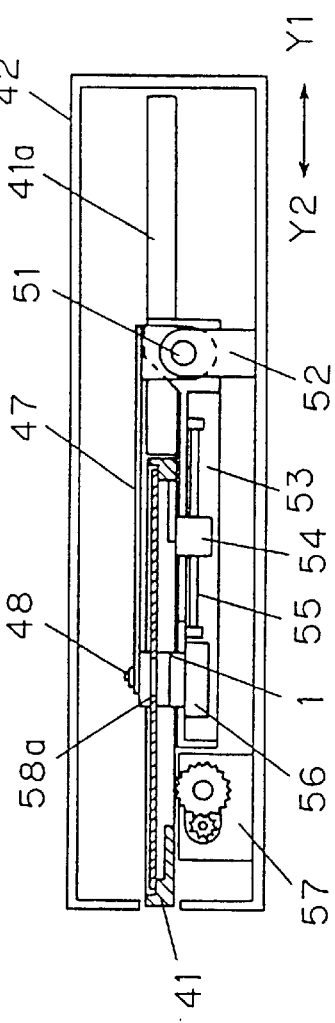

FIGS. 40A to 40C show how the adaptor 801 is used. FIG. 40A shows the medium insertion standby state where the holder 100 has been ejected from the disk loading device body. The adaptor 801 is inserted into the holder 100 in the same manner as that for the cartridge 300.

FIG. 40B shows the state where the insertion of the adaptor 801 into the holder 100 has been completed. Under this state, also, the small disk 302 can be inserted into or removed from the adaptor 801 as shown in FIGS. 39A to 39C.

FIG. 40C shows the state where the holder 100 has been retracted into the device body after the insertion of the small disk 302, which shows the completion of the loading operation.

Thus, as described above, according to the disk loading device of the present invention, the shutter has been opened by the shutter opening/closing member disposed in the rear portion of the holder before the top end of the cartridge passes through the clamp portion. Accordingly, the shutter is open when the cartridge passes through the clamp portion. This makes it possible to reduce the distance between the disk motor and the retract position for the clamper. Thus, at the clamping operation, the relative movement amounts among the disk motor, the clamper, and the cartridge are small. Since the clamp portion is not required to retract over the entire thickness of the cartridge, the disk loading device can be made thin.

In one embodiment, the top portion of the arm will not interfere with the holding portion of the rotational driving member. Accordingly, the distance between the holding portion of the rotational driving member, i.e., the turntable and the damper can be reduced.

In another embodiment, the arm is rotated when a portion of the arm engages with the guide of the holder and moves.

In another embodiment, the arm is prevented from being released from the shutter of the cartridge even if the arm does not reach the terminal of the pathway of the arm, ensuring that the shutter is kept opened.

In the disk loading device according to the present invention, the cartridge is sandwiched by a pair of sandwiching members, while the naked disk is held by the slits formed on the holding portions of the sandwiching members.

In one embodiment, when the cartridge is inserted, the pair of inlet levers are pressed outward to provide a wide entrance. In association with this, the pair of disk holders are pressed outward at the top ends thereof to provide a space large enough for the cartridge to pass therethrough.

In one embodiment, the state of the pair of sandwiching members changes when they hold the cartridge, and this change of the state is detected by the second detection member. Based on detection outputs from the first and second members, which has been inserted into the holder, the cartridge or the naked disk, can be determined.

The adaptor according to the present invention makes it possible to use a disk with a different diameter. The disk exchange can be performed with the adaptor being kept placed on the holder.

In the disk loading device according to the present invention, a mechanism for locking the holder to the guide in association with the insertion of the cartridge is established. With this mechanism, the holder can be fixed since it is prevented from being pressed into the guide due to a load generated by the operation of opening the shutter of the cartridge, for example. This ensures the insertion of the cartridge in the holder.

In one embodiment, the holder has a pair of sandwiching members for sandwiching the cartridge, and a lock member is attached to the pair of sandwiching members.

In the disk loading device according to the present invention, a mechanism for locking the holder to the guide in association with the insertion of the cartridge is established. With this mechanism, the holder can be fixed since it is prevented from being pressed into the guide due to a load generated by the operation of opening the shutter of the cartridge, for example. This ensures the insertion of the cartridge in the holder. Moreover, since the lock member fits in the concave portion of the cartridge when the cartridge has been inserted in the holder, the cartridge can be accurately positioned in the holder. At the same time, since the lock member is disengaged from the guide, it is ensured that the cartridge in the holder is loaded in the device after the accurate positioning of the cartridge in the holder.

In the disk loading device according to the present invention, a forced ejection function for forcibly ejecting the cartridge is realized. In a normal operation where this forced ejection function is not used, the elastic member does not engage with the cartridge. When the forced ejection function is used, the elastic member is deformed by the action of the manipulation portion so that the deformed elastic member engages with the cartridge. The cartridge engaging with the elastic member is ejected from the holder by the elastic force of the elastic member when the elastic member resumes its original shape.

With this arrangement, the disk loading device can be made thin.

In the disk loading device according to the present invention, at least a portion of a mechanism for actuating the holding portion of the rotational driving member is placed in a range corresponding to the opening of the cartridge. The thickness of the opening of the cartridge is smaller than the thickness of the entire cartridge. Accordingly, by placing at least a portion of the holding portion of the rotational driving member at a position corresponding to the opening of the cartridge, the holding portion can be closer to the disk. With this arrangement, the disk loading device can be made thin.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk loading device comprising:

a holder for removably holding a cartridge;

a conveying member for inserting and/or ejecting the holder through an opening formed in a front face of a driving device;

a guide for movably supporting the holder;

a holding portion for holding a center portion of a disk in the cartridge which has been conveyed to a predetermined position by the conveying member;

a rotational driving member for rotating the disk held by the holding portion, a shutter opening/closing member including an arm rotatably supported by the holder and urged toward the opening by an elastic body, each of a top portion and other end portion of the arm having a short protrusion, in which the top portion of the arm abuts against the cartridge; and a notch provided to the guide for engaging with the short protrusion at the other end portion of the arm when the holder is present at a cartridge insert position, wherein, when the cartridge is inserted into the holder, the top portion of the arm abuts against a shutter of the cartridge, and then, the holder is pulled back by the conveying member after the shutter has opened, and when the holder is pulled back by the conveying member without the cartridge, the short protrusion at the other end portion of the arm is pressed to move from the notch of the guide to a side face of the guide and rotated to move so that the top portion of the arm will not interfere with the holding portion of the rotational driving member.

2. A disk loading device comprising:

a holder for removably holding a cartridge; and an inlet lever, a connection board and a lock member in the vicinity of an opening of the holder, wherein the inlet lever has a rotation fulcrum outside a space through which the cartridge passes, the connection board being rotated in connection with rotation of the inlet lever, the lock member is rotatably attached to the connection board in relation to the connection board, the lock member including a hook portion projecting from the holder and an abutting portion abutting against the cartridge.

3. A disk loading device comprising:

a holder for removably holding a cartridge;

a conveying member for inserting and/or ejecting the holder through an opening formed in a front face of a driving device;

an engagement portion provided to the holder;

a holder ejecting member for engaging with the engagement portion; and a compression spring positioned in close proximity to the holder ejecting member, wherein, while a power for ejecting the holder is stored in the compression spring by a manual operation for ejecting the holder, buckling deflection of the compression spring deforms the holder ejecting member so as to engage with the engagement portion of the holder, and then the holder is ejected from the driving device by the restitutive force of the compression spring.

4. An adaptor for removably holding a disk in which dimensions of the adapter and dimensions required for positioning the adapter are identical with those of a disk cartridge, comprising:

an opening into which an optical head and turntable are inserted;

a holding portion for holding the disk such that the outer periphery of the disk is kept away from the holding portion;

a disk insert portion provided at a rear end of the center of the adapter seen in a direction along which the adapter is inserted into a disk loading device;

a pair of disk guiding members which are cantilevers perpendicular to the disk surface positioned at side ends of the disk insert portion;

wherein the disk guiding members are positioned along a radial direction of the disk such that free ends of the disk guiding members point at the center of the disk;

the disk guiding members are widened by the disk when the disk is inserted into the adaptor, and a disk is replaceable while the adaptor is mounted in the disk loading device.

5. A disk loading device comprising:

a holder for removably holding a cartridge;

a conveying member for inserting and/or ejecting the holder through an opening formed in a front face of a driving device;

a shutter opening/closing member on the holder;

a pair of inlet levers and a pair of disk holders constructed inside the holder for supporting and guiding the naked disk;

a first detection member for detecting a position of the shutter opening/closing member of the cartridge; and a second detection member for detecting a position of at least one of the pair of inlet levers;

wherein, when the cartridge is inserted in the holder, first detection member and second detection member are detect together; and wherein, when the naked disk is inserted more from defining position of disk holder with the guiding groove in the holder, only first detection member detects; and when the second detection member does not detect and the first detection member detects, the holder is controlled to be pulled back automatically into an interior of the driving device by the conveying member.

6. A disk loading device comprising:

a holder for removably holding a cartridge;

a conveying member for inserting and/or ejecting the holder through an opening formed in a front face of a driving device;

a guide for movably supporting the holder;

a holding portion for holding a center portion of a disk in the cartridge;

a rotational driving member for rotating the disk held by the holding portion, a shutter opening/closing member including an arm rotatably supported on the holder and urged toward the opening by an elastic member, one end portion of the arm having a hook for engaging with a shutter of the cartridge and the other end portion of the arm having a short protrusion; and a notch provided to the guide for engaging with the short protrusion at the other end portion of the arm;

wherein, when the cartridge is inserted into the holder, the hook of the one end portion of the arm engages with the shutter of the cartridge and then, the holder is pulled back by the conveying member after the shutter has opened, and when the holder is pulled back by the conveying member without the cartridge, the short protrusion at the other end portion of the arm is pressed to move from the notch of the guide to a side face of the guide and rotated to move so that the hook at the one end portion of the arm will not interfere with the holding portion of the rotational driving member.

7. A disk loading device comprising:

a holder which removably holds a cartridge and which includes an inlet opening for insertion of the cartridge;

an inlet lever within the holder which engages the cartridge upon insertion into the inlet opening and rotates in response to this engagement;

a connection board which rotates upon rotation of the inlet lever; and a lock member which is rotatably attached to the connection board and which includes a hook portion projecting from the holder and an abutting portion abutting against the cartridge.

* * * * *